United States Patent
Kim et al.

(10) Patent No.: US 11,902,837 B2
(45) Date of Patent: Feb. 13, 2024

(54) METHOD AND APPARATUS FOR PROVIDING VOICE SERVICE TO USER EQUIPMENT IN HYBRID MOBILE COMMUNICATION SYSTEM

(71) Applicant: Samsung Electronics Co., Ltd., Suwon-si (KR)

(72) Inventors: Dongyeon Kim, Suwon-si (KR); Jungshin Park, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/862,829

(22) Filed: Jul. 12, 2022

(65) Prior Publication Data
US 2023/0033793 A1 Feb. 2, 2023

(30) Foreign Application Priority Data

Jul. 30, 2021 (KR) .......... 10-2021-0100810
Aug. 10, 2021 (KR) .......... 10-2021-0105699
Nov. 5, 2021 (KR) .......... 10-2021-0151800

(51) Int. Cl.
*H04W 28/00* (2009.01)
*H04W 28/22* (2009.01)
(Continued)

(52) U.S. Cl.
CPC ......... *H04W 28/22* (2013.01); *H04L 65/1016* (2013.01); *H04L 65/1073* (2013.01); *H04W 28/0268* (2013.01); *H04W 60/04* (2013.01)

(58) Field of Classification Search
CPC . H04W 28/22; H04W 28/0268; H04W 60/04; H04W 8/08; H04W 92/02; H04L 65/1016; H04L 65/1073; H04L 65/80
See application file for complete search history.

(56) References Cited

U.S. PATENT DOCUMENTS

| | | | |
|---|---|---|---|
| 2020/0120485 A1 | 4/2020 | Abtin et al. | |
| 2020/0267780 A1* | 8/2020 | Huang-Fu | H04W 76/30 |
| 2021/0014741 A1* | 1/2021 | Hallenstål | H04W 48/02 |

FOREIGN PATENT DOCUMENTS

| | | | | |
|---|---|---|---|---|
| EP | 3 621 354 A1 | 3/2020 | | |
| EP | 3621354 A1 * | 3/2020 | ........ | H04W 28/0252 |

OTHER PUBLICATIONS

3GPP ('3GPP; TSG SA; Procedures for the 5G system (SGS); Stage 2 (Release 17)', 3GPP TS 23.502 V17.1.0 (Jun. 2021), Jun. 2021).*

(Continued)

*Primary Examiner* — Lakeram Jangbahadur
(74) *Attorney, Agent, or Firm* — Jefferson IP Law, LLP

(57) ABSTRACT

The disclosure relates to a communication method and system for converging a 5$^{th}$ Generation (5G) communication system for supporting higher data rates beyond a 4$^{th}$ Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method of controlling fallback of a user equipment (UE) by a combo device of a session management function (SMF) and a packet data network gateway (PGW) control plane function (PGW-C) in a hybrid mobile communication system in which a first mobile communication system and a second mobile communication system interwork is provided.

13 Claims, 29 Drawing Sheets

(51) Int. Cl.
*H04W 28/02* (2009.01)
*H04L 65/1073* (2022.01)
*H04L 65/1016* (2022.01)
*H04W 60/04* (2009.01)

(56) References Cited

OTHER PUBLICATIONS

3GPP; TSG SA; Procedures for the 5G system (5GS); Stage 2 (Release 17)', 3GPP TS 23.502 V17.1.0, Jun. 2021.
Zte et al., 'Clarification on the EBI context if target MME does not support EBI extension during 5GS to EPS mobility', S2-2002443, 3GPP TSG SA WG2 Meeting #137e.
3GPP; TSG SA; System architecture for the 5G system (5GS); Stage 2 (Release 17)', 3GPP TS 23.501 V17.1.1, Jun. 2021.
Samsung, 'EPS fallback for a UE moving from EPS to 5GS with a bearer for IMS voice', S2-2106516, 3GPP TSG SA WG2 Meeting #146e, Aug. 2021.
International Search Report dated Oct. 25, 2022, issued in International Patent Application No. PCT/KR2022/010122.

* cited by examiner

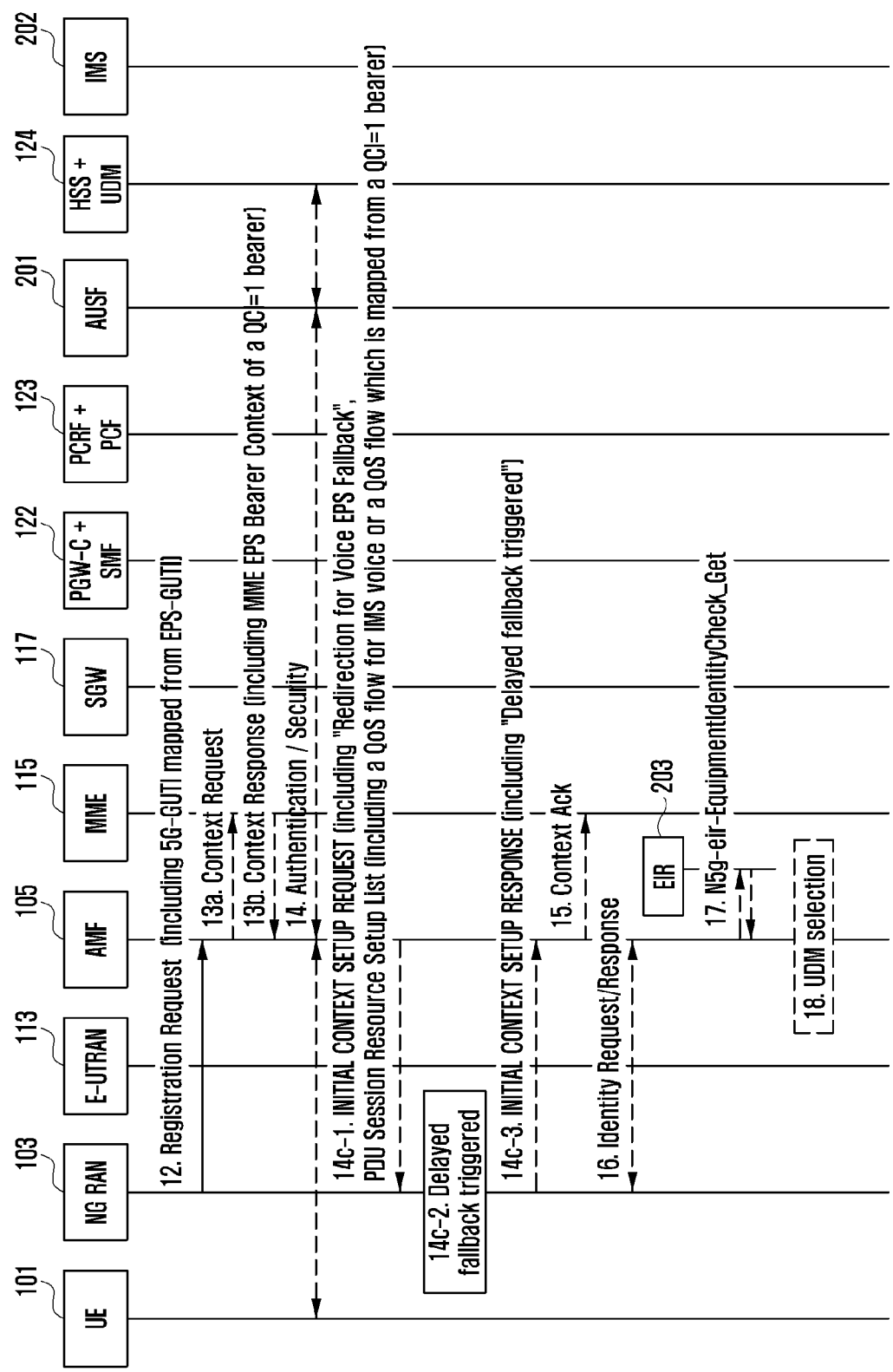

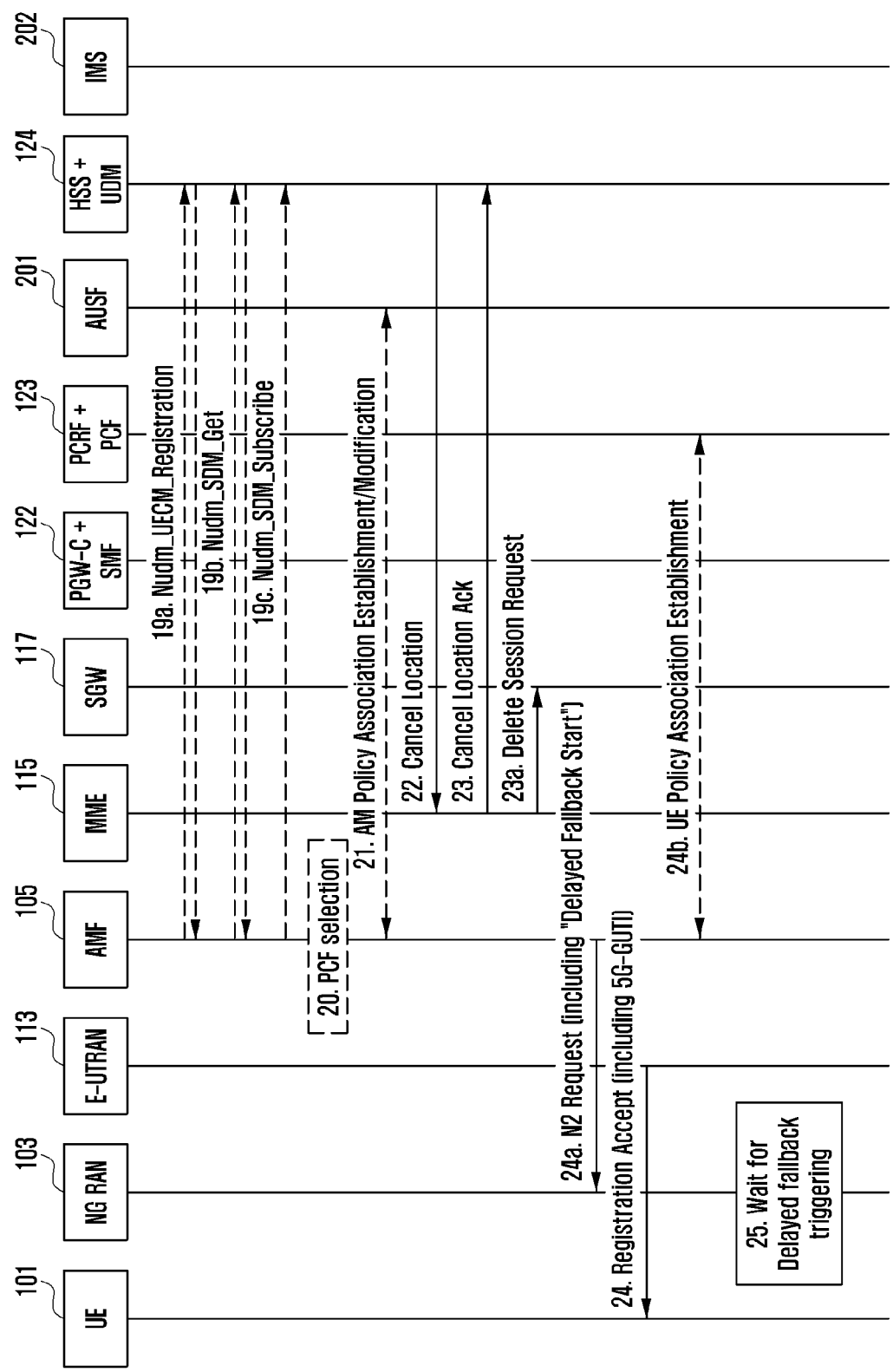

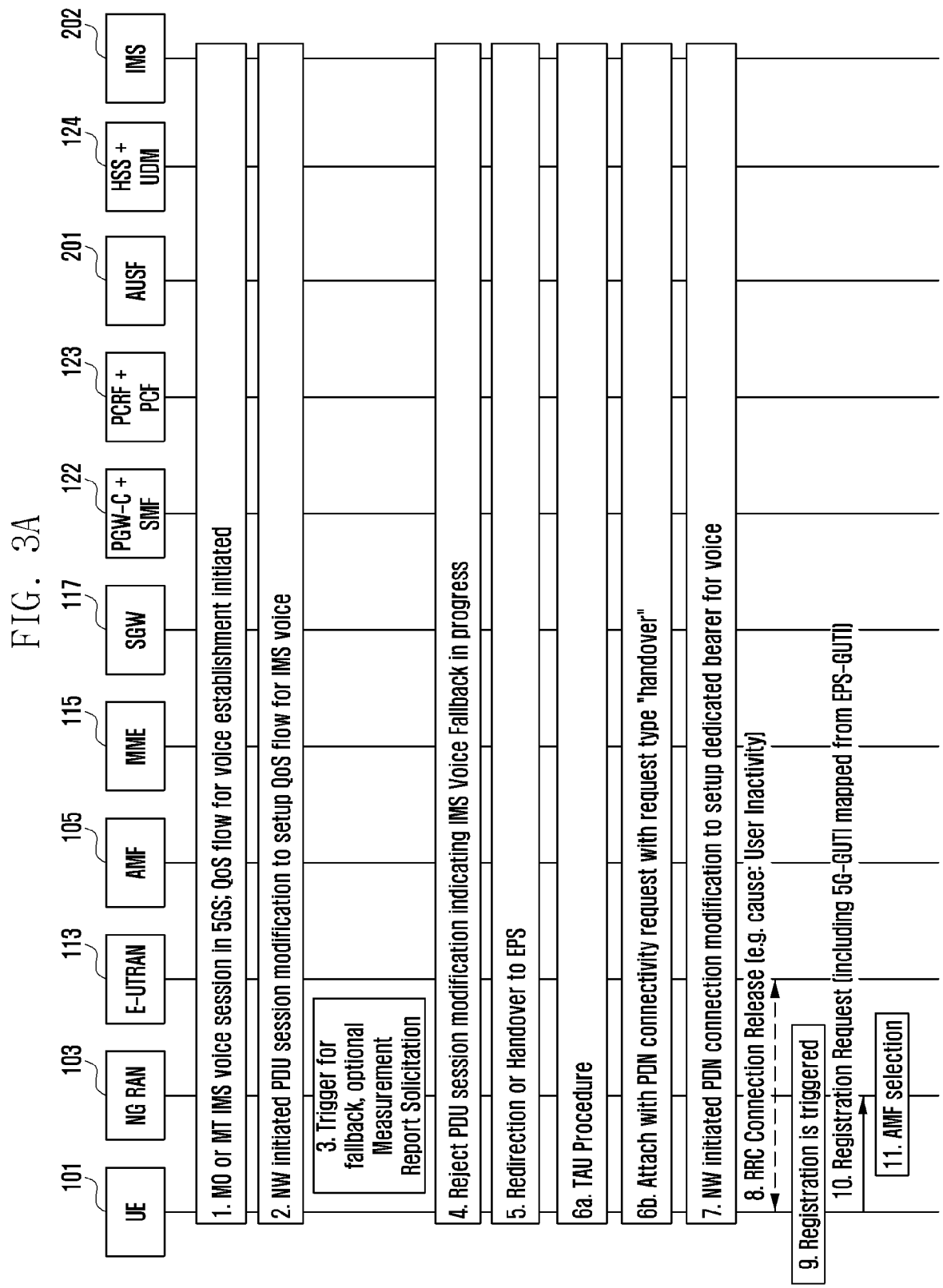

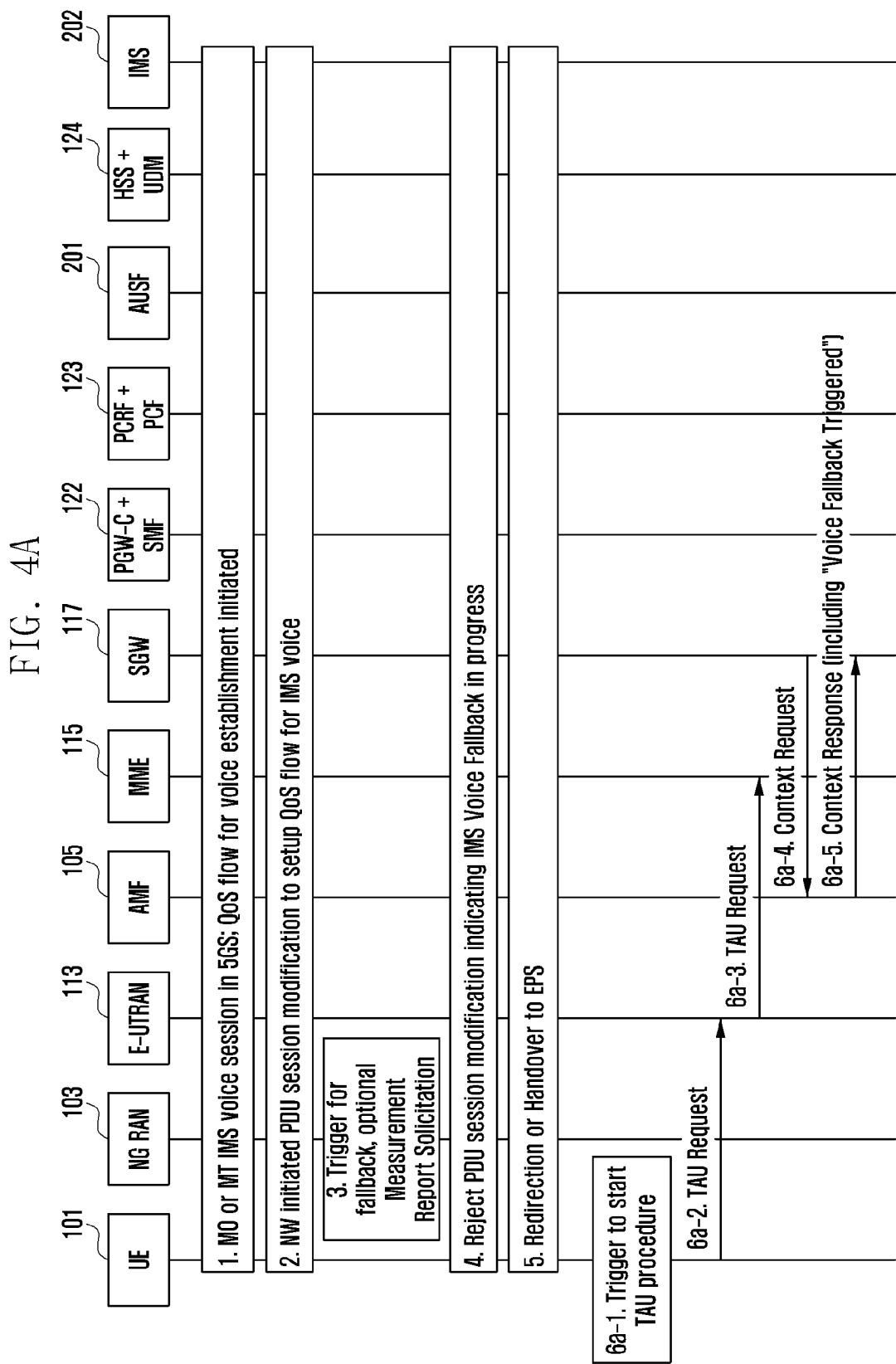

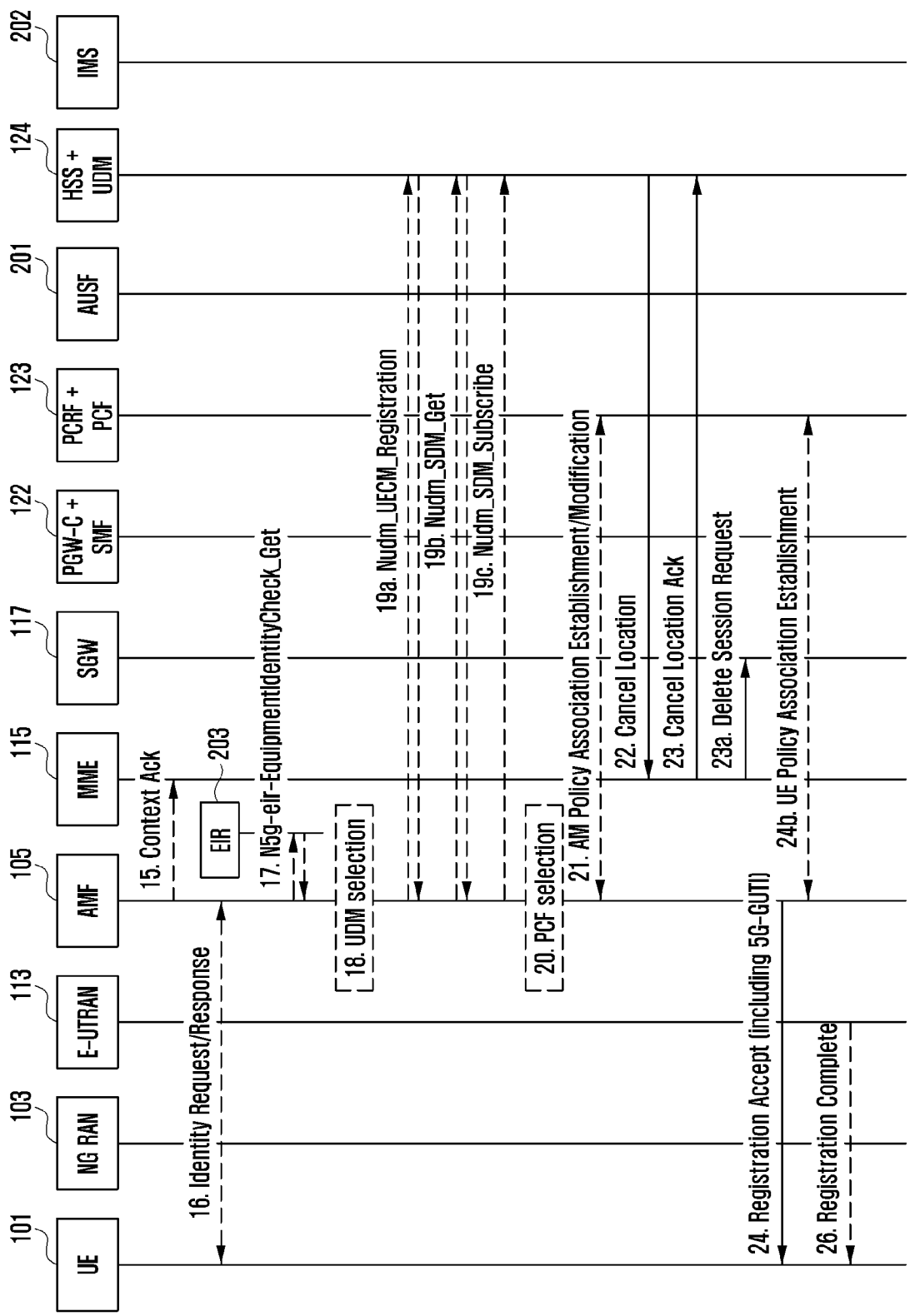

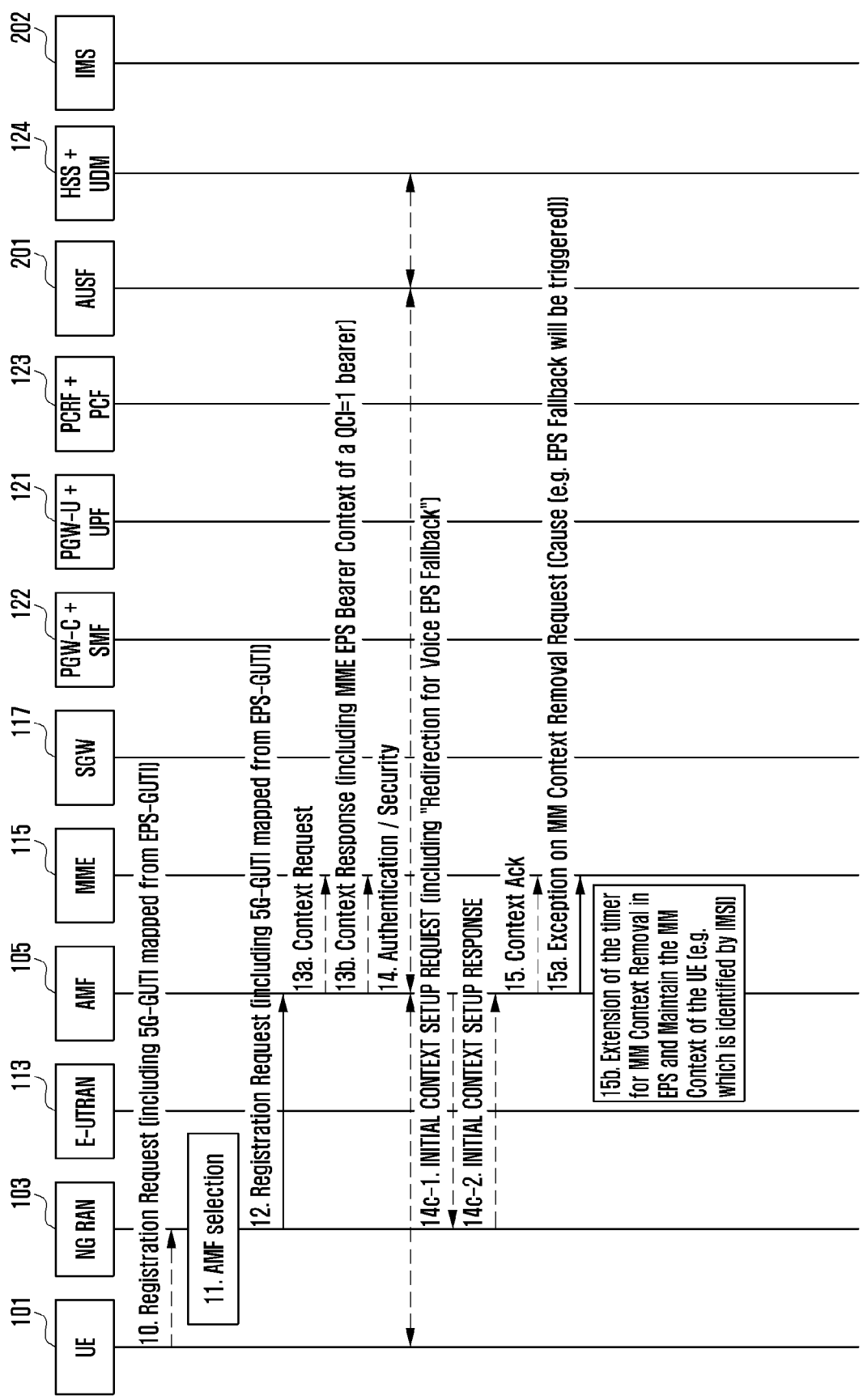

METHOD AND APPARATUS FOR PROVIDING VOICE SERVICE TO USER EQUIPMENT IN HYBRID MOBILE COMMUNICATION SYSTEM

CROSS-REFERENCE TO RELATED APPLICATION(S)

This application is based on and claims priority under 35 U.S.C. § 119(a) of a Korean patent application number 10-2021-0100810, filed on Jul. 30, 2021, in the Korean Intellectual Property Office, of a Korean patent application number 10-2021-0105699, filed on Aug. 10, 2021, in the Korean Intellectual Property Office, and of a Korean patent application number 10-2021-0151800, filed on Nov. 5, 2021, in the Korean Intellectual Property Office, the disclosure of each of which is incorporated by reference herein in its entirety.

BACKGROUND

1. Field

The disclosure relates to a method and an apparatus for providing a voice service to a user equipment (UE) in a mobile communication system. More particularly, the disclosure relates to a method and an apparatus for providing a voice service to a UE in a hybrid mobile communication system having different communication protocols.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system (5GS), Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the recent development of communication systems, various research for providing different network slicing (or network slices) are being conducted in 5G-based wireless communication systems.

The above information is presented as background information only to assist with an understanding of the disclosure. No determination has been made, and no assertion is made, as to whether any of the above might be applicable as prior art with regard to the disclosure.

SUMMARY

All of a 5GS, which is being commercialized at present, and LTE and long term evolution advanced (LTE-A) systems, which currently provide a mobile communication service, are mobile communication systems providing a packet-based service. The 5GS is being developed to support mutual interworking with an evolved packet system (EPS) based on LTE and LTE-A. When a UE which can use wireless communication through the 5GS and the EPS desires to use a voice service through the 5GS supporting EPS/5GS interworking, a 5G core network determines whether the UE can use the voice service through a next generation radio access network (NG-RAN). When it is determined that the UE cannot use the voice service through the NG-RAN and the 5GS, the 5G core network triggers an EPS fallback procedure to allow the UE to use the voice service through an E-UTRAN and the EPS. When the UE moves to the EPS by the EPS fallback procedure, the UE registers in the EPS through a tracking area update (TAU) procedure for the EPS and establishes a packet data network (PDN) connection (PDN session) for the voice service, an RRC connection, and a radio bearer. This may be called a primary EPS fallback.

When it is determined that the UE does not use the voice service like the non-reception of a voice call for a predetermined time, the UE may switch to an idle state and an EPS network may release of the RRC connection to the UE and induce returning to the 5GS.

The UE triggers a registration procedure in the mobility registration update type to return to the 5GS, and the 5G core network acquires information such as mobility management (MM) context related to the UE, a PDN connection, and an EPS bearer from the EPS network from which the UE has moved. The 5G core network provides the information to the NG-RAN and makes a request for configuring information on a session with the UE. When the EPS network maintains bearer information for the voice service, the NG-RAN may stop the registration procedure for returning of the UE to the 5GS and move the UE to the EPS back. This may be called the stop of a 5GS movement procedure and a secondary EPS fallback.

The UE triggers a TAU procedure to move to the EPS in which case a 5G-globally unique temporary identifier (5G-GUTI) is required to acquire MM context or the like in the 5GS by the EPS through a determination of an access and mobility management function (AMF) address of the 5GS from which the UE has moved. However, since the UE has moved in the state in which the registration procedure has not been successfully finished in the 5GS, the UE cannot receive allocation of the 5G-GUTI from the AMF. In this case, the UE may provide a long EPS-GUTI previously allocated by the EPS to the EPS, and the EPS may reject the TAU procedure because the ESP-GUTI is an invalid UE identifier. Accordingly, the UE is disconnected from the network. That is, the EPS movement procedure may be stopped and the UE connection may be lost.

Aspects of the disclosure are to address at least the above-mentioned problems and/or disadvantages and to provide at least the advantages described below. Accordingly, an aspect of the disclosure is to provide a method and an apparatus for normally performing the EPS movement procedure by performing the secondary EPS fallback after completing the registration procedure in the 5GS and receiving the 5G-GUTI when the UE performs the secondary fallback during the movement procedure to the 5GS after the primary EPS fallback.

Another aspect of the disclosure is to provide a method and an apparatus for preventing secondary EPS fallback by reason that, when the UE performs EPS fallback in order to use a voice service, if the UE does not normally use the voice service and moves to the 5GS, the connection for the voice service leaves in the EPS by moving the UE to the 5GS after releasing a bearer, an RRC connection, and a PDN connection established to use the voice service in the EPS.

Additional aspects will be set forth in part in the description which follows and, in part, will be apparent from the description, or may be learned by practice of the presented embodiments.

In accordance with an aspect of the disclosure, a method of controlling fallback of a user equipment (UE) by a combo device of a session management function (SMF) and a packet data network gateway (PGW) control plane function (PGW-C) in a hybrid mobile communication system in which a first mobile communication system and a second mobile communication system interwork is provided. The method includes receiving, from an access and mobility management function (AMF) of the first mobile communication system, a reactivation request for a packet data network (PDN) connection of the second mobile communication system for the UE, the reactivation request including PDN connection context, retrieving a corresponding PDU session, based on the PDN connection context included in the reactivation request, modifying evolved packet system (EPS) bearer identity (EBI) information for an IP multimedia subsystem (IMS) voice allocated to the UE, based on information supported in the first mobile communication system, establishing a core network (CN) tunnel for a PDU session for the UE to a user plane function (UPF) and a PGW user plane function (PGW-U), based on the modified EBI information, updating session management (SM) context, based on the established CN information, and transmitting, to the AMF, a response message including the updated SM context in response to the reactivation request.

In accordance with another aspect of the disclosure, a combo device of a session management function (SMF) and a packet data network gateway (PGW) control plane function (PGW-C) for controlling fallback of a user equipment (UE) in a hybrid mobile communication system in which a first mobile communication system and a second mobile communication system interwork is provided. The combo device includes a transceiver configured to communication with a network function of the hybrid mobile communication system, a memory, and a processor is configured to control to receive, from an access and mobility management function (AMF) of the first mobile communication system, a reactivation request for a packet data network (PDN) connection of the second mobile communication system for the UE, the reactivation request including PDN connection context, retrieve a corresponding PDU session, based on the PDN connection context included in the reactivation request, modify evolved packet system (EPS) bearer identity (EBI) information for an IP multimedia subsystem (IMS) voice allocated to the UE, based on information supported in the first mobile communication system, establish a core network (CN) tunnel for a PDU session for the UE to a user plane function (UPF) and a PGW user plane function (PGW-U), based on the modified EBI information, update session management (SM) context, based on the established CN information, and transmit, to the AMF, a response message including the updated SM context in response to the reactivation request.

According to an apparatus and a method of various embodiments of the disclosure, it is possible to effectively provide a voice service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B illustrates a method of registering a UE and managing a session through a delayed fallback initiation procedure by an NG-RAN according to an embodiment of the disclosure;

FIG. 2C illustrates a method of registering a UE and managing a session through a delayed fallback initiation procedure by an NG-RAN according to an embodiment of the disclosure;

FIG. 3A illustrates a method of registering a UE and managing a session through a delayed fallback triggering procedure by an AMF according to an embodiment of the disclosure;

FIG. 4A illustrates a method of registering a UE and managing a session through a bearer deactivation procedure by an MME according to an embodiment of the disclosure;

FIG. 4D illustrates a method of registering a UE and managing a session through a bearer deactivation procedure by an MME according to an embodiment of the disclosure;

FIG. 9B illustrates a method of registering a UE and managing a session through the use of maintenance of a procedure of triggering fallback according to an embodiment of the disclosure;

The same reference numerals are used to represent the same elements throughout the drawings.

DETAILED DESCRIPTION

Figure 1:
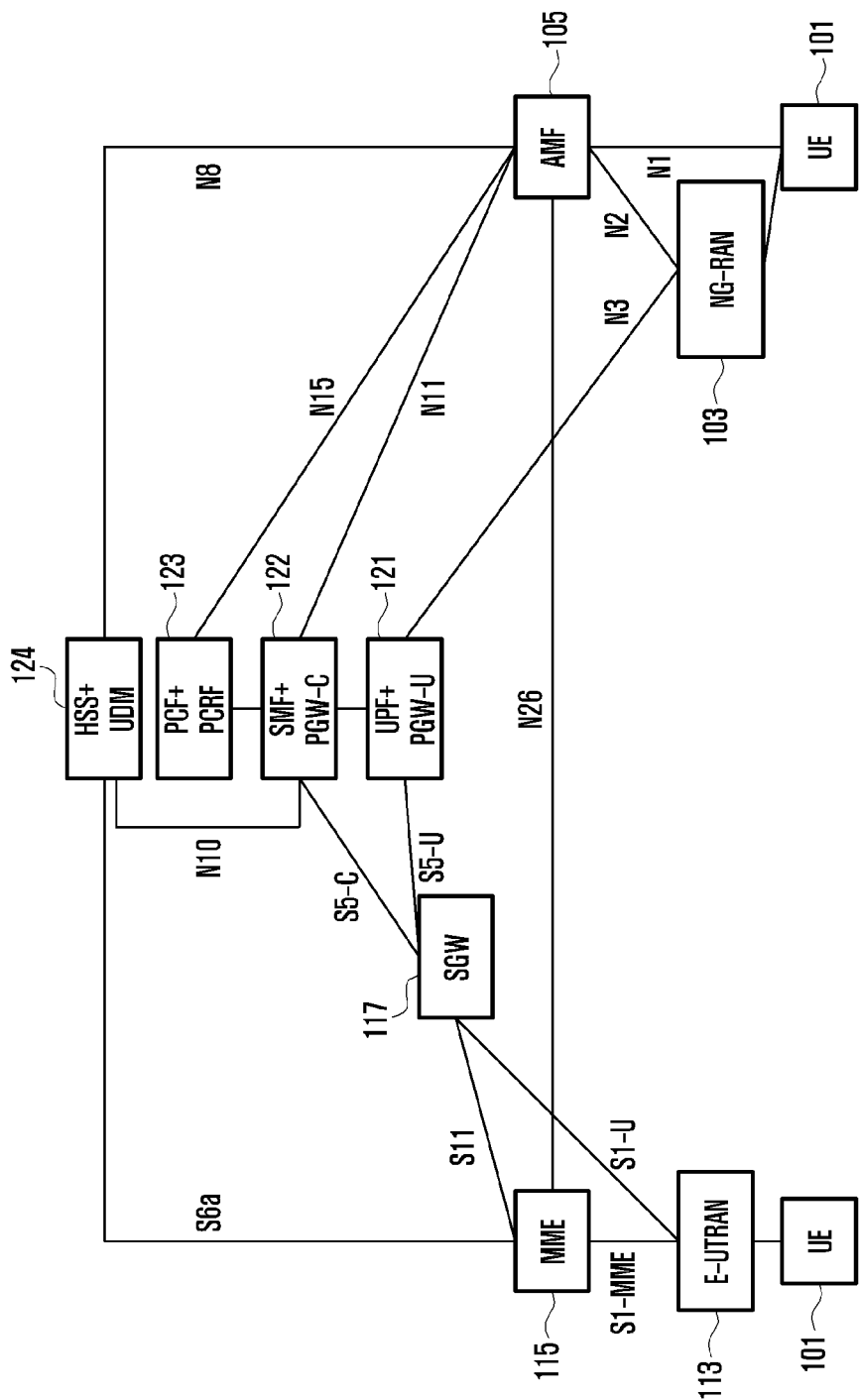
FIG. 1 illustrates architecture of a wireless communication system supporting interworking between a 5G system and an EPS system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the embodiments of the disclosure, a base station is an entity that allocates resources to user equipment (UE), and may be at least one of a gNode B, a gNB, an eNode B, an eNB, a Node B, a base station (BS), a wireless access unit, a base station controller, and a node on a network. Further, the base station may be a network entity including at least one of an integrated access and backhaul-donor (IAB-donor) which is a gNB providing network access to UE or a terminal(s) via a network of backhaul and access links, and an IAB-node which is a radio access network (RAN) node supporting an NR access link(s) to a terminal(s) and supporting NR backhaul links to the IAB-donor or any other IAB-node. A terminal may perform radio access via an IAB-node and transmit/receive data to/from an IAB-donor connected to at least one IAB-node via a backhaul link.

In addition, the UE may include a terminal, a user equipment (UE), a mobile station (MS), a cellular phone, a smartphone, a computer, or various devices capable of performing communication functions. As described above, a UE or a terminal may be understood as the same entity in the following description.

In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include $5^{th}$ generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Hereinafter, the disclosure proposes an apparatus and a method for providing interworking of network slices (or network slicing) in a wireless communication system. Specifically, a technology for interworking between a 5G network system and an EPS network system to provide network slice functions in a wireless communication system is described through the disclosure. In the disclosure, the 5G network system may be referred to as a first wireless communication system, the EPS network system may be referred to as a second wireless communication, and the two systems may be collectively referred to as a wireless communication system.

In the following description, terms referring to signals, terms referring to channels, terms referring to control information, terms referring to network entities, terms referring to device elements, and the like are illustratively used for the sake of convenience. Further, in the following description, terms for identifying access nodes, terms referring to messages, terms referring to interfaces between network entities, terms referring to various information, and the like are illustratively used for the sake of convenience. Therefore, the disclosure is not limited by the terms as used below, and other terms referring to subjects having equivalent technical meanings may be used.

In the following description, various embodiments of the disclosure will be described using terms and names defined in some communication standards (e.g., 3$^{rd}$ generation partnership project (3GPP)), but they are only for the sake of illustration. Various embodiments of the disclosure may be easily applied to other communication systems through modifications.

In the 3GPP standard, 5G network system architecture and procedure have been standardized. A mobile communication operator may provide various services in the 5G network. The mobile communication operator needs to satisfy different service requirements for respective services (for example, delay time, communication range, data rate, bandwidth, reliability, and the like) in order to provide services. The disclosure describes a technology for supporting various services by using network slices in a wireless communication system.

In a wireless communication system supporting network slicing, traffic for different network slices may be processed by different protocol data unit (PDU) sessions. The PDU session may be association between a data network providing a PDU connection service and a UE. The network slicing may be understood as a technology for logically configuring the network by a set of network functions (NFs) for supporting various services having different characteristics such as mission critical services like a broadband communication service, massive IoT, and V2X and dividing different network slices. Accordingly, even though any network slice has a communication error, communication of another network slice is not influenced thereby, and thus it is possible to provide a stable communication service. In the disclosure, the term "slice" may be interchangeably used with the term referring to a "network slice". The UE receiving various services in such a network environment may access a plurality of network slices. Further, the network function (NF) is a software instance driving in hardware and may be implemented as a function instanced and virtualized in a network element or an appropriate platform.

The mobile communication operator may configure the network slices and allocate network resources suitable for specific services according to each network slice or each network slice set. The network resources may be the NF, logical resources provided by the NF, or allocation of radio resources of the BS.

For example, the mobile communication operator may configure a network slice A to provide a mobile broadband service, configure a network slice B to provide a vehicle communication service, and configure a network slice C to provide an IoT service. That is, as described above, the 5G network may efficiently provide the corresponding service to the UE through the network slice specialized for a characteristic of each service.

The mobile communication operator may operate the 5G network and an EPS (or an LTE-based network or a 4G network) network together. The UE may access the 5G network to use services and then move to the EPS network. Alternatively, the UE may access the EPS network to use services and then move to the 5G network. Interworking between networks (systems) related to movement of the UE may be referred to as 5G core (5GC)-EPC interworking or 5G system (5GS)-EPS interworking.

The disclosure proposes an example of a method of interworking between the 5G network system and the EPS network system (that is, 5GS-EPS interworking) or 5GC-EPC interworking providing the network slice function.

Further, the disclosure describes examples of a network operation and a UE operation for allowing the UE to use a service without disconnection even though the UE establishing a session connection in the 5GS to use a communication service moves to the EPS or the UE establishing a session connection in the EPS to use a communication service moves to the 5GS.

In the disclosure, a network technology may be referred to by the standard (for example, TS 23.501, TS 23.502, TS 23.503, and the like) defined by the international telecommunication union (ITU) or the 3GPP, and elements included in the network architecture of FIG. 1 may be physical entities, software performing individual functions, or hardware combined with software. Referring to FIG. 1, reference numeral Nx indicating N1, N2, N3, . . . denote interfaces known between NFs in the 5G core network (CN), and a description related thereto may be referred to by the standard (TS 23.501), and thus a detailed description thereof is omitted. Hereinafter, in the description of FIG. 1, illustration/description of NFs which are not directly relevant to the disclosure is omitted.

FIG. 1 illustrates an example of interworking architecture of the 5GS and the EPS in a non-roaming situation according to an embodiment of the disclosure.

The 5GS may include a new radio (NR) base station (e.g., NG-radio access node (RAN) or next generation node B (gNB)) 103 and an access and mobility management function (AMF) 105, and further include a session management function (SMF), a user plane function (UPF), a policy control function (PCF), a network slice selection function (NSSF), a unified data management (UDM), and a unified data repository (UDR) which are not illustrated in FIG. 1.

The EPS may include an E-UTRA base station (e.g., an evolved universal mobile telecommunications system (UMTS) terrestrial radio access network (E-UTRAN) or evolved node B (eNB)) 113, a mobility management entity (MME) 115, a serving gateway (SGW) 117, a packet data network gateway (PGW) (including a PGW-U and a PGW-C), a policy and charging rule function (PCRF), and a home subscriber server (HSS).

According to an embodiment, the AMF 105 and the MME 115 may be network functions (NFs) managing radio network access and mobility for the UE. The SMF, the SGW, and the PGW are NFs for managing a session of the UE, and session information may include quality of service (QoS) information, charging information, and information on packet processing. Further, the UPF and the PGW are NFs for processing user plane traffic and are controlled by the SMF and the SGW. The PCF and the PCRF may be NFs for managing an operator policy (and/or a PLMN policy) for providing a service in a wireless communication system. In addition, the PCF may be divided into a PCF serving to handle an access and mobility (AM) policy and a UE policy and a PCF serving to handle a session management (SM) policy. The PCF serving to handle the AM/UE policy and the PCF serving to handle the SM policy may be logically or physically separated NFs or logically or physically one NF. The UDM and the HSS may be NFs for storing and managing UE subscriber information (UE subscription). The UDR may be an NF or a database (DB) for storing and managing data. The UDR may store UE subscription information and provide the UE subscription information to the UDM. Further, the UDR may store operator policy information and provide the operator policy information to the PCF. The NSSF may be an NF for performing a function of selecting network slice instances servicing the UE or determining network slice selection assistance information (NSSAI).

The instance may mean a state in which the NF exists in the form of a software code and an NF function can be executed through allocation of physical or/and logical resources by a computing system to perform the NF function in a physical computing system (for example, a specific computing system existing in a core network). For example, an AMF instance, an SMF instance, or the NSSF instance may mean a state in which physical or/and logical resources can be allocated and used for the AMF, SMF, or NSSF operation by a specific computing system existing in a core network. Accordingly, the case in which the AMF, the SMF, and the NSSF device exist and the AMF instance, the SMF instance, and the NSSF instance in which physical or/and logical resources are allocated and used for the AMF, SMF, and NSSF operation by a specific computing system existing in the network may perform the same operation.

The UDM of the 5GS and the HSS of the EPS may be configured as one combo node (referred to as HSS+UDM) 124. The HSS+UDM 124 may store UE subscriber information. The SMF of the 5GS and the PGW-C of the EPS may be configured as one combo node (referred to as SMF+PGW-C or PGW-C+SMF) 122. The term is to indicate that the SMF of the 5GS and the PGW-C of the EPS are configured as one combo node, and thus the abbreviations of SMF+PGW-C and PGW-C+SMF can be used to indicate the same device.

The PCF of the 5GS and the PCRF of the EPS may be configured as one combo node (referred to as PCF+PCRF) 123. The UPF of the 5GS and the PGW-U of the EPS may be configured as one combo node (referred to as UPF+PGW-U or PGW-U+UPF) 121. The term is to indicate that the UPF of the 5GS and the PGW-U of the EPS are configured as one combo node, and thus the abbreviations of UPF+PGW-U and PGW-U+UPF can be used to indicate the same device. A user equipment (UE) 101 may access the MME 115 of the EPS through the E-UTRA eNB (i.e., E-UTRAN 113) and use the EPS network service. Further, the UE 101 may access the AMF 105 of the 5GS through the NG-RAN 103 and use the 5GS network service. The same reference numeral is used for the UE 101 accessing the EPS and the UE 101 accessing the 5GS in FIG. 1. This is to indicate that the UE 101 is a UE which can access the EPS and the 5GS.

As described above, one NF or network entity may simultaneously support different network systems, and the NF, the network node, or the network entity may be called the combo node, the combo NF, the combined node, the integrated NF, the interworking node, the interworking NF or the like. Further, the function of the NF described as the combo node may be implemented through interworking between two or more network entities. In addition, the NF simultaneously supporting different network systems may be expressed using the sign "+" or "/" for convenience of illustration and description. For example, when the SMF and the PGW-C are configured as one combo node, the expression of PGW-C/SMF, PGW-C+SMF, SMF/PGW-C, or SMF+PGW-C may be used.

The UE 101 may access a data network (for example, a network providing an Internet service) through the 5GS or EPS system and establish a session. At this time, the UE 101 may identify each data network on the basis of an identifier such as a data network name (DNN) or an access point name (APN). In order to distinguish between data networks, the DNN may be used in the 5GS and the APN may be used in the EPS. When the UE 101 establishes a session with a network system, the DNN and the APN may be used to determine an NF related to a user plane, an interface between NFs, an operator policy, and the like. The DNN and the APN may be understood as equivalent information and may transmit the same information. The DNN may be used to select, for example, the SMF and UPF(s) for a PDU session and used to select interface(s) (for example, N6 interface) between the data network and the UPF for a PDU session. Further, the DNN may be used to determine a mobile communication operator policy to be applied to a PDU session.

In the following embodiments, the combo node such as the UDM+HSS node, the PCF+PCRF node, the SMF+PGW-C node, or the UPF+PGW-C node is described without the "node" for convenience of description. Further, in the following embodiments, the definition of a message defined in one embodiment may be applied as the same meaning to another embodiment using the same message.

Figure 2A:
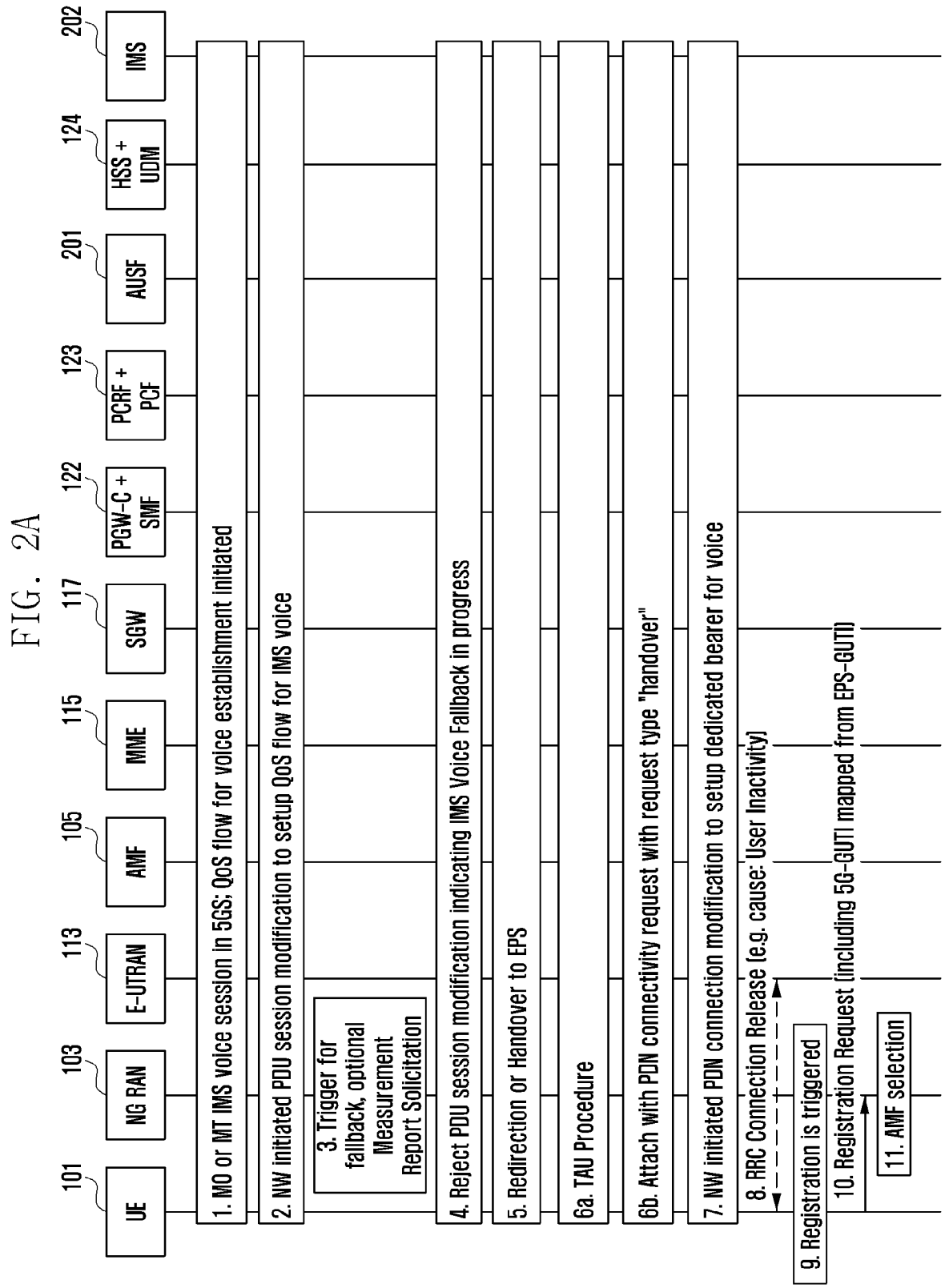
FIG. 2A illustrates a method of registering a UE and managing a session through a delayed fallback initiation procedure by an NG-RAN according to an embodiment of the disclosure.
Figure 2D:
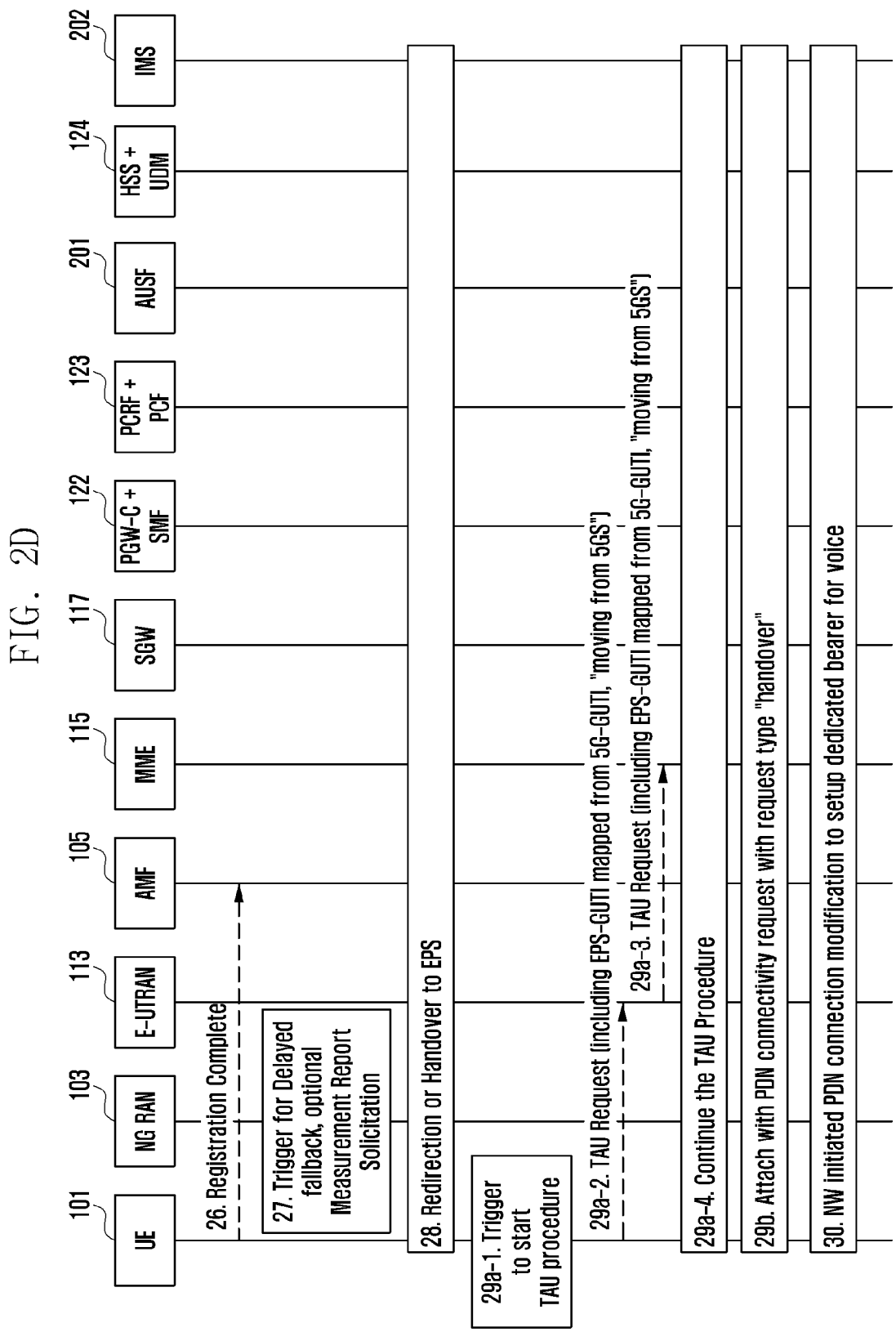
FIG. 2D illustrates a method of registering a UE and managing a session through a delayed fallback initiation procedure by an NG-RAN according to an embodiment of the disclosure.

FIG. 2A illustrates a method of registering a UE and managing a session through a delayed fallback triggering procedure by an NG-RAN according to an embodiment of the disclosure, FIG. 2B illustrates a method of registering a UE and managing a session through a delayed fallback triggering procedure by an NG-RAN according to an embodiment of the disclosure, FIG. 2C illustrates a method of registering a UE and managing a session through a delayed fallback triggering procedure by an NG-RAN according to an embodiment of the disclosure, and FIG. 2D illustrates a method of registering a UE and managing a session through a delayed fallback triggering procedure by an NG-RAN according to an embodiment of the disclosure.

Prior to description of the embodiment of the disclosure made with reference to FIGS. 2A to 2D, reference numerals which are the same as those in FIG. 1 are used for respective NFs and the UE described in FIG. 1.

Further, FIGS. 2A to 2D are described on the basis of the sequential flow. For example, a flowchart of FIG. 2B is described after a flowchart of FIG. 2A and then a flowchart of FIG. 2C is described, and lastly a flowchart of FIG. 2D is described. In the actual implementation, the order of FIGS. 2A to 2D which is the same as the scheme described in the disclosure may be used. In another example, only some of FIGS. 2A to 2D may be sequentially implemented. That is, some orders of FIGS. 2A to 2D may be omitted or may not be performed. In another example, some orders of FIGS. 2A to 2D may be performed in parallel or the orders may be changed. Further, the description made with reference to another figure may be inserted into the middle of the flowcharts of FIGS. 2A to 2D.

In addition, operations in blocks between respective NFs may have a plurality of signal flows between respective NFs and/or the UE and the NF in FIGS. 2A to 2D. Referring to FIGS. 2A to 2D, it should be noted that only description of the overall operation is made in operations in blocks rather than stating all individual signal flows. In the following description, each of FIGS. 2A, 2B, 2C, and 2D is indicated as FIG. 2 unless FIGS. 2A, 2B, 2C, and 2D should be specifically distinguished. In the following description, a specific message may be used without a message/signal, a message, or a signal according to an expression method. For example, the RRC connection release may be expressed as an "RRC connection release message", an "RRC connection release signal", or an "RRC connection release", and all of them should be understood as having the same meaning.

In operation 1, for the UE 101 connected to the 5GS through the NG-RAN 103, MO (originated by a mobile originated-UE) or MT (terminated by a mobile terminated-UE) IP-multimedia subsystem (IMS) voice session establishment may be initiated.

The IMS is a system for providing a multimedia service in an IP network and may provide a voice, a video, messaging, data, a web-based wired/wireless technology to the user through the connection with the EPS and 5GS core networks. A proxy-call session control function (P-CSCF) of the IMS may be connected to the PCF, the PCRF, or the PCF+PCRF of the 5GS/EPS core network, and an interrogating-call session control function (I-CSCF), a serving-call session control function (S-CSCF), and an application server (AS) of the IMS may be connected to the HSS, the UDM, or the HSS+UDM of the 5GS/EPS core network. The UE 101 may be connected to the EPC through the E-UTRAN or the evolved packet data gateway (ePDG) or connected to the 5GC through the NG-RAN 103 or the non-3GPP interworking function (N3IWF) to be registered and establish a session, and the EPC/5GC may perform a UE registration and session establishment procedure required for an entity/function of the IMS and an IMS-based voice service.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN 103 may determine whether to trigger the EPS fallback on the basis of the following information. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 may not be performed. When the NG-RAN 103 does not receive the indicator of the redirection for EPS fallback for voice from the AMF 105, the NG-RAN 103 may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message may include an indicator indicating movement due to fallback for the IMS voice. The SMF+PGW-C 122 receiving the response message may maintain policy and charging control (PCC) rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a, the UE 101 may perform the handover to the EPS or inter-system redirection using N26. The UE 101 may trigger a tracking area update (TAU) procedure.

In operation 6b, the UE 101 may perform inter-system redirection which does not use N26.

In operation 7, the SMF+PGW-C 122 may resume the setup of a dedicated bearer for the IMS voice. The SMF+PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the radio resource control (RRC) connection with the UE 101 for the reason of user inactivity. The reason of user inactivity may include the case in which the user does not receive a voice call within a predetermined time. The E-UTRAN 113 may use a timer to determine user inactivity.

In operation 9, the E-UTRAN 113 may trigger movement of the UE 101 to the 5GS and performance of a registration procedure after the procedure of releasing the RRC connection with the UE 101 in operation 8.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF.

In operation 12, the NG-RAN 103 selecting the AMF in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13b, the MME 115 receiving the context request message in operation 13a may transmit a context response message to the AMF 105. The context response message may include EPS bearer context(s). The EPS bearer context(s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice and the bearer having the QCI=1 are interchangeably used.

In operation 14, the AMF 105 may perform an authentication and/or security procedure required for the network with the UE 101. The AMF 105 may transmit and receive required information to and from the UE 101, the NG-RAN 103, an authentication server function (AUSF) 201, and/or the HSS+UDM 124. Specifically, the AMF 105 may perform a UE context setup procedure with the NG-RAN 103 through a next generation application protocol (NGAP). The UE context may include PDU session context, the security key, a mobility restriction list, a UE radio capability, and/or UE security capabilities.

In operation 14c-1, the AMF 105 may transmit an initial context setup request message to the NG-RAN 103. The initial context setup request message may include an indicator indicating whether the UE 101 and/or the network support EPS fallback. An indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network do not support the voice service through the 5G system (for example, when the communication operator does not support a VoNR service), the AMF 105 may transmit the indicator of redirection for voice EPS fallback to the NG-RAN 103.

Further, when receiving EPS bearer context from the MME 115 in operation 13b, the AMF 105 may insert the EPS bearer context into the initial context setup request message. Specifically, after inserting the EPS bearer context into the PDU session resource setup list, the AMF 105 may transmit information in the form in which the PDU session resource setup list is inserted into the initial context setup request message to the NG-RAN 103. The AMF 105 may transmit the EPS bearer context for the dedicated bearer (or the bearer having the QCI of 1) for the IMS voice to the NG-RAN 103 in operation 13b.

In operation 14c-2, the NG-RAN 103 receiving the initial context setup request message from the AMF 105 in operation 14c-1 may determine whether to perform EPS fallback. The NG-RAN 103 may determine whether to perform EPS fallback in consideration of whether a request for the indicator of redirection for voice EPS fallback and/or the PDU session resource setup for the dedicated bearer for the IMS voice is received from the AMF 105, the NG-RAN configuration, and the like. For example, when the indicator of redirection for voice EPS fallback indicates supporting of the EPS fallback and the request for the PDU session resource setup for the dedicated bearer for the IMS voice is received, the NG-RAN 103 determine to perform the EPS fallback.

When it is determined to perform the EPS fallback, the NG-RAN 103 waits for a predetermined time rather than immediately triggering the EPS fallback procedure, and then perform a delayed fallback procedure of triggering the EPS fallback according to a separate request from the AMF 105 or a determination of the NG-RAN 103. The NG-RAN 103 may wait for a predetermined time by using a timer (for example, a delayed fallback timer). When the NG-RAN 103 receives a notification indicating that the delayed fallback procedure can be triggered from the AMF 105 before the expires after the time starts, when the NG-RAN 103 receives a notification indicating that a request for registering the UE from the AMF 105 and/or the UE 101 is accepted and the 5G-GUTI is allocated to the UE 101, or when an average time required for completing the procedure of registering the UE 101 has passed, the NG-RAN 103 may trigger the delayed fallback procedure. When receiving the request for the PDU session resource setup for the dedicated bearer for the IMS voice, the NG-RAN 103 may configure the timer for triggering the delayed fallback procedure to be longer or shorter than the case in which the performance of the EPS fallback is determined for another reason.

In operation 14c-3, the NG-RAN 103 determining to perform the EPS fallback in operation 14c-2 may inform the AMF 105 that the EPS fallback procedure has been triggered. When the NG-RAN 103 receives the request for the PDU session resource setup for the dedicated bearer for the IMS voice or desires to trigger the EPS fallback after the 5G-GUTI is allocated to the UE 101 for other reasons, the NG-RAN may inform the AMF 105 that the delayed fallback procedure has been triggered. For example, a delayed fallback triggered indicator may be inserted into an initial context setup response message and then transmitted to the AMF 105. The AMF 105 receiving the notification indicating that the delayed fallback procedure has been triggered may continuously perform the registration procedure corresponding to operations 15 to 24.

In operation 15, the AMF 105 receiving the notification indicating that the delayed fallback procedure has been triggered from the NG-RAN 103 in operation 14c-3 may transmit a context Ack signal to the MME 115 when the authentication and/or security procedure (operation 14) is successfully completed.

In operation 16, the AMF 105 may make a request for a subscriber concealed identifier (SUCI) to the UE 101 and receive the same.

In operation 17, the AMF 105 may perform mobility equipment (ME) identity check with an equipment identity register (EIR) (or a 5G-EIR) 203. The EIR 203 performs a function of checking a permanent equipment identifier (PEI) of the UE 101 and checks the PEI of the UE 101 during the authentication procedure in the network. A representative example of the PEI is an international mobile equipment identity (IMEI).

In operation 18, the AMF 105 may select the HSS+UDM 124 by using an SUCI provided by the UE 101, a subscription permanent identifier (SUPI) converted from the SUCI, a home network identifier (for example, MNC and MCC, or realm) included in the SUCI or the SUPI, a UDM group ID, and the like.

In operation 19a, the AMF 105 may perform a procedure of Nudm_UECM_Registration for registering the HSS+UDM 124 selected in operation 18 and the UE 101.

In operation 19b, the AMF 105 may perform a procedure of Nudm_SDM_Get with the HSS+UDM 124.

In operation 19c, the AMF 105 may perform a procedure of Nudm_SDM_Subscribe with the HSS+UDM 124.

In operation 20, the AMF 105 may select the PCF+PCRF 123 by using the SUPI, S-NSSAI(s), the PCF group ID included in the SUPI, or a PCF set ID.

In operation 21, the AMF may perform a procedure of AM policy association establishment or AM policy association modification with the PCF+PCRF 123 selected in operation 20.

In operation 22, the HSS+UDM 124 may transmit a cancel location message to the MME 115 and ask the MME 115 to delete or not to store any more information such as MM context of the UE 101.

In operation 23, the MME 115 receiving the cancel location message from the HSS+UDM 124 in operation 22 may transmit a cancel location ack signal to the HSS+UDM 124 after deleting the information such as the MM context of the UE 101.

In operation 23a, the MME 115 may transmit a delete session request message to the serving gateway while transmitting the cancel location ack signal to the HSS+UDM 124 in operation 23.

In operation 24, when determining to accept the registration request from the UE 101, the AMF 105 may transmit a registration accept message to the UE 101 through the NG-RAN 103. The registration accept message may include the 5G-GUTI for the UE 101.

In operation 24a, when the AMF 105 receiving the notification that the delayed fallback procedure has been triggered from the NG-RAN 103 in operation 14c-3 may determine to accept the registration request from the UE 101 and transmits the 5G-GUTI (operation 24), the AMF may transmit an indicator indicating the stop of waiting for the delayed fallback procedure and the performance of the procedure to the NG-RAN 103. For example, a delayed fallback start indicator may be inserted in to an N2 request message and transmitted to the NG-RAN 103. The message may be transmitted when the registration accept message in operation 24 is transmitted to the NG-RAN 103 or transmitted before or after the registration accept message.

In operation 24b, the AMF 105 transmitting the registration accept message in operation 24 may perform a UE policy association establishment procedure with the PCF.

Operations 24, 24a, and 24b described above may be performed in the order described above, or operation 24a may be first performed, operation 24 may be performed, and then operation 24b may be performed. Meanwhile, when a registration reject message is received in operation 24, operation 24b may be performed without operation 24a.

In operation 25, the NG-RAN 103 receiving the notification indicating that the delayed fallback procedure can start from the AMF 105 in operation 24a may wait for a predetermined time without starting the delayed fallback procedure until the UE 101 receives the 5G-GUTI of operation 24. When operation 24a is performed after operation 26, operation 25 may be omitted.

In operation 26, the UE 101 receiving the registration accept message from the AMF 105 in operation 24 may transmit a registration complete message to the AMF 105.

In operation 27, the NG-RAN 103 may trigger the delayed fallback procedure.

In operation 28, the NG-RAN 103 may perform redirection or handover of the UE 101 to the EPS.

In operation 29a-1, the UE 101 may trigger a TAU procedure in order to be connected to the EPS.

In operation 29a-2, the UE 101 may transmit a TAU request message to the E-UTRAN. The TAU request may include an EPS-GUTI converted from the 5G-GUTI received in operation 24 and an indicator (for example, "moving from 5GS") indicating that the UE 101 has moved from the 5GS to the EPS.

In operation 29a-3, the E-UTRAN 113 receiving the TAU request in operation 29a-2 may transfer the TAU request to the MIME 115.

In operation 29a-4, the MME 115 receiving the TAU request in operation 29a-3 continuously performs the TAU procedure for the UE 101.

In operation 29b, the UE 101 may perform inter-system redirection which does not use N26.

In operation 30, the SMF+PGW-C 122 may resume the setup of the dedicated bearer for the IMS voice.

Figure 3B:
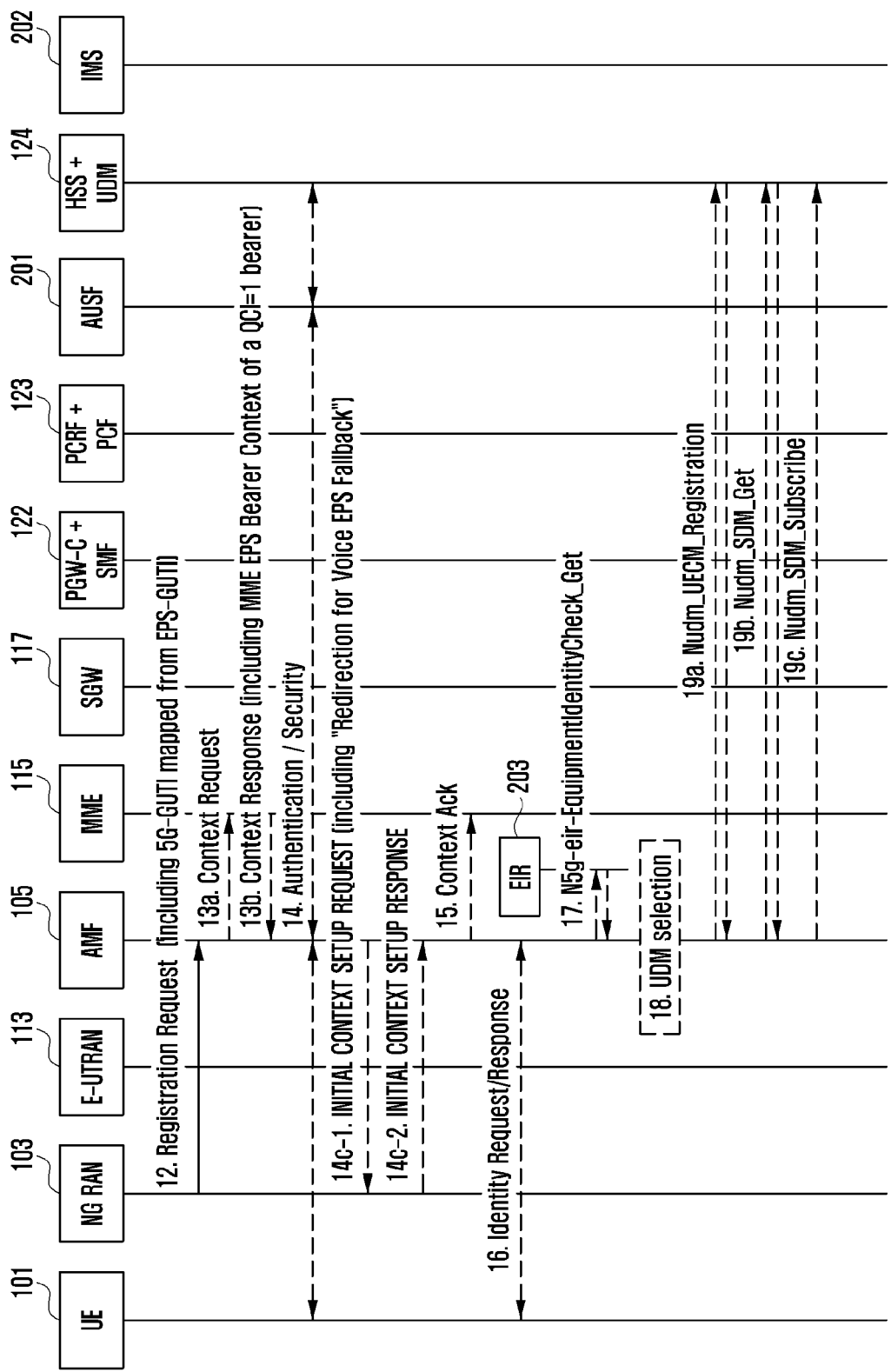
FIG. 3B illustrates a method of registering a UE and managing a session through a delayed fallback triggering procedure by an AMF according to an embodiment of the disclosure.
Figure 3C:
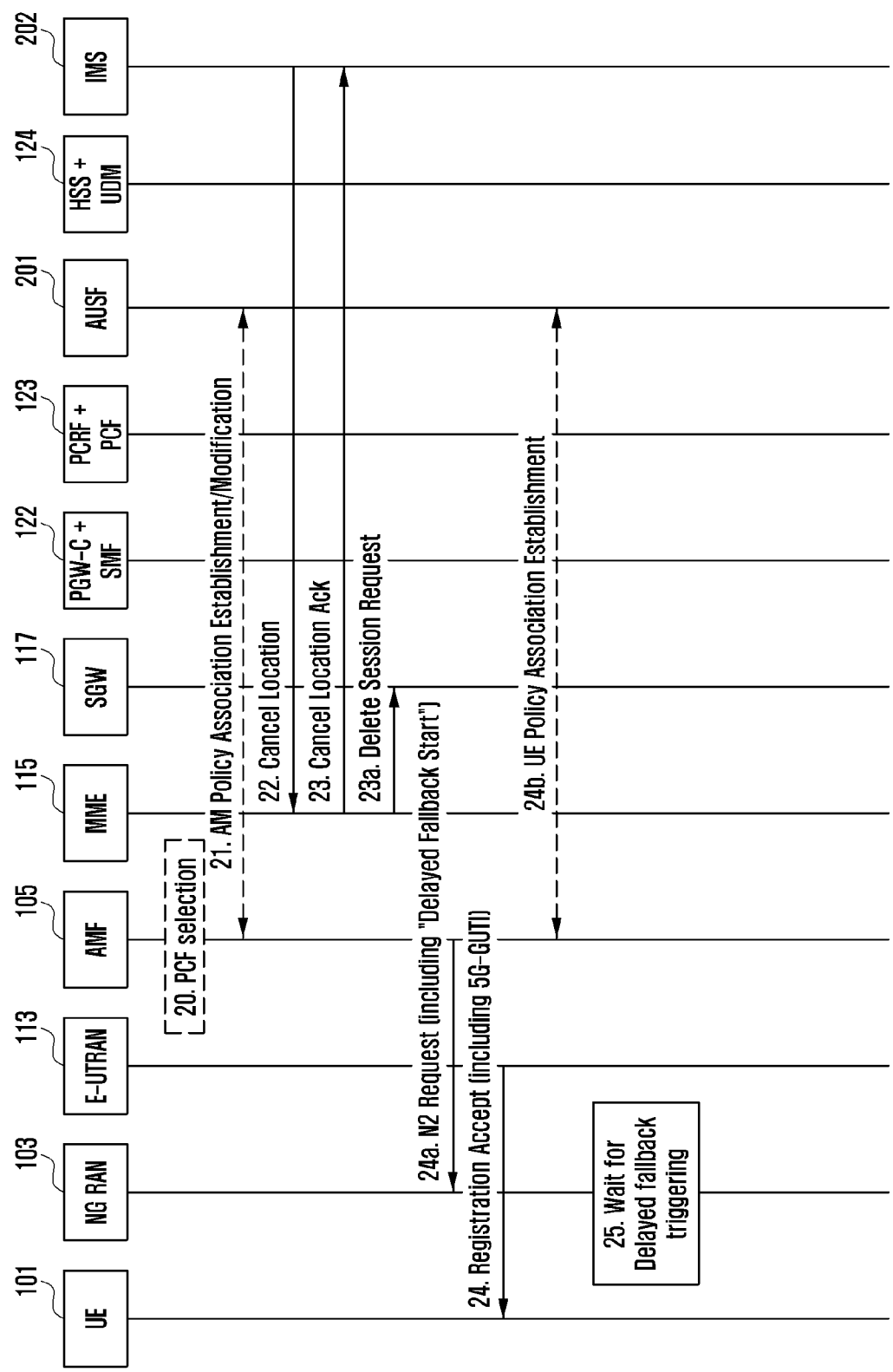
FIG. 3C illustrates a method of registering a UE and managing a session through a delayed fallback triggering procedure by an AMF according to an embodiment of the disclosure.
Figure 3D:
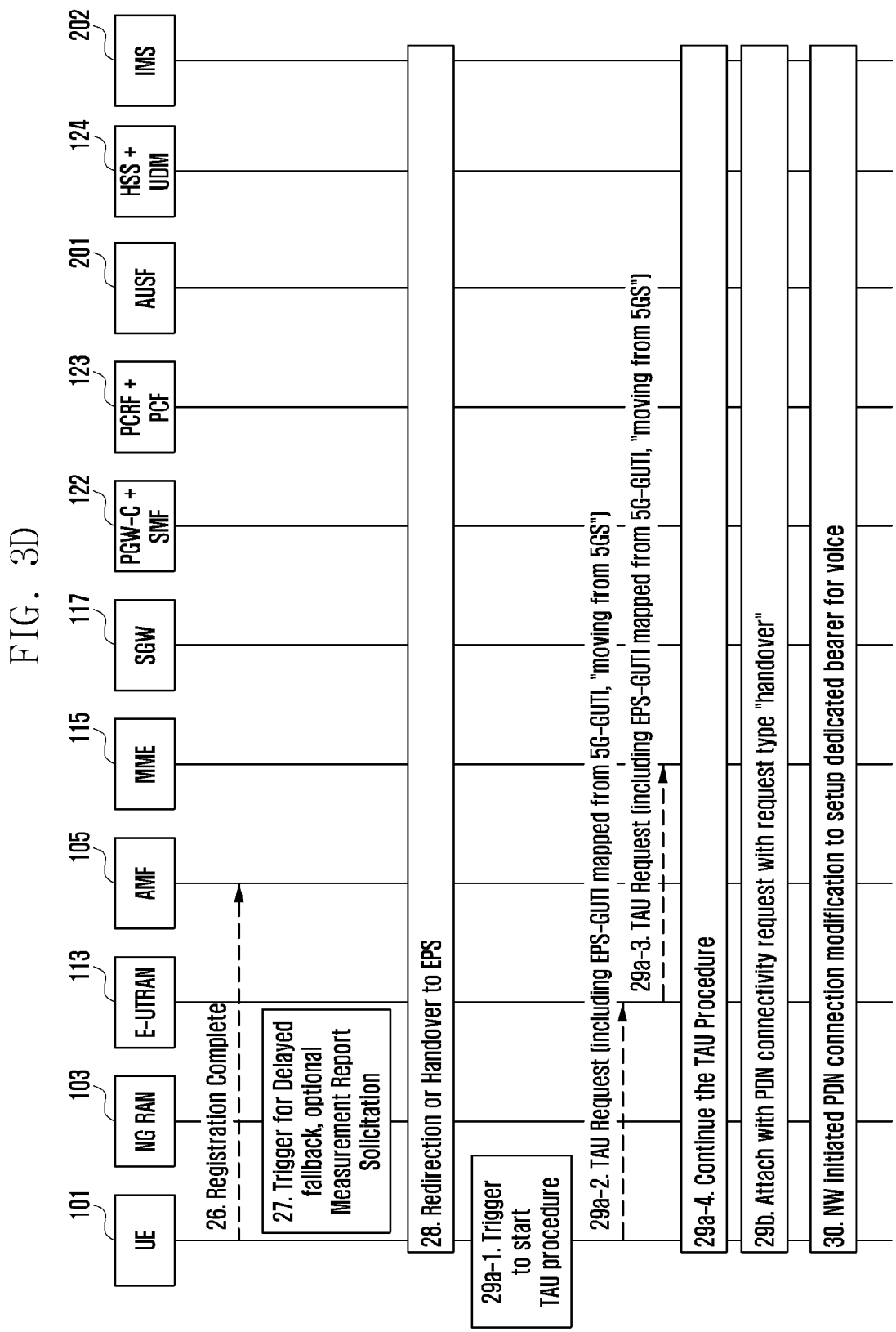
FIG. 3D illustrates a method of registering a UE and managing a session through a delayed fallback triggering procedure by an AMF according to an embodiment of the disclosure.

FIG. 3A illustrates a method of registering a UE and managing a session through a delayed fallback triggering procedure by an AMF according to an embodiment of the disclosure, FIG. 3B illustrates a method of registering a UE and managing a session through a delayed fallback triggering procedure by an AMF according to an embodiment of the disclosure, FIG. 3C illustrates a method of registering a UE and managing a session through a delayed fallback triggering procedure by an AMF according to an embodiment of the disclosure, and FIG. 3D illustrates a method of registering a UE and managing a session through a delayed fallback triggering procedure by an AMF according to an embodiment of the disclosure.

Prior to description of the embodiment of the disclosure made with reference to FIGS. 3A to 3D, reference numerals which are the same as those in FIG. 1 are used for respective NFs and the UE described in FIG. 1.

Further, FIGS. 3A to 3C are described on the basis of the sequential order. For example, a flowchart of FIG. 3B is described after a flowchart of FIG. 3A and then a flowchart of FIG. 3C is described, and lastly a flowchart of FIG. 3D is described. In the actual implementation, the order of FIGS. 3A to 3D which is the same as the scheme described in the disclosure may be used. In another example, only some of FIGS. 3A to 3D may be sequentially implemented. That is, some orders of FIGS. 3A to 3D may be omitted or may not be performed. In another example, some orders of FIGS. 3A to 3D may be performed in parallel or the orders may be changed. Further, the description made with reference to another figure may be inserted into the middle of the flowcharts of FIGS. 3A to 3D.

In addition, operations in blocks between respective NFs may have a plurality of signal flows between respective NFs and/or the UE and the NF in FIGS. 3A to 3D. Referring to FIGS. 3A to 3D, it should be noted that only description of the overall operation is made in operations in blocks rather than stating all individual signal flows. Further, in the following description, each of FIGS. 3A, 3B, 3C, and 3D is indicated as FIG. 3 unless FIGS. 3A, 3B, 3C, and 3D should be specifically distinguished. In the following description, a specific message may be used without a message/signal, a message, or a signal according to an expression method. For example, the RRC connection release may be expressed as an "RRC connection release message", an "RRC connection release signal", or an "RRC connection release", and all of them should be understood as having the same meaning.

In operation 1, for the UE 101 connected to the 5GS through the NG-RAN 103, mobile originated (MO) or mobile terminated (MT) IMS voice session establishment may be initiated.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN 103 may determine whether to trigger the EPS fallback. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 may not be performed. When the NG-RAN 103 does not receive the indicator of the redirection for EPS fallback for voice from the AMF 105, the NG-RAN 103 may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message may include an indicator indicating movement due to fallback for the IMS voice. The SMF+PGW-C 122 receiving the response message may maintain PCC rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a, the UE 101 may perform the handover to the EPS or inter-system redirection using N26. The UE 101 may trigger a TAU procedure.

In operation 6b, the UE 101 may perform inter-system redirection which does not use N26.

In operation 7, the SMF+PGW-C 122 may resume the setup of the dedicated bearer for the IMS voice. The SMF+PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the RRC connection with the UE 101 for the reason of user inactivity. The reason of user inactivity may include the case in which the user does not receive a voice call within a predetermined time. The E-UTRAN 113 may use a timer to determine user inactivity.

After the E-UTRAN 113 performs the procedure of releasing the RRC connection with the UE 101 in operation 8, the UE 101 moves to the 5GS and may perform a registration procedure, in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF 105.

In operation 12, the NG-RAN 103 selecting the AMF 105 in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13b, the MME 115 receiving the context request message in operation 13 may transmit a context request message to the AMF 105. The context response message may include EPS bearer context(s). The EPS bearer context(s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice or the bearer having the QCI=1 are interchangeably used.

In operation 14, the AMF 105 may perform an authentication and/or security procedure required for the network with the UE 101. The AMF 105 may transmit and receive required information to and from the UE 101, the NG-RAN 103, the AUSF 201, and/or the HSS+UDM 124. Specifically, the AMF 105 may perform a UE context setup procedure with the NG-RAN 103 through a next generation application protocol (NGAP). The UE context may include PDU session context, the security key, a mobility restriction list, a UE radio capability, and/or UE security capabilities.

In operation 14c-1, the AMF 105 may transmit an initial context setup request message to the NG-RAN 103. The initial context setup request message may include an indicator indicating whether the UE 101 and/or the network support EPS fallback. The indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network does not support the voice service through the 5G system (for example, when the communication operator does not support the VoNR service), the AMF 105 may transmit an indicator of redirection for voice EPS fallback to the NG-RAN 103.

Further, when receiving EPS bearer context from the MME 115 in operation 13b, the AMF 105 may determine whether to insert the EPS bearer context into the initial context setup request message. Specifically, the AMF 105 may determine not to insert some of the EPS bearer context into the initial context setup request message in consideration of whether the NG-RAN 103 corresponds to information that can be considered when it is determined whether to perform the EPS fallback and/or whether additional information should be provided to the UE 101 in order to normally perform the EPS registration procedure when the EPS fallback is triggered before the 5GS registration procedure of the UE 101 is completed. For example, the AMF 105 receives the EPS bearer context for the dedicated bearer (or the bearer having the QCI of 1) for the IMS voice in operation 13*b* and, when the AMF 105 determines that the UE 101 and/or the network support EPS fallback and determines to inform the NG-RAN 103 of the same by using the indicator of the redirection for voice EPS fallback, may not insert the EPS bearer context for the dedicated bearer for the IMS voice into the initial context setup request message.

In operation 14*c*-2, the NG-RAN 103 receiving the initial context setup request message from the AMF 105 in operation 14*c*-1 may determine whether to perform EPS fallback. The NG-RAN 103 may determine whether to perform EPS fallback in consideration of whether a request for the indicator of redirection for voice EPS fallback and/or the PDU session resource setup for the dedicated bearer for the IMS voice is received from the AMF 105, the NG-RAN configuration, and the like. For example, when the indicator of redirection for voice EPS fallback indicates supporting of the EPS fallback and the dedicated bearer for the IMS voice is not inserted into the request for the PDU session resource setup (the example of operation 14*c*-1), the NG-RAN 103 may determine not to perform the EPS fallback. After performing the initial context setup procedure, the NG-RAN 103 may transmit an initial context setup response message to the AMF 105. When receiving information indicating that the initial context setup procedure has been normally performed from the NG-RAN 103, the AMF 105 may continuously perform a registration procedure corresponding to operations 15 to 24.

In operation 15, the AMF 105 receiving the information indicating that the initial context setup procedure has been normally performed from the NG-RAN 103 in operation 14*c*-2 may transmit a context Ack to the MME 115 when the authentication and/or security procedure (operation 14) is successfully completed.

In operation 16, the AMF 105 may make a request for an SUCI to the UE 101 and receive the same.

In operation 17, the AMF 105 may perform ME identity check with the EIR 203.

In operation 18, the AMF 105 may select the HSS+UDM 124 by using an SUCI provided by the UE 101, an SUPI converted from the SUCI, a home network identifier (for example, MNC and MCC, or realm) included in the SUCI or the SUPI, a UDM group ID, and the like.

In operation 19*a*, the AMF 105 may perform a procedure of Nudm_UECM_Registration with the HSS+UDM 124.

In operation 19*b*, the AMF 105 may perform a procedure of Nudm_SDM_Get with the HSS+UDM 124.

In operation 19*c*, the AMF 105 may perform a procedure of Nudm_SDM_Subscribe with the HSS+UDM 124.

In operation 20, the AMF 105 may select the PCF+PCRF 123.

In operation 21, the AMF 105 may perform a procedure of AM policy association establishment or AM policy association modification with the selected PCF+PCRF 123.

In operation 22, the HSS+UDM 124 may transmit a cancel location message to the MME 115 and ask the MME 115 to delete or not to store any more information such as MM context of the UE 101.

After deleting information such as MM context of the UE 101, the MME 115 receiving a cancel location message from the HSS+UDM 124 in operation 22 may transmit a cancel location ack signal to the HSS+UDM 124, in operation 23.

In operation 23*a*, the MME 115 may transmit a delete session request to the serving gateway while transmitting the cancel location ack signal to the HSS+UDM 124, in operation 23.

In operation 24, when determining to accept the registration request from the UE 101, the AMF 105 may transmit a registration accept message to the UE 101 through the NG-RAN 103. The registration accept message may include the 5G-GUTI for the UE 101.

Although the EPS bearer context for the IMS voice is received from the MME 115 in operation 13*b*, the AMF 105 which does not insert the information into the initial context setup request message transmitted to the NG-RAN 103 in operation 14*c*-1 may make a request for performing a delayed fallback procedure to the NG-RAN 103, in operation 24*a*. For example, a delayed fallback start indicator and/or the reason why a request for performing the delayed fallback procedure is made may be inserted in to an N2 request message and transmitted to the NG-RAN 103. The reason why the request for performing the delayed fallback procedure is made may include the existence of EPS bearer context for the dedicated bearer for the IMS voice. The message may be transmitted when the registration accept message in operation 24 is transmitted to the NG-RAN 103 or transmitted before or after the registration accept message.

In operation 24*b*, the AMF 105 transmitting the registration accept message in operation 24 may perform a UE policy association establishment procedure with the PCF.

Operations 24, 24*a*, and 24*b* described above may be performed in the order described above, or operation 24*a* may be first performed, operation 24 may be performed, and then operation 24*b* may be performed. Meanwhile, when a registration reject message is received in operation 24, operation 24*b* may be performed without operation 24*a*.

In operation 25, the NG-RAN 103 receiving the request for performing the delayed fallback procedure from the AMF 105 in operation 24*a* may wait for a predetermined time without starting the delayed fallback procedure until the UE 101 receives the 5G-GUTI of operation 24. When operation 24*a* is performed after operation 26, operation 25 may be omitted.

When there are other reasons such that the case in which the reason why the request for the delayed fallback from the AMF 105 is made in operation 24*a* does not match a method by which the NG-RAN 103 determines the EPS fallback, the UE 101 does not support the EPS fallback, a radio condition has difficulty in performing the EPS fallback, or there is a separate configuration in the NG-RAN 103, the NG-RAN 103 may determine not to perform the delayed fallback. When the NG-RAN 103 does not perform the delayed fallback according to the delayed fallback request of the AMF 105, the content including rejection of the delayed fallback request may be transmitted to the AMF 105 through an N2 message. When the NG-RAN 103 accept the delayed request of the AMF 105, the content including the same may be transmitted to the AMF 105 through an N2 message.

In operation 26, the UE receiving the registration accept message from the AMF 105 in operation 24 may transmit a registration complete message to the AMF 105.

In operation 27, the NG-RAN 103 may trigger the delayed fallback procedure.

In operation 28, the NG-RAN 103 may perform redirection or handover of the UE 101 to the EPS.

In operation 29*a*-1, the UE 101 may trigger a TAU procedure in order to be connected to the EPS.

In operation 29a-2, the UE 101 may transmit a TAU request message to the E-UTRAN 113. The TAU request message may include an EPS-GUTI converted from the 5G-GUTI received in operation 24 and an indicator (for example, "moving from 5GS") indicating that the UE 101 has moved from the 5GS to the EPS.

In operation 29a-3, the E-UTRAN 113 receiving the TAU request message in operation 29a-2 may transfer the TAU request message to the MME 115.

In operation 29a-4, the MME 115 receiving the TAU request message in operation 29a-3 continuously performs the TAU procedure for the UE 101.

In operation 29b, the UE 101 may perform inter-system redirection which does not use N26.

In operation 30, the SMF+PGW-C 122 may resume the setup of the dedicated bearer for the IMS voice.

Figure 4B:
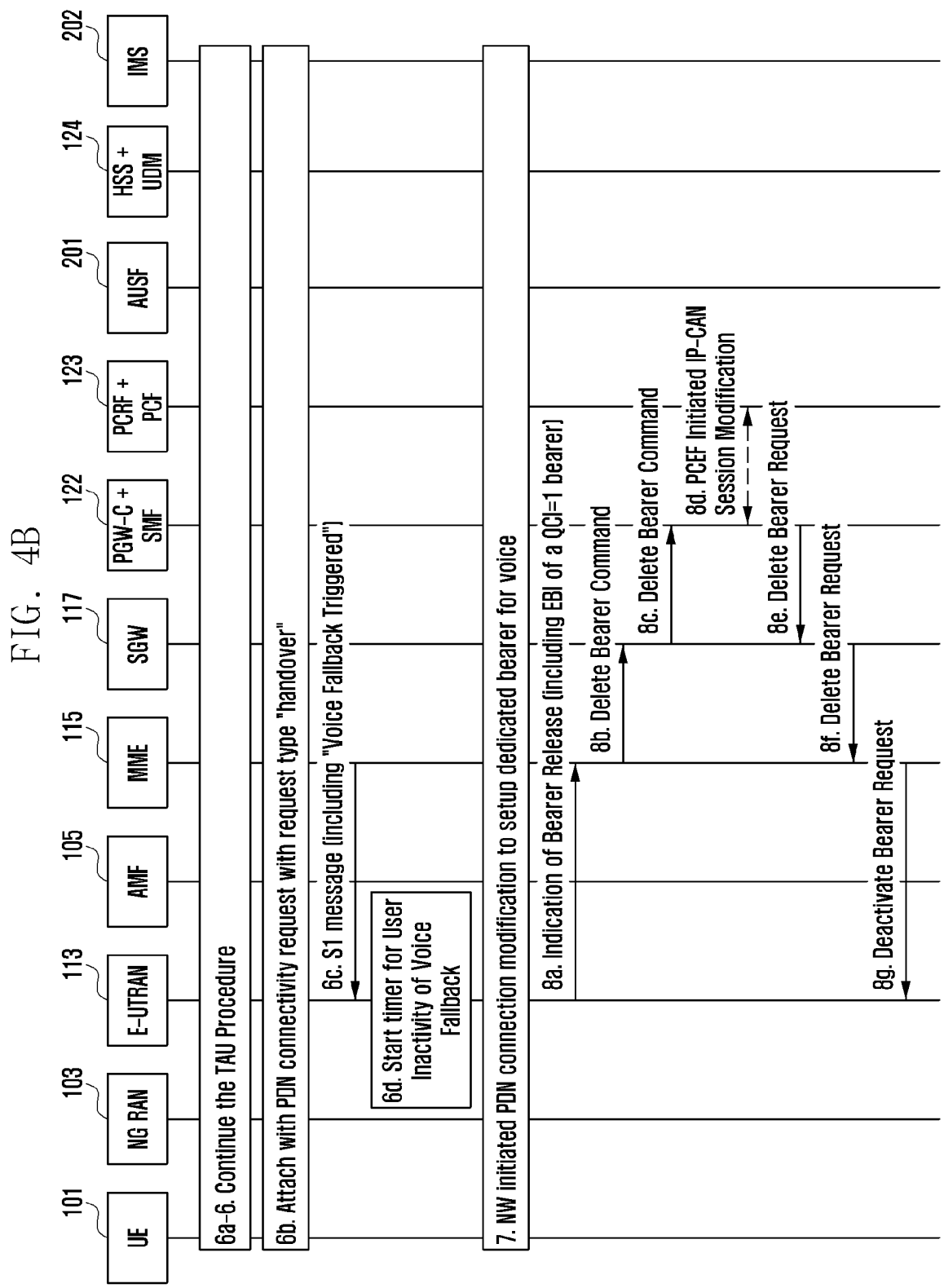
FIG. 4B illustrates a method of registering a UE and managing a session through a bearer deactivation procedure by an MME according to an embodiment of the disclosure.
Figure 4C:
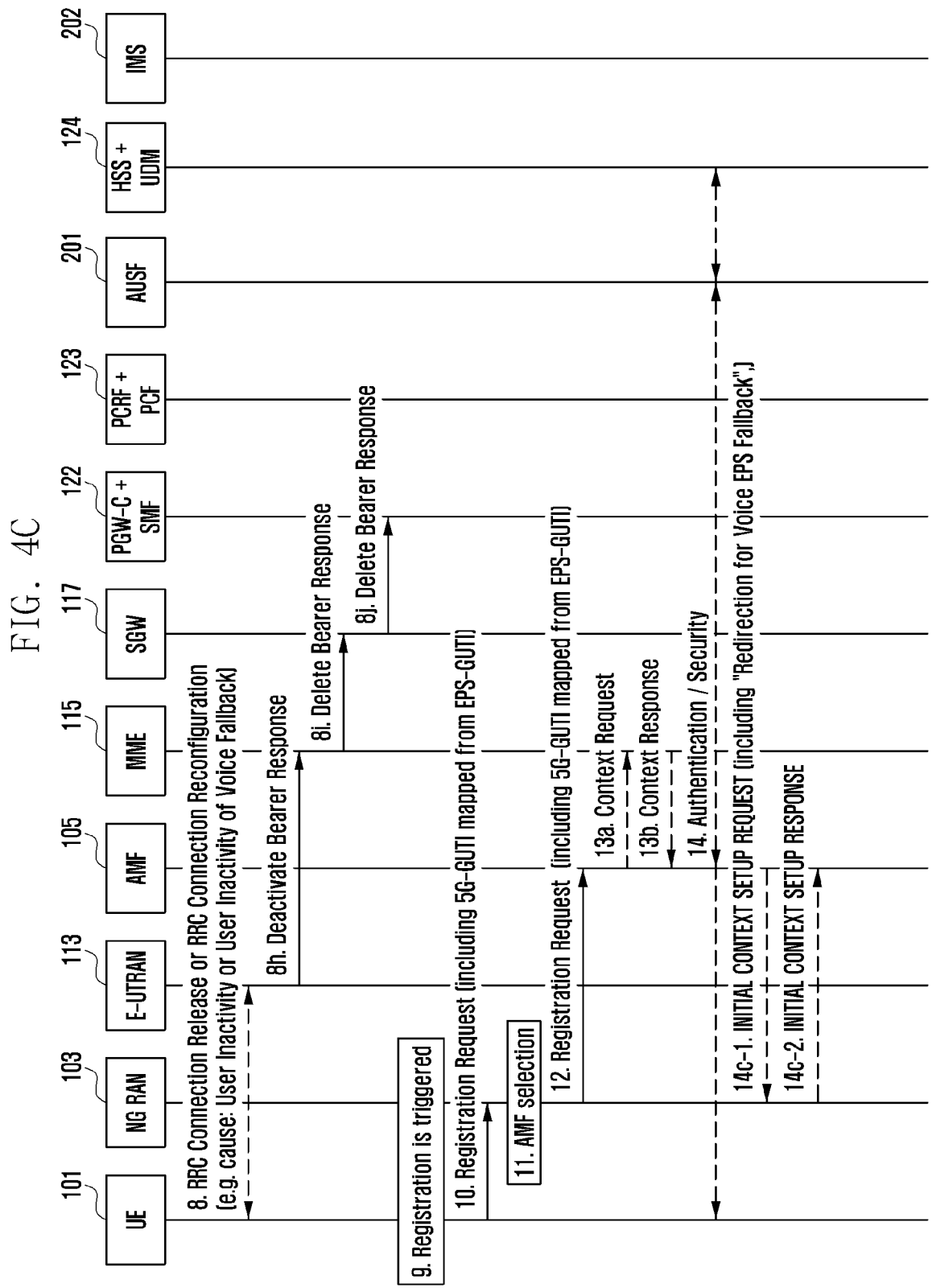
FIG. 4C illustrates a method of registering a UE and managing a session through a bearer deactivation procedure by an MME according to an embodiment of the disclosure.

FIG. 4A illustrates a method of registering a UE and managing a session through a bearer deactivation procedure by an MME according to an embodiment of the disclosure, FIG. 4B illustrates a method of registering a UE and managing a session through a bearer deactivation procedure by an MME according to an embodiment of the disclosure, FIG. 4C illustrates a method of registering a UE and managing a session through a bearer deactivation procedure by an MME according to an embodiment of the disclosure, and FIG. 4D illustrates a method of registering a UE and managing a session through a bearer deactivation procedure by an MME according to an embodiment of the disclosure.

Prior to description of the embodiment of the disclosure made with reference to FIGS. 4A to 4D, reference numerals which are the same as those in FIG. 1 are used for respective NFs and the UE described in FIG. 1.

Further, FIGS. 4A to 4D are described on the basis of the sequential flow. For example, a flowchart of FIG. 4B is described after a flowchart of FIG. 4A and then a flowchart of FIG. 4C is described, and lastly a flowchart of FIG. 4D is described. In the actual implementation, the order of FIGS. 4A to 4D which is the same as the scheme described in the disclosure may be used. In another example, only some of FIGS. 4A to 4D may be sequentially implemented. That is, some orders of FIGS. 4A to 4D may be omitted or may not be performed. In another example, some orders of FIGS. 4A to 4D may be performed in parallel or the orders may be changed. Further, the description made with reference to any figure may be inserted into the middle of the flowcharts of FIGS. 4A to 4D.

In addition, operations in blocks between respective NFs may have a plurality of signal flows between respective NFs and/or the UE and the NF in FIGS. 4A to 4D. Referring to FIGS. 4A to 4D, it should be noted that only description of the overall operation is made in operations in blocks rather than stating all individual signal flows. In the following description, each of FIGS. 4A, 4B, 4C, and 4D is indicated as FIG. 4 unless FIGS. 4A, 4B, 4C, and 4D should be specifically distinguished. In the following description, a specific message may be used without a message/signal, a message, or a signal according to an expression method. For example, the RRC connection release may be expressed as an "RRC connection release message", an "RRC connection release signal", or an "RRC connection release", and all of them should be understood as the same meaning.

In operation 1, for the UE 101 connected to the 5GS through the NG-RAN 103, mobile originated (MO) or mobile terminated (MT) IMS voice session establishment may be initiated.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN may determine whether to trigger the EPS fallback. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 may not be performed. When the NG-RAN 103 does not receive the indicator of the redirection for EPS fallback for voice from the AMF 105, the NG-RAN may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message may include an indicator indicating movement due to fallback for the IMS voice. The SMF+PGW-C 122 receiving the response message may maintain PCC rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a-1, the UE 101 may perform the handover to the EPS or inter-system redirection using N26. The UE 101 may trigger a TAU procedure.

In operation 6a-2, the UE 101 may transmit a TAU request message to the E-UTRAN 113.

In operation 6a-3, the E-UTRAN 113 receiving the TAU request in operation 6a-2 may transfer the TAU request message to the MME 115.

In operation 6a-4, the MME 115 receiving the TAU request message in operation 6a-3 may transmit a context request message to the AMF 105. The MME 115 may make a request for user information through the message.

In operation 6a-5, the AMF 105 receiving the context request message in operation 6a-4 may transmit a context response message to the MME 115. The AMF 105 may insert an indicator (for example, voice fallback triggered) indicating that the UE 101 receives a request for information through the context request message performs the EPS fallback for the IMS voice into the context response message.

In operation 6a-6, the MME 115 and the UE 101 receiving the context response message may continuously perform the TAU procedure.

In operation 6b, the UE 101 may perform inter-system redirection which does not use N26.

In operation 6c, the MME 115 receiving the indicator indicating that the UE 101 makes a request for the TAU procedure due to the EPS fallback procedure for the IMS voice in operation 6a-5 may transfer the indicator to the E-UTRAN 113. Operation 6c may be performed after operation 6a-5.

In operation 6d, the E-UTRAN 113 receiving the message of operation 6c may determine (or identify) whether the user does not receive a voice call for a predetermined time after the voice fallback procedure is triggered. The E-UTRAN 113 may start a timer to recognize user inactivity. Operation 6d may be performed after operation 7.

In operation 7, the SMF+PGW-C 122 may resume the setup of the dedicated bearer for the IMS voice. The SMF+PGW-C 122 may use information for mapping the PCC rule(s) and the 5G QoS associated with the QoS flow for the IMS voice maintained in operation 4 to EPS QoS parameters.

When determining (or identifying) the user inactivity, the E-UTRAN 113 may make a request for releasing the bearer for the IMS voice to the MME 115, in operation 8a. The request may include an indicator indicating the bearer to be released using an EPS bearer identity (EBI) of the bearer for the IMS voice or an EBI of the bearer having a QCI value of 1.

In operation 8b, the MME 115 may transmit a delete bearer command message to the SGW 117.

In operation 8c, the SGW 117 may transfer the delete bearer command message to the PGW-C+SMF 122.

In operation 8d, the PGW-C+SMF 122 and the PCF+PCRF 123 may perform a procedure of PCEF initiated IP-can session modification.

In operation 8e, the PCF+PCRF 123 may transmit a delete bearer request message to the SGW 117.

In operation 8f, the SGW 117 may transmit a delete bearer request message to the MME 115. In operation 8g, the MME 115 may transmit a deactivate bearer request message to the E-UTRAN 113.

In operation 8, the E-UTRAN 113 may perform a procedure of releasing or reconfiguring the RRC connection with the UE 101 by reason that the user activity is determined after the voice fallback is triggered.

In operation 8h, the E-UTRAN 113 may transmit a deactivate bearer response message to the MIME 115.

In operation 8i, the MME 115 may transmit a delete bearer response message to the SGW 117.

In operation 8j, the SGW 117 may transmit the delete bearer response message to the PGW-C+SMF 122.

After the E-UTRAN 113 performs the procedure of releasing the RRC connection with the UE 101 in operation 8, the UE 101 moves to the 5GS and may perform a registration procedure, in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request as the native 5G-GUTI. The UE 101 may insert an indicator (for example, "moving from EPS") indicating movement from the EPS to the 5GS into the registration request.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF 105.

In operation 12, the NG-RAN 103 selecting the AMF 105 in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13b, the MME 115 receiving the context request message in operation 13 may transmit a context request message to the AMF 105. The context response message may include EPS bearer context(s). The EPS bearer context(s) may include information related to the EPS bearer which is not released in the EPS before the UE 101 moves to the 5GS, and when the procedure of releasing the bearer for the IMS voice is performed in operations 8a to 8j, does not include information on the dedicated bearer for the IMS voice.

In operation 14, the AMF 105 may perform an authentication and/or security procedure required for the network with the UE 101. The AMF 105 may transmit and receive required information to and from the UE 101, the NG-RAN 103, the AUSF 201, and/or the HSS+UDM 124. Specifically, the AMF 105 may perform a UE context setup procedure with the NG-RAN 103 through a next generation application protocol (NGAP). The UE context may include PDU session context, the security key, a mobility restriction list, a UE radio capability, and/or UE security capabilities.

In operation 14c-1, the AMF 105 may transmit an initial context setup request message to the NG-RAN 103. The initial context setup request message may include an indicator indicating whether the UE 101 and/or the network support EPS fallback. The indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network does not support the voice service through the 5G system (for example, when the communication operator does not support the VoNR service), the AMF 105 may transmit the indicator of redirection for voice EPS fallback to the NG-RAN 103.

In operation 14c-2, the NG-RAN 103 receiving the initial context setup request message from the AMF 105 in operation 14c-1 may determine whether to perform EPS fallback. The NG-RAN 103 may determine whether to perform EPS fallback in consideration of whether a request for the indicator of redirection for voice EPS fallback and/or the PDU session resource setup for the dedicated bearer for the IMS voice is received from the AMF 105, the NG-RAN configuration, and the like. After performing the initial context setup procedure, the NG-RAN 103 may transmit an initial context setup response message to the AMF 105. When receiving information indicating that the initial context setup procedure has been normally performed from the NG-RAN 103, the AMF 105 may continuously perform a registration procedure corresponding to operations 15 to 24.

In operation 15, the AMF 105 receiving the notification indicating that the delayed fallback procedure has been triggered from the NG-RAN 103 in operation 14c-3 may transmit a context ack signal to the MME 115 when the authentication and/or security procedure (operation 14) is successfully completed.

In operation 16, the AMF 105 may make a request for an SUCI to the UE 101 and receive the same.

In operation 17, the AMF 105 may perform ME identity check with the EIR 203.

In operation 18, the AMF 105 may select the HSS+UDM 124 by using an SUCI provided by the UE 101, an SUPI converted from the SUCI, a home network identifier (for example, MNC and MCC, or realm) included in the SUCI or the SUPI, a UDM group ID, and the like.

In operation 19a, the AMF 105 may perform a Nudm_UECM_Registration procedure with the HSS+UDM 124.

In operation 19b, the AMF 105 may perform a procedure of Nudm_SDM_Get with the HSS+UDM 124.

In operation 19c, the AMF 105 may perform a procedure of Nudm_SDM_Subscribe with the HSS+UDM 124.

In operation 20, the AMF 105 may select the PCF+PCRF 123.

In operation 21, the AMF 105 may perform a procedure of AM policy association establishment or AM policy association modification with the selected PCF+PCRF 123.

In operation 22, the HSS+UDM 124 may transmit a cancel location message to the MME 115 and ask the MME 115 to delete or not to store any more information such as MM context of the UE 101.

After deleting information such as MM context of the UE 101, the MME 115 receiving a cancel location message from the HSS+UDM 124 in operation 22 may transmit a cancel location ack signal to the HSS+UDM 124, in operation 23.

In operation 23a, the MME 115 may transmit a delete session request message to the SGW 117 while transmitting the cancel location ack signal to the HSS+UDM 124 in operation 23.

In operation 24, when determining to accept the registration request from the UE 101, the AMF 105 may transmit a registration accept message to the UE 101 through the NG-RAN 103. The registration accept message may include the 5G-GUTI for the UE 101.

In operation 24b, the AMF 105 transmitting the registration accept message in operation 24 may perform a UE policy association establishment procedure with the PCF.

In operation 26, the UE receiving the registration accept message from the AMF 105 in operation 24 may transmit a registration complete message to the AMF 105.

Figure 5:
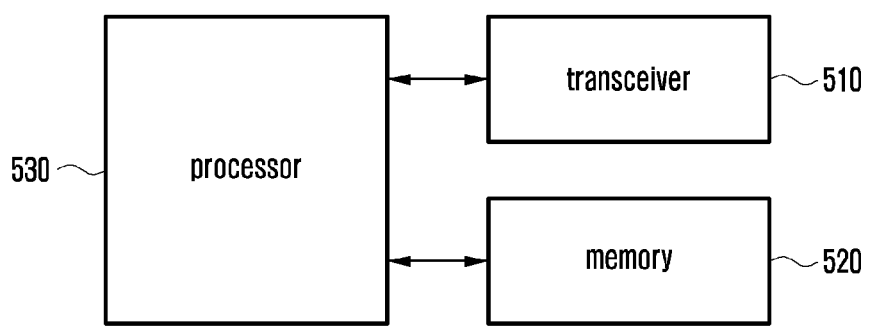
FIG. 5 illustrates a configuration of a UE according to an embodiment of the disclosure.

FIG. 5 illustrates a configuration of a UE according to an embodiment of the disclosure.

Referring to FIG. 5, the UE according to the disclosure may include a transceiver 510, a memory 520, and a processor 530. According to the communication method of the UE, the processor 530, the transceiver 510, and the memory 520 of the UE may operate. However, the elements of the UE are not limited to only the elements illustrated in FIG. 5. For example, the UE may include elements more or fewer than the elements illustrated in FIG. 5. Further, the processor 530, the transceiver 510, and the memory 520 may be implemented in the form of a single chip.

The transceiver 510 collectively refers to a receiver of the UE and a transmitter of the UE, and may transmit and receive a signal to and from a base station or a network entity. The signal transmitted and received to and from the base station may include control information and data. To this end, the transceiver 510 may include an RF transmitter for up-converting and amplifying a frequency of a transmitted signal and an RF receiver for low-noise amplifying a received signal and down-converting the frequency. However, this is only an embodiment of the transceiver 510, and the elements of the transceiver 510 are not limited to the RF transmitter and the RF receiver.

The transceiver 510 may include a wired/wireless transceiver and various elements for transmitting and receiving a signal. The transceiver 510 may receive a signal through a wireless channel, output the signal to the processor 530, and transmit the signal output from the processor 530 through a wireless channel. The transceiver 510 may receive a communication signal, output the communication signal to the processor 530, and transmit the signal output from the processor 530 to a network entity through a wired/wireless network.

The memory 520 may store programs and data required for the operation of the UE. The memory 520 may store control information or data included in signals (or messages) acquired by the UE. The memory 520 may be configured by storage media such as ROM, RAM, hard disc, CD-ROM, and DVD, or a combination of the storage media.

The processor 530 may control a series of processes for the operation of the UE according to the embodiments of the disclosure described in FIGS. 2A to 2D, 3A to 3D, 4A to 4D, 7A to 7D, 8A to 8E, and 9A to 9D described below. The processor 530 may include at least one processor. For example, the processor 530 may include a communication processor (CP) performing control such as modulation/demodulation and encoding/decoding of signals/messages/data required for communication and an application processor (AP) processing (or controlling) data/signals/messages processed by the communication processor in a higher layer such as an application.

Further, the UE may include devices such as an input device/output device for an interface with the user and devices such as a speaker and a microphone for processing a voice call through VoNR and/or the existing wireless network. The input device may include at least one of, for example, a touch screen, a touch pad, a stylus, a key, a voice recognition device, and a gesture recognition device. The output device may include at least one of, for example, a display, a vibration motor, a speaker, and a lamp.

Figure 6:
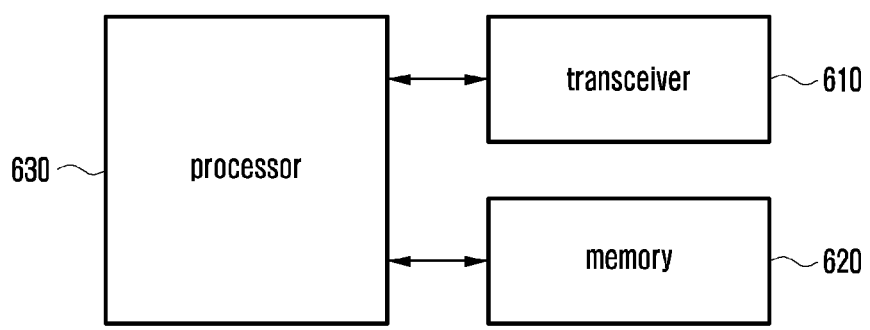
FIG. 6 illustrates a configuration of a network entity according to an embodiment of the disclosure.

FIG. 6 illustrates a configuration of a network entity according to an embodiment of the disclosure.

Referring to FIG. 6, the network entity of the disclosure may include a transceiver 610, a memory 620, and a processor 630. The network entity according to the disclosure may perform the operation of the communication method of each network entity in FIGS. 2A to 2D, 3A to 3D, and 4A to 4D described above and/or the operation according to the communication method of each network entity in FIGS. 7A to 7D, 8A to 8E, and 9A to 9D described below. The elements of the network entity are not limited to only the elements illustrated in FIG. 6. For example, the network entity may include elements more or fewer than the above elements. Further, the processor 630, the transceiver 610, and the memory 620 may be implemented in the form of a single chip or may be implemented in the form of an instance within a specific server. The network entity may be one network entity among the NG-RAN 103, the AMF 105, the UPF+PGW-U 121, the SMF+PGW-C 122, the PCF+PCRF 123, the HSS+UDM 124, the SWG 117, the MME 115, the E-UTRAN 113, the AUSF 201, an IMS 202, and the EIR 203 described above.

The transceiver 610 collectively refers to a receiver of the network entity and a transmitter of the network entity and may transmit and receive a signal to and from another network entity. At this time, the transmitted/received signal/message may include control information and data. When the network entity is, for example, a base station, the transceiver 610 may include an RF transmitter configured to up-convert and amplify a frequency of the transmitted signal and an RF receiver configured to low-noise amplify the received signal and down-convert a frequency. However, this is only an embodiment of the transceiver 610, and the elements of the transceiver 610 are not limited to the RF transmitter and the RF receiver. When the network entity is the AMF 105, the transceiver 910 may be a device for providing an interface with another network entity.

The memory 520 may store programs and data required for the operation of the network entity. The memory 620 may store control information or data included in the signal acquired by the network entity. The memory 620 may be configured by storage media such as ROM, RAM, hard disc, CD-ROM, and DVD, or a combination of the storage media.

The processor 630 may control a series of processes to allow the network entity to operate according to embodiments of the disclosure described above and/or the disclosure described below. The processor 630 may include at least one processor. Methods according to embodiments stated in claims and/or specifications of the disclosure may be implemented in hardware, software, or a combination of hardware and software.

When the network entity is implemented in software, the network entity may be provided using a computer-readable storage medium for storing one or more programs (software modules). The one or more programs stored in the computer-readable storage medium may be configured for execution by one or more processors within the electronic device or a specific server. The one or more programs may include instructions for allowing the electronic device to perform methods according to the claims of the disclosure and/or the embodiments stated in the specification.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, the programs may be stored in a memory configured by a combination of some or all of the listed components. Further, the number of configured memories may be plural.

In addition, the programs may be stored in an attachable storage device which may perform access through communication networks such as the Internet, Intranet, local area network (LAN), wide LAN (WLAN), and storage area network (SAN) or a combination thereof. The storage device may access a device performing embodiments of the disclosure through an external port. A separate storage device in a communication network may access the device performing embodiments of the disclosure.

In the description of FIGS. 2A to 2D, 3A to 3D, and 4A to 4D, the process of A to C may be performed when the operation (operation 24) in which the AMF 105 transmits the registration accept to the UE 101 rather than being performed as a portion of the operation (operation 14) in which the AMF 105 and the UE 101 perform the authentication and/or security procedure required for the network.

A process in which the AMF 105 transmits an initial context setup request message to the NG-RAN 103.

A process in which the NG-RAN 103 transmits an initial context setup response message to the AMF 105.

A process in which, when it is determined to perform the EPS fallback, the NG-RAN 103 waits for a predetermined time rather than immediately triggering the EPS fallback procedure, and then performs a delayed fallback procedure of triggering the EPS fallback according to a separate request from the AMF 105 or a determination of the NG-RAN 103.

Hereinafter, embodiments corresponding to the case in which the operation of A to C is performed when the operation (operation 24) in which the AMF 105 transmits the registration accept to the UE 101.

As an embodiment of the disclosure, FIGS. 2A to 2D may be changed as follows.

In operation 1, for the UE 101 connected to the 5GS through the NG-RAN 103, originated by a mobile originated (MO)-UE or terminated by a mobile terminated (MT)-UE IP-multimedia subsystem (IMS) voice session establishment may be initiated.

The IMS is a system for providing a multimedia service in an IP network and may provide a voice, a video, messaging, data, a web-based wired/wireless technology to the user through the connection with the EPS and 5GS core networks. A proxy-call session control function (P-CSCF) of the IMS may be connected to the PCF, the PCRF, or the PCF+PCRF of the 5GS/EPS core network, and an interrogating-call session control function (I-CSCF), a serving-call session control function (S-CSCF), and an application server (AS) of the IMF may be connected to the HSS, the UDM, or the HSS+UDM of the 5GS/EPS core network. The UE may be connected to the EPC through the E-UTRAN or the evolved packet data gateway (ePDG) or connected to the 5GS through the NG-RAN or the non-3GPP interworking function (N3IWF) to be registered and establish a session, and the EPC/5GS may perform a UE registration and session establishment procedure required for an entity/function of the IMS and an IMS-based voice service.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN may determine whether to trigger the EPS fallback on the basis of the following information. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 may not be performed. When the NG-RAN 103 does not receive the indicator of the redirection for EPS fallback for voice from the AMF 105, the NG-RAN may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message may include an indicator indicating movement due to fallback for the IMS voice. The SMF+PGW-C 122 receiving the response message may maintain policy and charging control (PCC) rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a, the UE 101 may perform the handover to the EPS or inter-system redirection using N26. The UE 101 may initiate a tracking area update (TAU) procedure.

In operation 6b, the UE 101 may perform inter-system redirection which does not use N26.

In operation 7, the SMF+PGW-C 122 may resume the setup of a dedicated bearer for the IMS voice. The SMF+PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the radio resource control (RRC) connection with the UE 101 for the reason of user inactivity. The reason of user inactivity may include the case in which the user does not receive a voice call within a predetermined time. The E-UTRAN 113 may use a timer to determine user inactivity.

After performing the procedure of releasing the RRC connection with the UE 101 in operation 8, the E-UTRAN 113 may trigger the UE 101 to move to the 5GS and perform a registration procedure in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF.

In operation 12, the NG-RAN 103 selecting the AMF in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13b, the MME 115 receiving the context request message in operation 13a may transmit a context request message to the AMF 105. The context response message may include EPS bearer context(s). The EPS bearer context(s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice or the bearer having the QCI=1 are interchangeably used.

In operation 14, the AMF 105 may perform an authentication and/or security procedure required for the network with the UE 101. The AMF 105 may transmit and receive required information to and from the UE 101, the NG-RAN 103, the AUSF 201, and/or the HSS+UDM 124. Specifically, the AMF 105 may perform a UE context setup procedure with the NG-RAN 103 through a next generation application protocol (NGAP). The UE context may include PDU session context, the security key, a mobility restriction list, a UE radio capability, and/or UE security capabilities.

The NG-RAN 103 and the AMF 105 may directly perform operation 15 without operations 14c-1 to 14c-3.

When the authentication and/or security procedure (operation 14) has successfully finished, the AMF 105 may transmit a context ack signal to the MME 115 in operation 15.

In operation 16, the AMF 105 may make a request for a subscriber concealed identifier (SUCI) to the UE 101 and receive the same.

In operation 17, the AMF 105 may perform mobility equipment (ME) identity check with an equipment identity register (EIR) (or a 5G-EIR) 203. The EIR 203 performs a function of checking a permanent equipment identifier (PEI) of the UE 101 and checks the PEI of the UE 101 during the authentication procedure in the network. A representative example of the PEI is an international mobile equipment identity (IMEI).

In operation 18, the AMF 105 may select the HSS+UDM 124 by using an SUCI provided by the UE 101, a subscription permanent identifier (SUPI) converted from the SUCI, a home network identifier (for example, MNC and MCC, or realm) included in the SUCI or the SUPI, a UDM group ID, and the like.

In operation 19a, the AMF 105 may perform a procedure of Nudm_UECM_Registration for registering the HSS+UDM 124 selected in operation 18 and the UE 101.

In operation 19b, the AMF 105 may perform a procedure of Nudm_SDM_Get with the HSS+UDM 124.

In operation 19c, the AMF 105 may perform a procedure of Nudm_SDM_Subscribe with the HSS+UDM 124.

In operation 20, the AMF 105 may select the PCF+PCRF 123 by using the SUPI, S-NSSAI(s), the PCF group ID included in the SUPI, or a PCF set ID.

In operation 21, the AMF may perform a procedure of AM policy association establishment or AM policy association modification with the PCF+PCRF 123 selected in operation 20.

In operation 22, the HSS+UDM 124 may transmit a cancel location message to the MME 115 and ask the MME 115 to delete or not to store any more information such as MM context of the UE 101.

After deleting information such as MM context of the UE 101, the MME 115 receiving a cancel location message from the HSS+UDM 124 in operation 22 may transmit a cancel location ack signal to the HSS+UDM 124 in operation 23.

In operation 23a, the MME 115 may transmit a delete session request message to the serving gateway while transmitting the cancel location ack signal to the HSS+UDM 124 in operation 23.

In operation 24, when determining to accept the registration request from the UE 101, the AMF 105 may transmit a registration accept message to the UE 101 through the NG-RAN 103. The registration accept message may include the 5G-GUTI for the UE 101.

The AMF 105 may perform operation 14c-1 simultaneously with operation 24 of after operation 24.

In operation 14c-1, the AMF 105 may transmit an initial context setup request message to the NG-RAN 103. The initial context setup request message may include an indicator indicating whether the UE 101 and/or the network support EPS fallback. The indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network does not support the voice service through the 5G system (for example, when the communication operator does not support the VoNR service), the AMF 105 may transmit the indicator of redirection for voice EPS fallback to the NG-RAN 103.

Further, when receiving EPS bearer context from the MME 115 in operation 13b, the AMF 105 may insert the EPS bearer context into the initial context setup request message. Specifically, after inserting the EPS bearer context into the PDU session resource setup list, the AMF 105 may transmit information in the form in which the PDU session resource setup list is inserted into the initial context setup request message to the NG-RAN 103. The AMF 105 may transmit the EPS bearer context for the dedicated bearer (or the bearer having the QCI of 1) for the IMS voice to the NG-RAN 103 in operation 13b.

The NG-RAN 103 may insert the registration accept message of operation 24 into the initial context setup request message.

In operation 14c-2, the NG-RAN 103 receiving the initial context setup request message from the AMF 105 in operation 14c-1 may determine whether to perform EPS fallback. The NG-RAN 103 may determine whether to perform EPS fallback in consideration of whether a request for the indicator of redirection for voice EPS fallback and/or the PDU session resource setup for the dedicated bearer for the IMS voice is received from the AMF 105, the NG-RAN configuration, and the like. For example, when the redirection for voice EPS fallback indicator indicates supporting of the EPS fallback and the request for the PDU session resource setup for the dedicated bearer for the IMS voice is received, the NG-RAN 103 determine to perform the EPS fallback.

When it is determined to perform the EPS fallback, the NG-RAN 103 waits for a predetermined time rather than immediately initiating the EPS fallback procedure, and then perform a delayed fallback procedure of initiating the EPS fallback according to a separate request from the AMF 105 or a determination of the NG-RAN 103. The NG-RAN 103 may wait for a predetermined time by using a timer (for example, a delayed fallback timer). When the NG-RAN 103 receives a notification indicating that initiation of the delayed fallback procedure is possible from the AMF 105 before the expires after the time starts, when the NG-RAN receives a notification indicating that a request for registering the UE from the AMF 105 and/or the UE 101 is accepted and the 5G-GUTI is allocated to the UE 101, or when an average time required for completing the procedure of registering the UE 101 has passed, the NG-RAN may initiate the delayed fallback procedure. When receiving the request for the PDU session resource setup for the dedicated bearer for the IMS voice, the NG-RAN 103 may configure the timer for initiating the delayed fallback procedure to be longer or shorter than the case in which the performance of the EPS fallback is determined for another reason.

In operation 14c-3, the NG-RAN 103 determining to perform the EPS fallback in operation 14c-2 may inform the AMF 105 of the initiation of the EPS fallback procedure. When the NG-RAN 103 receives the request for the PDU session resource setup for the dedicated bearer for the IMS voice or desires to initiate the EPS fallback after the 5G-GUTI is allocated to the UE 101 for other reasons, the NG-RAN may inform the AMF 105 of the initiation of the delayed fallback procedure. For example, a delayed fallback triggered indicator may be inserted into an initial context setup response message and then transmitted to the AMF 105.

In operation 24a, when the AMF 105 receiving the notification of the initiation of the delayed fallback procedure from the NG-RAN 103 in operation 14c-3 may determine to accept the registration request from the UE 101 and transmits the 5G-GUTI (operation 24), the AMF may transmit an indicator indicating the stop of waiting for the delayed fallback procedure and the performance of the procedure to the NG-RAN 103. For example, a delayed fallback start indicator may be inserted in to an N2 request message and transmitted to the NG-RAN 103. The message may be transmitted when the registration accept message in operation 24 is transmitted to the NG-RAN 103 or transmitted before or after the registration accept message.

In operation 24b, the AMF 105 transmitting the registration accept message in operation 24 may perform a UE policy association establishment procedure with the PCF.

Operations 24, 24a, and 24b described above may be performed in the order described above, or operation 24a may be first performed, operation 24 may be performed, and then operation 24b may be performed. Meanwhile, when a registration reject message is received in operation 24, operation 24b may be performed without operation 24a.

In operation 25, the NG-RAN 103 receiving the notification indicating the start of delayed fallback procedure from the AMF 105 in operation 24a may wait for a predetermined time without starting the delayed fallback procedure until the UE 101 receives the 5G-GUTI of operation 24. When operation 24a is performed after operation 26, operation 25 may be omitted.

In operation 26, the UE 101 receiving the registration accept message from the AMF 105 in operation 24 may transmit a registration complete message to the AMF 105. The registration accept message may be inserted into an uplink non-access-stratum (NAS) message which the UE 101 transmits to the network through the NG-RAN 103. When receiving the uplink NAS message from the UE 101, the NG-RAN 103 may end waiting for the performance of the delayed fallback procedure and perform operation 27.

In operation 27, the NG-RAN 103 may trigger the delayed fallback procedure.

In operation 28, the NG-RAN 103 may perform redirection or handover of the UE 101 to the EPS.

In operation 29a-1, the UE 101 may trigger a TAU procedure in order to be connected to the EPS.

In operation 29a-2, the UE 101 may transmit a TAU request message to the E-UTRAN. The TAU request may include an EPS-GUTI converted from the 5G-GUTI received in operation 24 and an indicator (for example, "moving from 5GS") indicating that the UE 101 has moved from the 5GS to the EPS.

In operation 29a-3, the E-UTRAN 113 receiving the TAU request in operation 29a-2 may transfer the TAU request to the MIME 115.

In operation 29a-4, the MME 115 receiving the TAU request in operation 29a-3 continuously performs the TAU procedure for the UE 101.

In operation 29b, the UE 101 may perform inter-system redirection which does not use N26.

In operation 30, the SMF+PGW-C 122 may resume the setup of the dedicated bearer for the IMS voice.

As an embodiment of the disclosure, FIGS. 3A to 3D may be changed as follows.

In operation 1, for the UE 101 connected to the 5GS through the NG-RAN 103, mobile originated (MO) or mobile terminated (MT) IMS voice session establishment may be initiated.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN may determine whether to trigger the EPS fallback. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 may not be performed. When the NG-RAN 103 does not receive the indicator of the redirection for EPS fallback for voice from the AMF 105, the NG-RAN may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message may include an indicator indicating movement due to fallback for the IMS voice. The SMF+PGW-C 122 receiving the response message may maintain PCC rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a, the UE 101 may perform the handover to the EPS or inter-system redirection using N26. The UE 101 may trigger a TAU procedure.

In operation 6b, the UE 101 may perform inter-system redirection which does not use N26.

In operation 7, the SMF+PGW-C 122 may resume the setup of the dedicated bearer for the IMS voice. The SMF+PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the RRC connection with the UE 101 for the reason of user inactivity. The reason of user inactivity may include the case in which the user does not receive a voice call within a predetermined time. The E-UTRAN 113 may use a timer to determine user inactivity.

After the E-UTRAN 113 performs the procedure of releasing the RRC connection with the UE 101 in operation 8, the UE 101 moves to the 5GS and may perform a registration procedure in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF 105.

In operation 12, the NG-RAN 103 selecting the AMF 105 in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13b, the MME 115 receiving the context request message in operation 13 may transmit a context request response message to the AMF 105. The context response message may include EPS bearer context(s). The EPS bearer context(s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice or the bearer having the QCI=1 are interchangeably used.

In operation 14, the AMF 105 may perform an authentication and/or security procedure required for the network with the UE 101. The AMF 105 may transmit and receive required information to and from the UE 101, the NG-RAN 103, the AUSF 201, and/or the HSS+UDM 124. Specifically, the AMF 105 may perform a UE context setup procedure with the NG-RAN 103 through a next generation application protocol (NGAP). The UE context may include PDU session context, the security key, a mobility restriction list, a UE radio capability, and/or UE security capabilities.

The NG-RAN 103 and the AMF 105 may directly perform operation 15 without operations 14c-1 to 14c-3.

When the authentication and/or security procedure (operation 14) has successfully finished, the AMF 105 may transmit a context ack to the MME 115 in operation 15.

In operation 16, the AMF 105 may make a request for an SUCI to the UE 101 and receive the same.

In operation 17, the AMF 105 may perform ME identity check with the EIR 203.

In operation 18, the AMF 105 may select the HSS+UDM 124 by using an SUCI provided by the UE 101, an SUPI converted from the SUCI, a home network identifier (for example, MNC and MCC, or realm) included in the SUCI or the SUPI, a UDM group ID, and the like.

In operation 19a, the AMF 105 may perform a Nudm_UECM_Registration procedure with the HSS+UDM 124.

In operation 19b, the AMF 105 may perform a procedure of Nudm_SDM_Get with the HSS+UDM 124.

In operation 19c, the AMF 105 may perform a procedure of Nudm_SDM_Subscribe with the HSS+UDM 124.

In operation 20, the AMF 105 may select the PCF+PCRF 123.

In operation 21, the AMF 105 may perform a procedure of AM policy association establishment or AM policy association modification with the selected PCF+PCRF 123.

The AMF 105 may make a request for establishing and/or reactivating a PDU session to the PGW-C+SMF 122. The corresponding PDU session may be determined with reference to PDN connection information received from the UE 101 or the MME 115. The request for reactivating the PDU session may be transmitted through a Nsmf_PDUSession_CreateSMContext Request message. When the request for establishing and/or reactivating the PDU session corresponding to the PDN connection having the QCI value of 1 is included, the PGW-C+SMF 122 may reject the request for establishing and/or reactivating the PDU session corresponding to the PDN connection having the QCI value of 1, and an indicator indicating rejection may be transmitted to the AMF 105 through a Nsmf_PDUSession_CreateSMContext Response message.

In operation 22, the HSS+UDM 124 may transmit a cancel location message to the MME 115 and ask the MME 115 to delete or not to store any more information such as MM context of the UE 101.

After deleting information such as MM context of the UE 101, the MME 115 receiving a cancel location message from the HSS+UDM 124 in operation 22 may transmit a cancel location ack signal to the HSS+UDM 124 in operation 23.

In operation 23a, the MME 115 may transmit a delete session request to the serving gateway while transmitting the cancel location ack signal to the HSS+UDM 124 in operation 23.

In operation 24, when determining to accept the registration request from the UE 101, the AMF 105 may transmit a registration accept message to the UE 101 through the NG-RAN 103. The registration accept message may include the 5G-GUTI for the UE 101.

The AMF 105 may perform operation 14c-1 simultaneously with operation 24 of after operation 24.

In operation 14c-1, the AMF 105 may transmit an initial context setup request message to the NG-RAN 103. The initial context setup request message may include an indicator indicating whether the UE 101 and/or the network support EPS fallback. The indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network does not support the voice service through the 5G system (for example, when the communication operator does not support the VoNR service), the AMF 105 may transmit the indicator of redirection for voice EPS fallback to the NG-RAN 103.

Further, when receiving EPS bearer context from the MME 115 in operation 13b, the AMF 105 may determine whether to insert the EPS bearer context into the initial context setup request message. Specifically, the AMF 105 may determine not to insert some of the EPS bearer context into the initial context setup request message in consideration of whether the NG-RAN 103 corresponds to information that can be considered when it is determined whether to perform the EPS fallback and/or whether additional information should be provided to the UE 101 in order to normally perform the EPS registration procedure when the EPS fallback is initiated before the 5GS registration procedure of the UE 101 is completed. For example, the AMF 105 receives the EPS bearer context for the dedicated bearer (or the bearer having the QCI of 1) for the IMS voice in operation 13b and, when the AMF 105 determines that the UE 101 and/or the network support EPS fallback and determines to inform the NG-RAN 103 of the same by using the indicator of the redirection for voice EPS fallback, may not insert the EPS bearer context for the dedicated bearer for the IMS voice into the initial context setup request message.

When receiving the indicator indicating rejection of the request for establishing and/or reactivating the PDU session corresponding to the PDN connection having the QCI value of 1 from the PGW-C+SMF 122 in operation 21, the AMF 105 may inform the NG-RAN 103 of the indicator. In this case, the AMF 105 may not insert the EPS bearer context for the dedicated bearer for the IMS voice into the initial context setup request message.

When receiving the indicator indicating rejection of the request for establishing and/or reactivating the PDU session corresponding to the PDN connection having the QCI value of 1 from the PGW-C+SMF 122 in operation 21, the AMF 105 may inform the UE 101 of the indicator. In this case, the AMF 105 may transmit the indicator indicating rejection of the request for establishing and/or reactivating the PDU session corresponding to the PDN connection having the QCI value of 1 through the registration accept message of operation 24 or relevant information. The relevant information may be used by an EPS bearer context status information element (IE).

The NG-RAN 103 may insert the registration accept message of operation 24 into the initial context setup request message.

In operation 14c-2, the NG-RAN 103 receiving the initial context setup request message from the AMF 105 in operation 14c-1 may determine whether to perform EPS fallback. The NG-RAN 103 may determine whether to perform EPS fallback in consideration of whether a request for the indicator of redirection for voice EPS fallback and/or the PDU session resource setup for the dedicated bearer for the IMS voice is received from the AMF 105, the NG-RAN configuration, and the like. For example, when the indicator of redirection for voice EPS fallback indicates supporting of the EPS fallback and the dedicated bearer for the IMS voice is not inserted into the request for the PDU session resource setup (the example of operation 14c-1), the NG-RAN 103 may determine not to perform the EPS fallback. After performing the initial context setup procedure, the NG-RAN 103 may transmit an initial context setup response message to the AMF 105. When receiving information indicating that the initial context setup procedure has been normally performed from the NG-RAN 103, the AMF 105 may continuously perform a registration procedure corresponding to operations 15 to 24.

Although the EPS bearer context from the IMS voice is received from the MME 115 in operation 13b, the AMF 105 which does not insert the information into the initial context setup request message transmitted to the NG-RAN 103 in operation 14c-1 may make a request for performing a delayed fallback procedure to the NG-RAN 103 in operation 24a. For example, a delayed fallback start indicator and/or the reason why the delayed fallback procedure is requested may be inserted in to an N2 request message and transmitted to the NG-RAN 103. The reason why the request for performing the delayed fallback procedure is made may include the existence of EPS bearer context for the dedicated bearer for the IMS voice. The message may be transmitted when the registration accept message in operation 24 is transmitted to the NG-RAN 103 or transmitted before or after the registration accept message.

In operation 24b, the AMF 105 transmitting the registration accept message in operation 24 may perform a UE policy association establishment procedure with the PCF.

Operations 24, 24a, and 24b described above may be performed in the order described above, or operation 24a may be first performed, operation 24 may be performed, and then operation 24b may be performed. Meanwhile, when a registration reject message is received in operation 24, operation 24b may be performed without operation 24a.

The AMF 105 may determine the order of operations 24a and 24 with reference to whether the indicator indicating rejection of the request for establishing and/or reactivating the PDU session corresponding to the PDN connection having the QCI value of 1 is received from the PGW-C+SMF 122 in operation 21. When the indicator is received, operation 24a may be performed after operation 24 is performed.

In operation 25, the NG-RAN 103 receiving the request for performing the delayed fallback procedure from the AMF 105 in operation 24a may wait for a predetermined time without starting the delayed fallback procedure until the UE 101 receives the 5G-GUTI of operation 24. When operation 24a is performed after operation 26, operation 25 may be omitted.

When there are other reasons such that the case in which the reason why the request for the delayed fallback from the AMF 105 is made in operation 24a does not match a method by which the NG-RAN 103 determines the EPS fallback, the UE 101 does not support the EPS fallback, a radio condition has difficulty in performing the EPS fallback, or there is a separate configuration in the NG-RAN 103, the NG-RAN 103 may determine not to perform the delayed fallback. When the NG-RAN 103 does not perform the delayed fallback according to the delayed fallback request of the AMF 105, the content including rejection of the delayed fallback request may be transmitted to the AMF 105 through an N2 message. When the NG-RAN 103 accepts the delayed request of the AMF 105, the content including the same may be transmitted to the AMF 105 through an N2 message.

In operation 26, the UE receiving the registration accept message from the AMF 105 in operation 24 may transmit a registration complete message to the AMF 105.

Figure 7A:
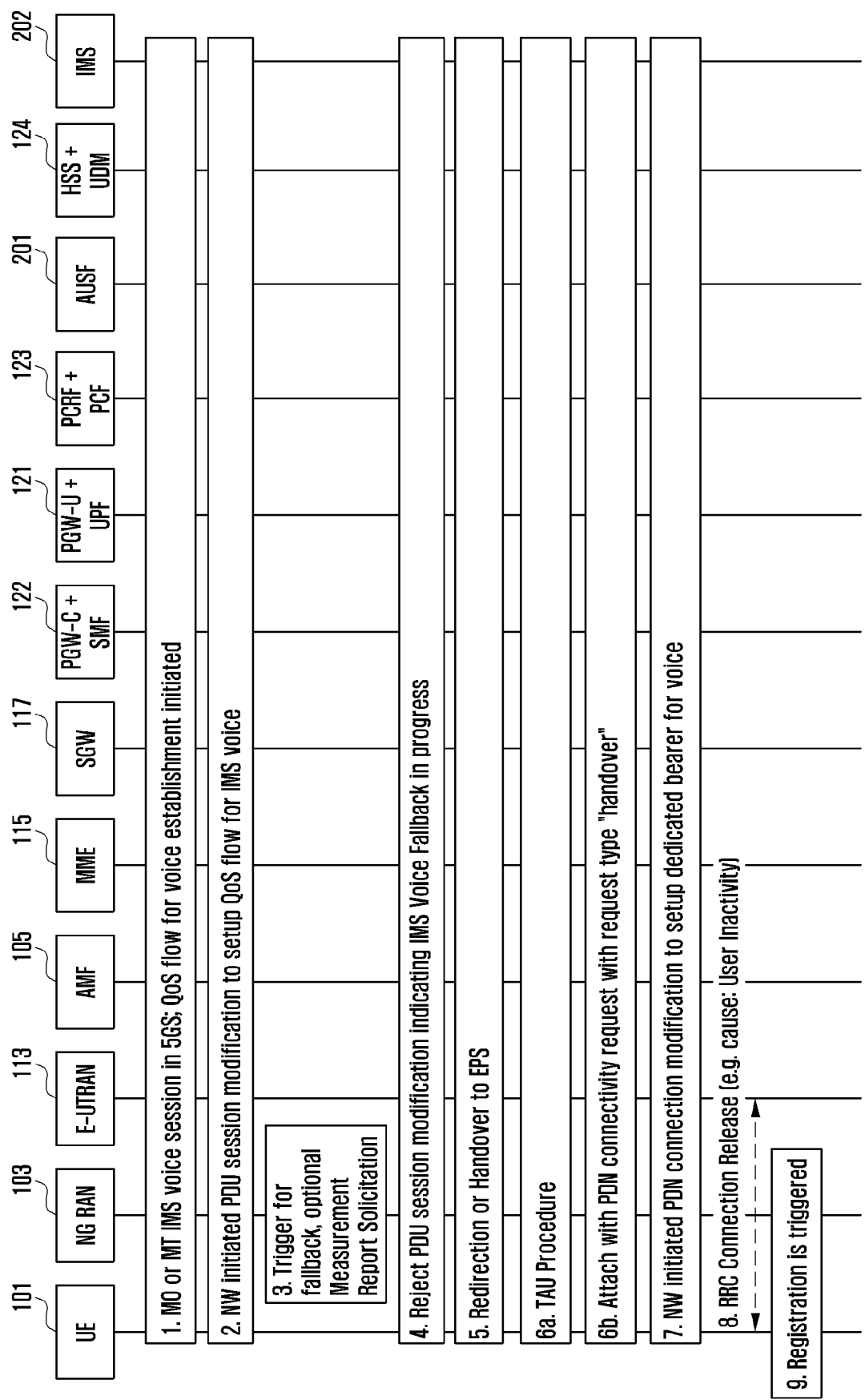
FIG. 7A illustrates a method of registering a UE and managing a session through a delayed fallback triggering procedure by an SMF according to an embodiment of the disclosure.
Figure 7B:
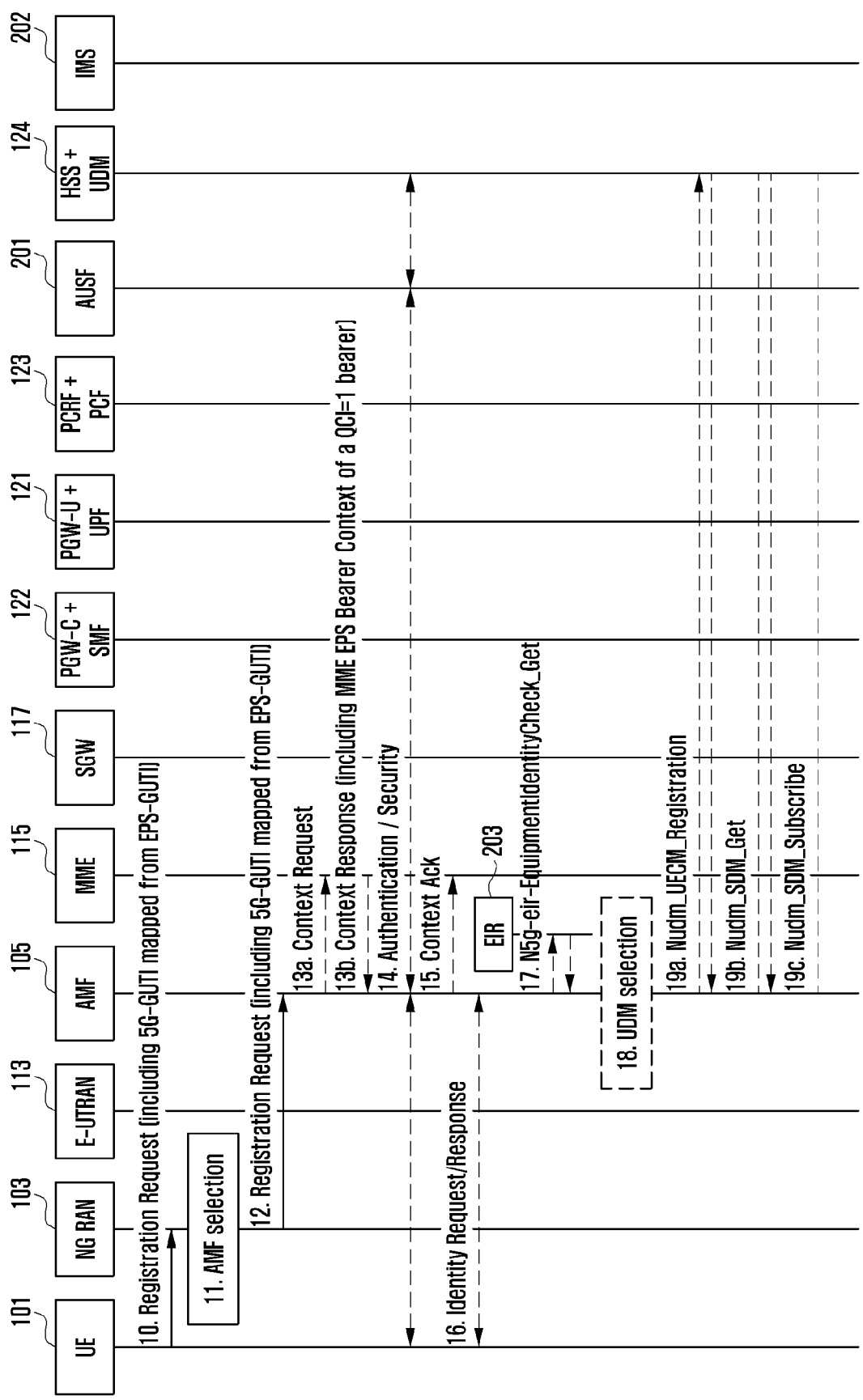
FIG. 7B illustrates a method of registering a UE and managing a session through a delayed fallback triggering procedure by an SMF according to an embodiment of the disclosure.
Figure 7C:
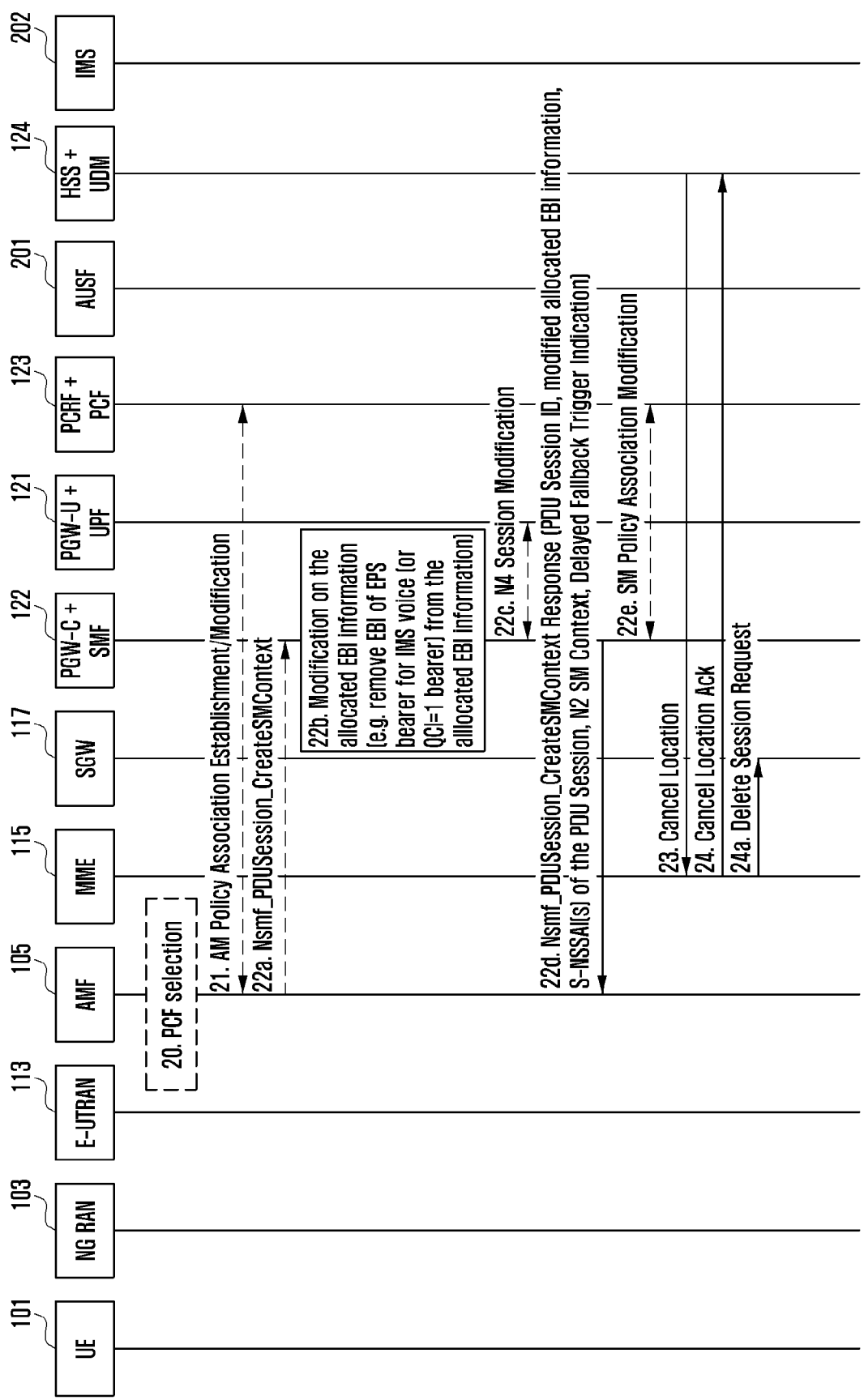
FIG. 7C illustrates a method of registering a UE and managing a session through a delayed fallback triggering procedure by an SMF according to an embodiment of the disclosure.
Figure 7D:
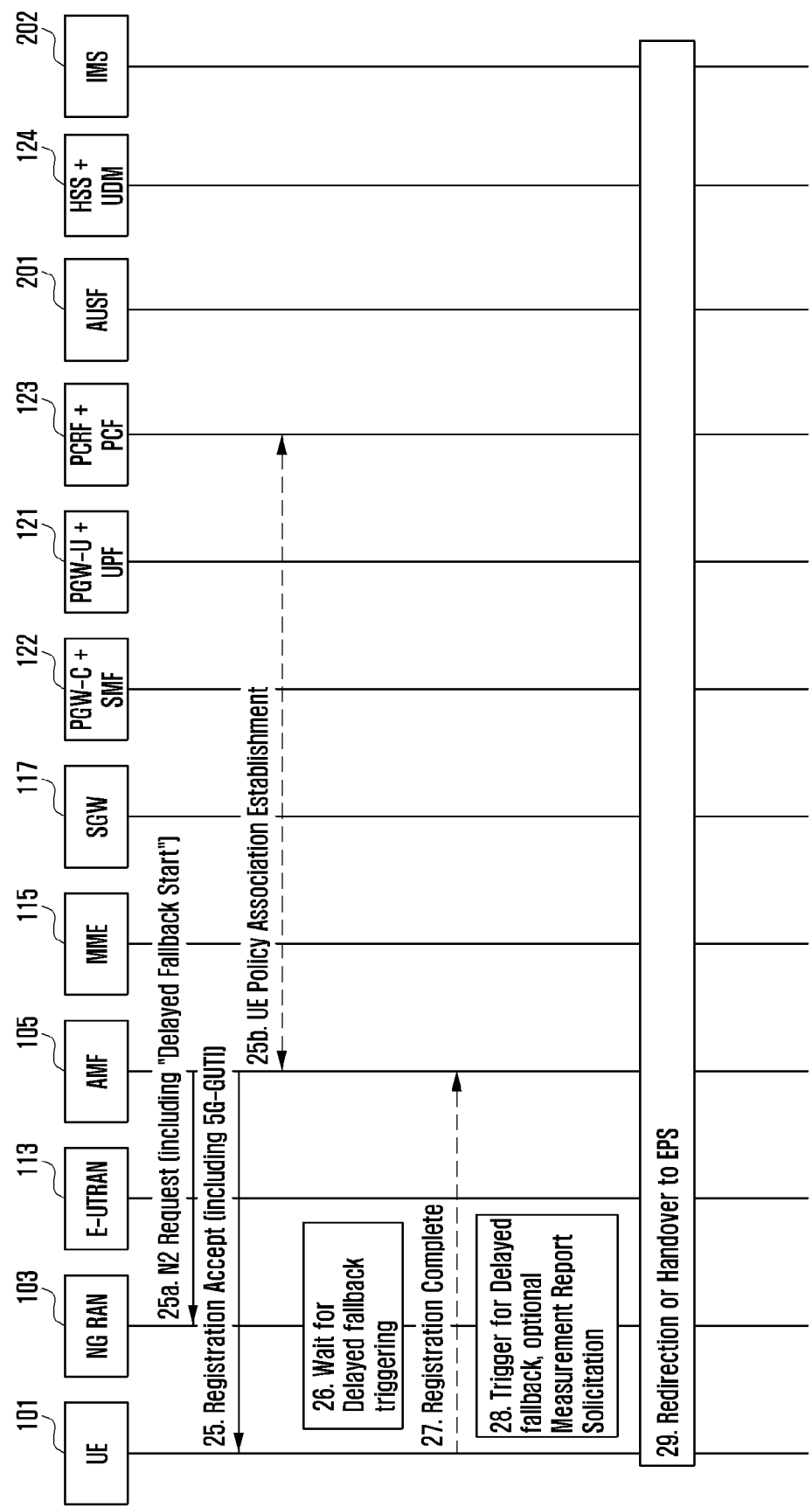
FIG. 7D illustrates a method of registering a UE and managing a session through a delayed fallback triggering procedure by an SMF according to an embodiment of the disclosure.
Figure 7E:
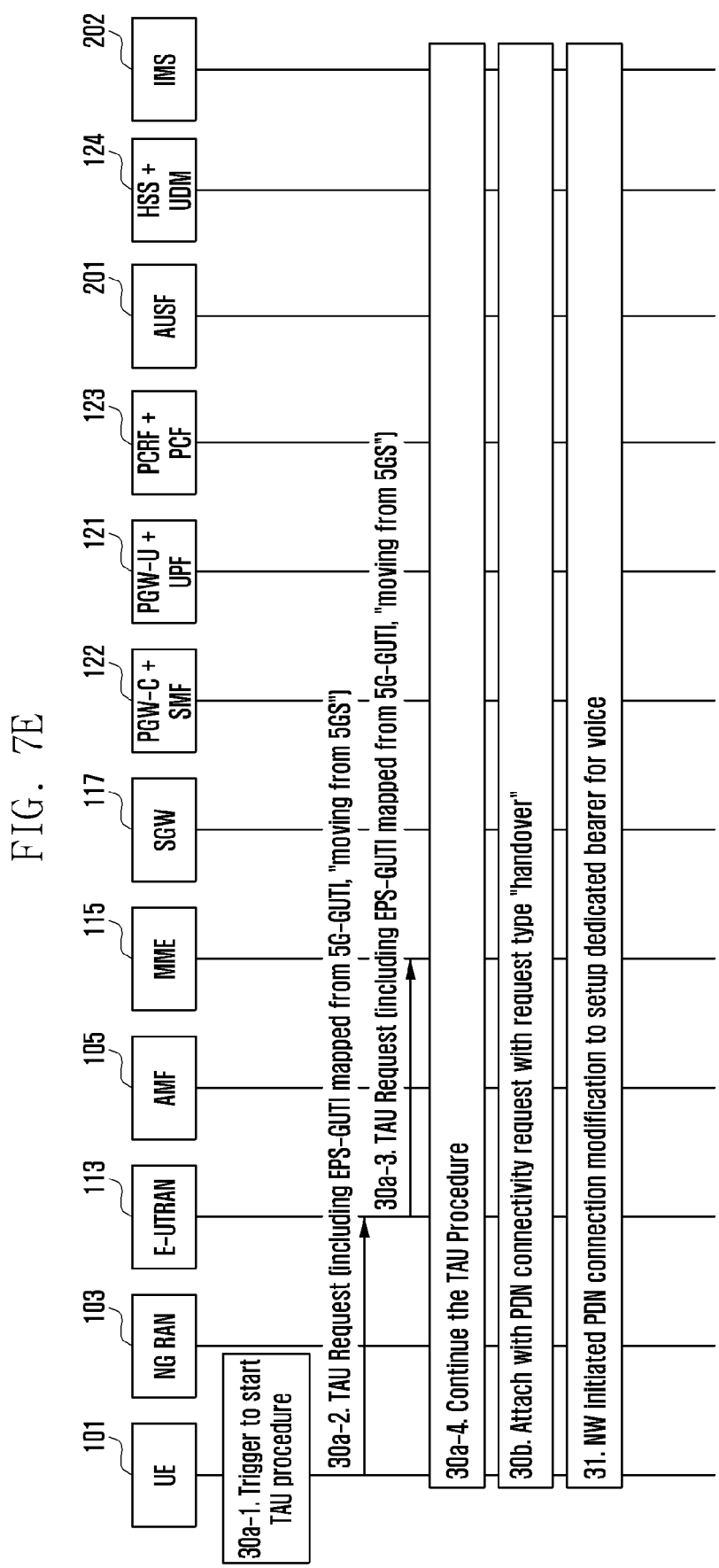
FIG. 7E illustrates a method of registering a UE and managing a session through a delayed fallback triggering procedure by an SMF according to an embodiment of the disclosure.

FIG. 7A illustrates a method of registering a UE and managing a session through a delayed fallback triggering procedure by an SMF according to an embodiment of the disclosure, FIG. 7B illustrates a method of registering a UE and managing a session through a delayed fallback triggering procedure by an SMF according to an embodiment of the disclosure, FIG. 7C illustrates a method of registering a UE and managing a session through a delayed fallback triggering procedure by an SMF according to an embodiment of the disclosure, and FIG. 7D illustrates a method of registering a UE and managing a session through a delayed fallback triggering procedure by an SMF according to an embodiment of the disclosure, and FIG. 7E illustrates a method of registering a UE and managing a session through a delayed fallback triggering procedure by an SMF according to an embodiment of the disclosure.

In the following description, FIGS. 7A to 7E are collectively referred to and described as FIG. 7. Prior to description of the embodiment of the disclosure made with reference to FIGS. 7A to 7E, reference numerals which are the same as those in FIG. 1 are used for respective NFs and the UE described in FIG. 1. In an example of FIGS. 7A to 7E, for example, the operation of 7B may be performed after all operations of FIG. 7A or at least one operation thereof. Similarly, the operation of FIG. 7C may be performed after at least one or all of the operations of FIG. 7B, FIG. 7D may be performed after at least one or all of the operations of FIGS. 7C and 7E may be performed after at least one or all of the operations of FIG. 7D. For the operations of FIG. 7 described in the disclosure, all operations will be described for convenience of description and to help understanding. However, at least some of the operations may be omitted or may not be performed according to circumstances. In the actual implementation, the order of FIGS. 7A to 7E which is the same as the scheme described in the disclosure may be used. In another example, only some operations of FIGS. 7A to 7E may be implemented according to the illustrated order. That is, some orders of FIGS. 7A to 7E may be omitted or may not be performed. In another example, some orders of FIGS. 7A to 7E may be performed in parallel or may be changed. Further, the contention described with reference to another figure may be included in the middle of the flowcharts in FIGS. 7A to 7E.

In operation 1, for the UE 101 connected to the 5GS through the NG-RAN 103, mobile originated (MO) or mobile terminated (MT) IMS voice session establishment may be initiated.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN may determine whether to trigger the EPS fallback. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 described below may not be performed. When the NG-RAN 103 does not receive the indicator of the redirection for EPS fallback for voice from the AMF 105, the NG-RAN may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message rejecting the PDU session modification request may include an indicator indicating movement due to fallback for the IMS voice. The SMF+PGW-C 122 receiving the response message rejecting the PDU session modification request may maintain PCC rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a, the UE 101 may perform the handover to the EPS or inter-system redirection using N26. The UE 101 may trigger a TAU procedure.

In operation 6b, the UE 101 may perform inter-system redirection which does not use N26.

In operation 7, the SMF+PGW-C 122 may resume the setup of the dedicated bearer for the IMS voice. The SMF+PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the RRC connection with the UE 101 for the reason of user inactivity. The reason of user inactivity in operation 8 may include the case in which the user does not receive a voice call within a predetermined time. The E-UTRAN 113 may use a timer to determine user inactivity. The E-UTRAN 113 may maintain the RRC connection without releasing the same when the dedicated bearer for the IMS voice is not released. In this case, operation 8 and the following process may be omitted.

After the E-UTRAN 113 performs the procedure of releasing the RRC connection with the UE 101 in operation 8, the UE 101 moves to the 5GS and may perform a registration procedure, in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF 105.

In operation 12, the NG-RAN 103 selecting the AMF 105 in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine or identify validity of the content of the TAU message.

In operation 13b, the MME 115 receiving the context request in operation 13 may transmit a context response message to the AMF 105. The context response message may include EPS bearer context(s). The EPS bearer context(s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice or the bearer having the QCI=1 are interchangeably used.

In operation 14, the AMF 105 may determine whether to perform a procedure of authenticating the UE 101. When the AMF 105 determines to perform the procedure of authenticating the UE 101, the AMF 105 may perform an authentication and/or security procedure required for the network with the UE 101. When the AMF 105 determines that the procedure of authenticating the UE 101 is not needed, operation 14 may be omitted.

When the AMF 105 determines to provide the service to the UE 101 in operation 13b and accepts the request of the UE 101 in operation 13b, the AMF 105 may transmit a context ack to the MME 115, in operation 15. The context ack may include a serving GW change indication.

In operation 16, the AMF 105 may make a request for an SUCI to the UE 101 and receive the same.

In operation 17, the AMF 105 may perform ME identity check with the EIR 203.

In operation 18, the AMF 105 may select the HSS+UDM 124 by using an SUCI provided by the UE 101, an SUPI converted from the SUCI, a home network identifier (for example, MNC and MCC, or realm) included in the SUCI or the SUPI, a UDM group ID, and the like.

In operation 19a, the AMF 105 may perform a Nudm_UECM_Registration procedure with the HSS+UDM 124.

In operation 19b, the AMF 105 may perform a procedure of Nudm_SDM_Get with the HSS+UDM 124.

In operation 19c, the AMF 105 may perform a procedure of Nudm_SDM_Subscribe with the HSS+UDM 124.

In operation 20, the AMF 105 may select the PCF+PCRF 123.

In operation 21, the AMF 105 may perform a procedure of AM policy association establishment or AM policy association modification with the selected PCF+PCRF 123.

In operation 22a, the AMF 105 may make a request for reactivating a PDU session for the EPS PDN connection to the SMF+PGW-C 122. The PDC session which is requested to be reactivated may be determined on the basis of information included in the registration request received by the AMF 105 from the UE in operation 12. When receiving a list of PDU sessions required to be reactivated (provided through a list of PDU session to be activated field) from the UE 101 in operation 12, the AMF 105 may make a request for reactivating all of the corresponding PDU sessions to the SMF+PGW-C 122. The AMF 105 may transmit a Nsmf_PDUSession_CreateSMContext message to the SMF+PGW-C 122. The AMF 105 may provide UE context received from the MME 115 in operation 13b and/or context information related to EPS PDN connections together to the SMF+PGW-C 122. Further, the context information which the AMF 105 receives in operation 13b may include EPS bearer context for the QCI=1 bearer.

In operation 22b, the SMF+PGW-C 122 may find a corresponding PDU session on the basis of PDN connection context included in the request of operation 22a. The SMF+PGW-C 122 may modify the content of allocated EBI information. The SMF+PGW-C 122 may exclude/remove the EBI for the EPS bearer corresponding to the QoS flow which is not supported by the 5GS from the allocated EBI information. When the QoS flow for the IMS voice is not supported by the 5GS, the SMF+PGW-C 122 may exclude/delete the EBI of the EPS bearer (bearer having QCI=1) for the IMS voice from the allocated EBI information.

In operation 22c, the SMF+PGW-C 122 may perform a procedure of N4 session modification with the UPF+PGW-U 121 in order to establish a CN tunnel for the PDU session. CN tunnel information for the PDU session may be allocated by the UPF+PGW-U 121 and provided to the SMF+PGW-C 122.

In operation 22d, the SMF+PGW-C 122 may update SM context and provide the updated SM context to the AMF 105. The SMF+PGW-C 122 may transmit a Nsmf_PDUSession_CreateSMContext response message to the AMF 105. The SM context which the SMF+PGW-C 122 provides to the AMF 105 may include a PDU session ID corresponding to PDN connection context in the request, allocated EBI(s) information, an S-NSSAI of the PDU session, and N2 SM context corresponding to the PDU session in the received list of PDU sessions to be activated. When the EBI for the EPS bearer corresponding to the QoS flow which is not supported by the 5GS is excluded/removed from allocated EBI information, the SMF+PGW-C 122 may insert the excluded/removed allocated EBI information into the SM context and transmit the SM context to the AMF 105 in operation 22b. When the EBI of the EPS bearer (bearer having QCI=1) for the IMS voice is excluded/removed from allocated EBI information, the SMF+PGW-C 122 may provide an indicator indicating that the EPS fallback procedure can be performed to the AMF 105 after the registration procedure is completed in operation 22b. The indicator may be a delayed fallback start indicator or a delayed fallback trigger indicator. The AMF 105 may store association between the PDU session ID and allocated EBI(s) related to the SMF ID, the S-NSSAI, and the PDU session ID. The AMF 105 may generate an EPS bearer status reflecting all the existing EPS bearers on the basis of allocated EBI information received from all the related SMF+PGW-Cs for the UE 101.

In operation 22e, the SMF+PGW-C 122 may perform a procedure of SM policy association modification with the PCF+PCRF 123.

In operation 23, the HSS+UDM 124 may transmit a cancel location message to the MME 115 and ask the MME 115 to delete or not to store any more information such as MM context of the UE 101.

After deleting information such as MM context of the UE 101, the MME 115 receiving a cancel location message from the HSS+UDM 124 in operation 23 may transmit a cancel location ack signal to the HSS+UDM 124, in operation 24.

In operation 24a, the MME 115 may transmit a delete session request to the SGW 117 while transmitting the cancel location ack signal to the HSS+UDM 124 in operation 23.

In operation 25, when determining to accept the registration request from the UE 101, the AMF 105 may transmit a registration accept message to the UE 101 through the NG-RAN 103. The registration accept message may include the 5G-GUTI for the UE 101.

The AMF 105 receiving an indicator indicating that the EPS fallback procedure can be performed from the SMF+PGW-C 122 after completing the registration procedure in operation 22d may make a request for performing the delayed fallback procedure to the NG-RAN 103, in operation 25a. For example, a delayed fallback start indicator and/or the reason why the delayed fallback procedure is requested may be inserted in to an N2 request message and transmitted to the NG-RAN 103. The reason why the request for performing the delayed fallback procedure is made may include the existence of EPS bearer context for the dedicated bearer for the IMS voice. The message may be transmitted when the registration accept message in operation 25 is transmitted to the NG-RAN 103 or transmitted before or after the registration accept message.

In operation 25b, the AMF 105 transmitting the registration accept message in operation 24 may perform a UE policy association establishment procedure with the PCF+PCRF 123.

In operation 26, the NG-RAN 103 receiving the request for performing the delayed fallback procedure from the AMF 105 in operation 25a may wait for a predetermined time without starting the delayed fallback procedure until the UE 101 receives the 5G-GUTI of operation 25. When operation 25a is performed after operation 27, operation 26 may be omitted.

When there are other reasons such that the case in which the reason why the request for the delayed fallback from the AMF 105 is made in operation 25a does not match a method by which the NG-RAN 103 determines the EPS fallback, the UE 101 does not support the EPS fallback, a radio condition has difficulty in performing the EPS fallback, or there is a separate configuration in the NG-RAN 103, the NG-RAN 103 may determine not to perform the delayed fallback. When the NG-RAN 103 does not perform the delayed fallback according to the delayed fallback request of the AMF 105, the content including rejection of the delayed fallback request may be transmitted to the AMF 105 through an N2 message. When the NG-RAN 103 accept the delayed request of the AMF 105, the content including the same may be transmitted to the AMF 105 through an N2 message.

In operation 27, the UE 101 receiving the registration accept message from the AMF 105 in operation 25 may transmit a registration complete message to the AMF 105.

In operation 28, the NG-RAN 103 may trigger the delayed fallback procedure.

In operation 29, the NG-RAN 103 may perform redirection or handover of the UE 101 to the EPS.

In operation 30*a*-1, the UE 101 may trigger a TAU procedure in order to be connected to the EPS.

In operation 30*a*-2, the UE 101 may transmit a TAU request message to the E-UTRAN 113. The TAU request message may include an EPS-GUTI converted from the 5G-GUTI received in operation 25 and an indicator (for example, "moving from 5GS") indicating that the UE 101 has moved from the 5GS to the EPS.

In operation 30*a*-3, the E-UTRAN 113 receiving the TAU request message in operation 30*a*-2 may transfer the TAU request message to the MME 115.

In operation 30*a*-4, the MME 115 receiving the TAU request message in operation 30*a*-3 continuously performs the TAU procedure for the UE 101.

In operation 30*b*, the UE 101 may perform inter-system redirection which does not use N26.

In operation 31, the SMF+PGW-C 122 may resume the setup of the dedicated bearer for the IMS voice.

Figure 8A:
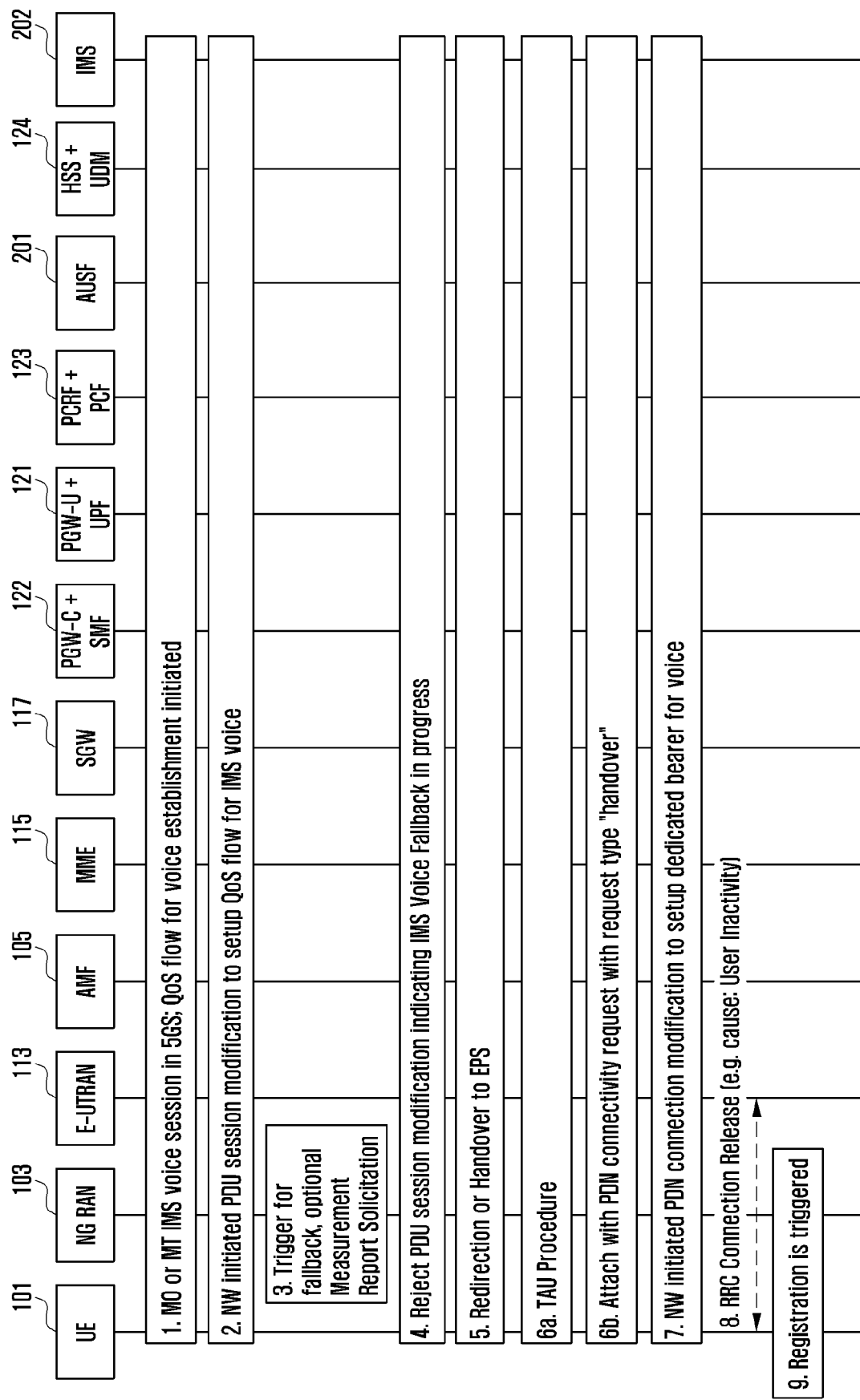
FIG. 8A illustrates a method of registering a UE and managing a session through the use of delay of a procedure of triggering fallback by an SMF according to an embodiment of the disclosure.
Figure 8B:
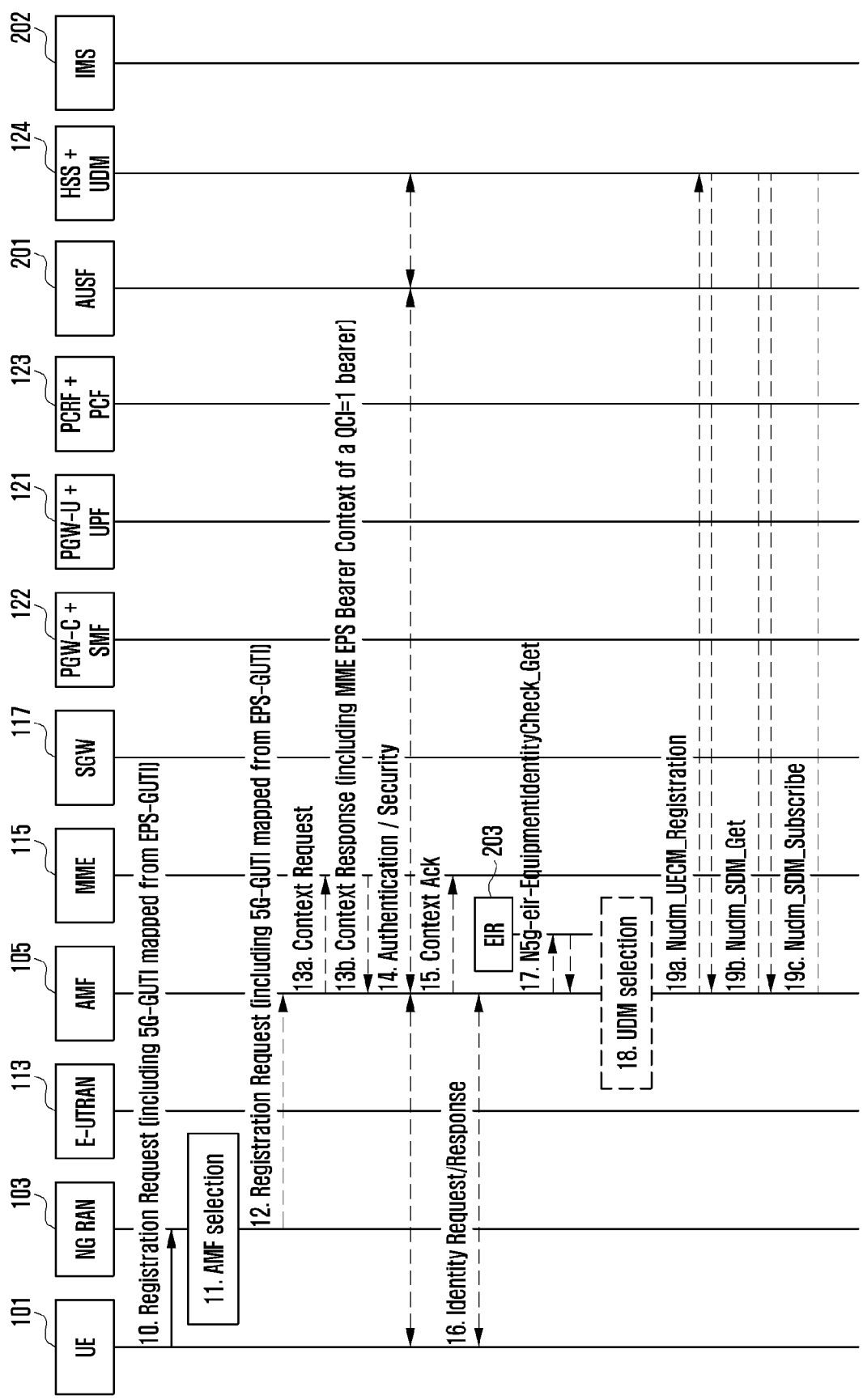
FIG. 8B illustrates a method of registering a UE and managing a session through the use of delay of a procedure of triggering fallback by an SMF according to an embodiment of the disclosure.
Figure 8C:
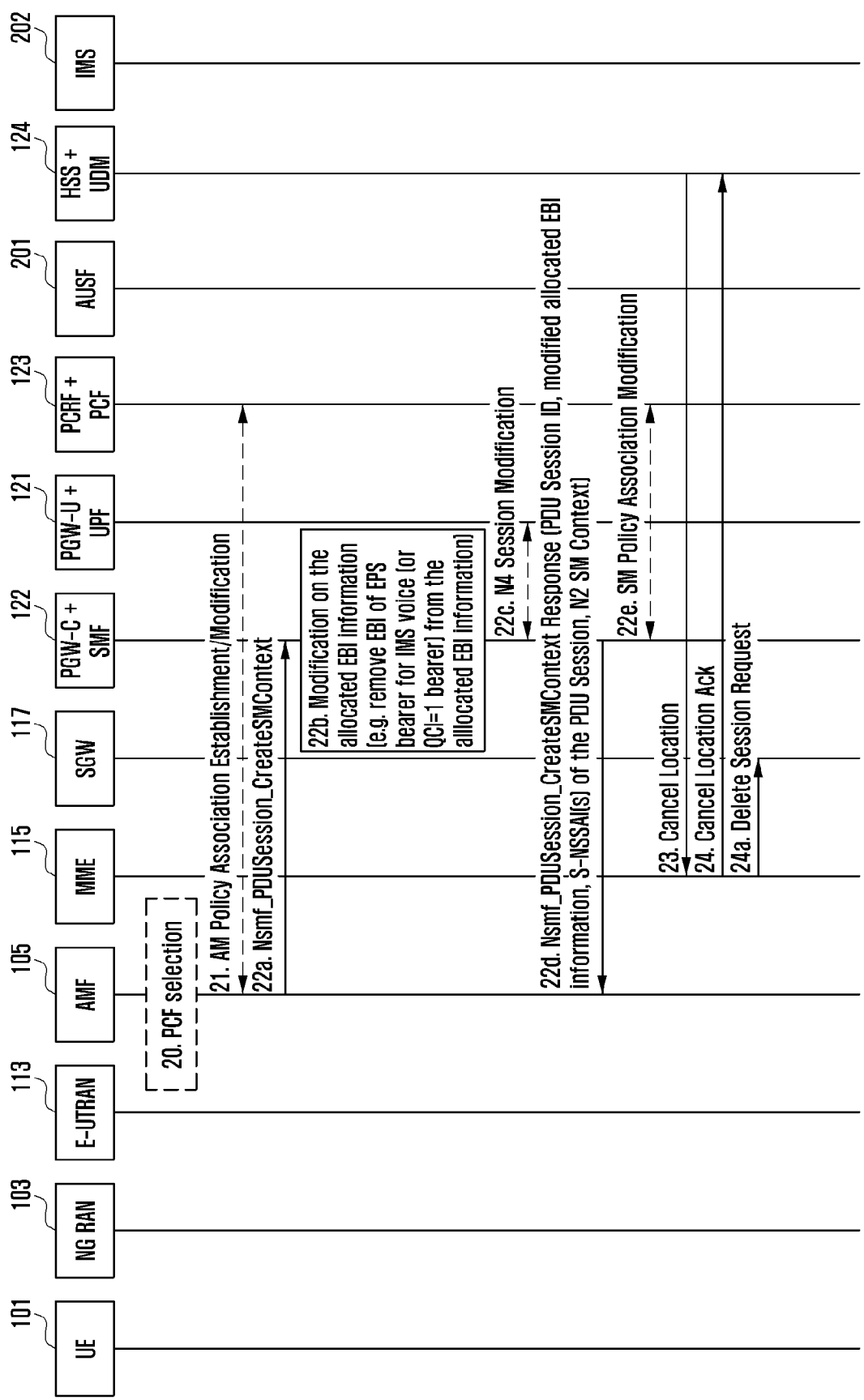
FIG. 8C illustrates a method of registering a UE and managing a session through the use of delay of a procedure of triggering fallback by an SMF according to an embodiment of the disclosure.
Figure 8D:
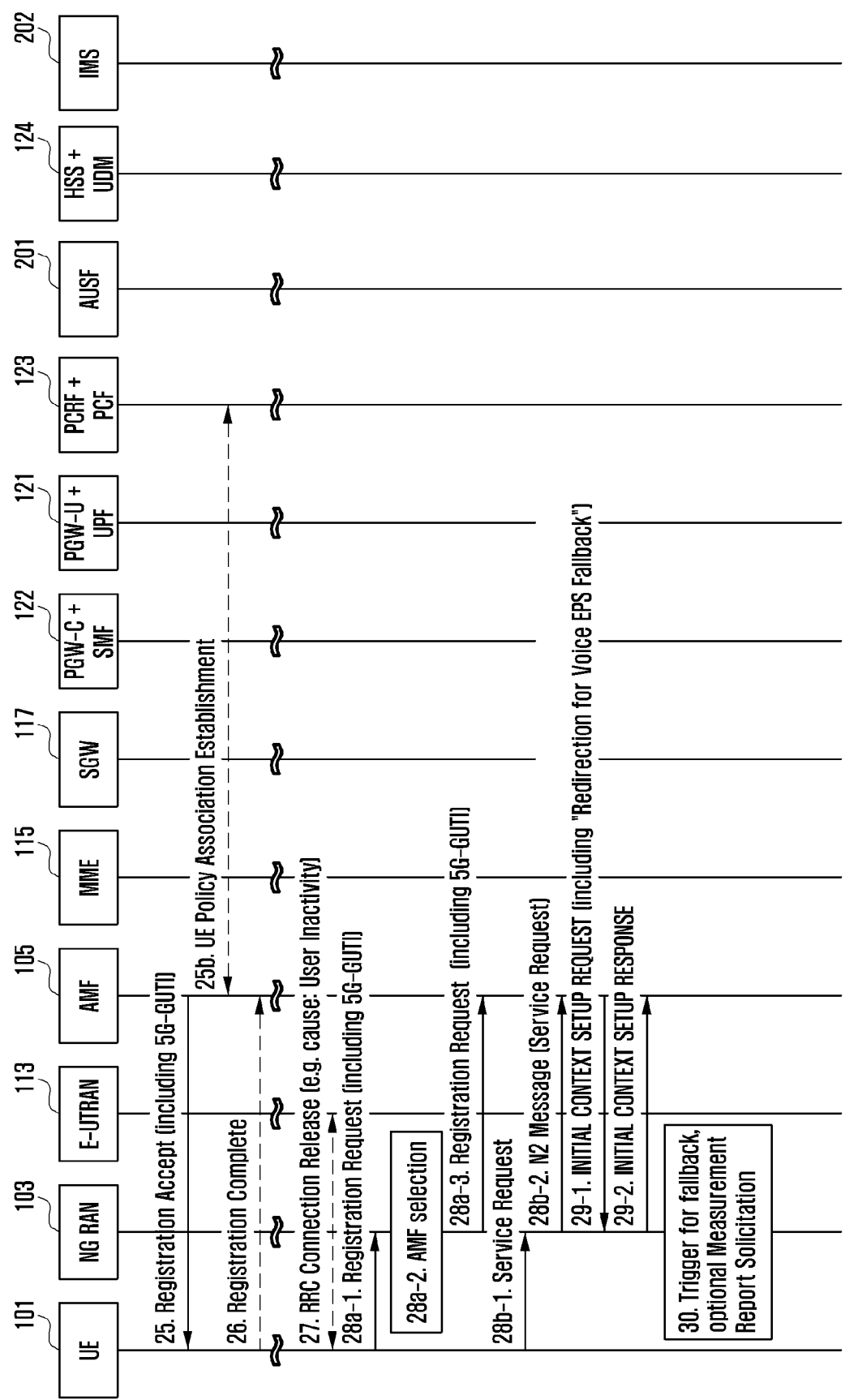
FIG. 8D illustrates a method of registering a UE and managing a session through the use of delay of a procedure of triggering fallback by an SMF according to an embodiment of the disclosure.
Figure 8E:
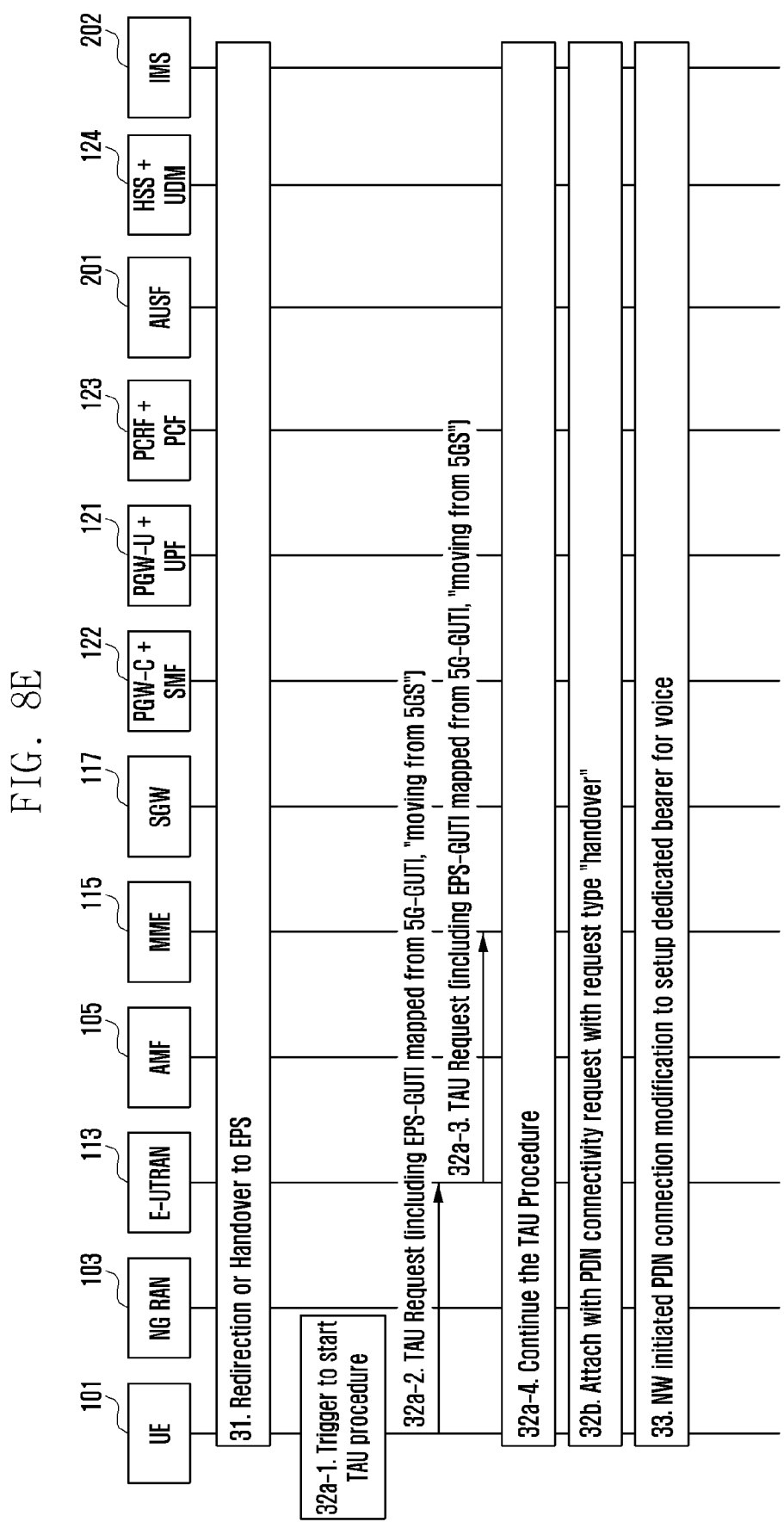
FIG. 8E illustrates a method of registering a UE and managing a session through the use of delay of a procedure of triggering fallback by an SMF according to an embodiment of the disclosure.

FIG. 8A illustrates a method of registering a UE and managing a session through the use of delay of a procedure of triggering fallback by an SMF according to an embodiment of the disclosure, FIG. 8B illustrates a method of registering a UE and managing a session through the use of delay of a procedure of triggering fallback by an SMF according to an embodiment of the disclosure, FIG. 8C illustrates a method of registering a UE and managing a session through the use of delay of a procedure of triggering fallback by an SMF according to an embodiment of the disclosure, and FIG. 8D illustrates a method of registering a UE and managing a session through the use of delay of a procedure of triggering fallback by an SMF according to an embodiment of the disclosure, and FIG. 8E illustrates a method of registering a UE and managing a session through the use of delay of a procedure of triggering fallback by an SMF according to an embodiment of the disclosure.

In the following description, FIGS. 8A to 8E are collectively referred to and described as FIG. 8. Prior to description of the embodiment of the disclosure made with reference to FIGS. 8A to 8E, reference numerals which are the same as those in FIG. 1 are used for respective NFs and the UE described in FIG. 1. In an example of FIGS. 8A to 8E, for example, the operation of 8B may be performed after all operations of FIG. 8A or at least one operation thereof. Similarly, the operation of FIG. 8C may be performed after at least one or all of the operations of FIG. 8B, FIG. 8D may be performed after at least one or all of the operations of FIGS. 8C and 8E may be performed after at least one or all of the operations of FIG. 8D. For the operations of FIG. 8 described in the disclosure, all operations will be described for convenience of description and to help understanding. However, at least some of the operations may be omitted or may not be performed according to circumstances. In the actual implementation, the order of FIGS. 8A to 8E which is the same as the scheme described in the disclosure may be used. In another example, only some operations of FIGS. 8A to 8E may be implemented according to the illustrated order. That is, some orders of FIGS. 8A to 8E may be omitted or may not be performed. In another example, some orders of FIGS. 8A to 8E may be performed in parallel or may be changed. Further, the contention described with reference to another figure may be included in the middle of the flowcharts in FIGS. 8A to 8E.

In operation 1, for the UE 101 connected to the 5GS through the NG-RAN 103, mobile originated (MO) or mobile terminated (MT) IMS voice session establishment may be initiated.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN may determine whether to trigger the EPS fallback. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 described below may not be performed. When the NG-RAN 103 does not receive the indicator of the redirection for EPS fallback for voice from the AMF 105, the NG-RAN may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message rejecting the PDU session modification request may include an indicator indicating movement due to fallback for the IMS voice. The SMF+PGW-C 122 receiving the response message rejecting the PDU session modification request may maintain PCC rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6*a* or 6*b* may be performed.

In operation 6*a*, the UE 101 may perform the handover to the EPS or inter-system redirection using N26. The UE 101 may trigger a TAU procedure.

In operation 6*b*, the UE 101 may perform inter-system redirection which does not use N26.

In operation 7, the SMF+PGW-C 122 may resume the setup of the dedicated bearer for the IMS voice. The SMF+

PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the RRC connection with the UE 101 for the reason of user inactivity. The reason of user inactivity may include the case in which the user does not receive a voice call within a predetermined time. The E-UTRAN 113 may use a timer to determine user inactivity. The E-UTRAN 113 may maintain the RRC connection without releasing the same when the dedicated bearer for the IMS voice is not released. In this case, operation 8 and the following process may be omitted.

After the E-UTRAN 113 performs the procedure of releasing the RRC connection with the UE 101 in operation 8, the UE 101 moves to the 5GS and may perform a registration procedure, in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF 105.

In operation 12, the NG-RAN 103 selecting the AMF 105 in operation 11 may transmit the registration request message received from the UE 101 to the AMF 105.

In operation 13*a*, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13*b*, the MME 115 receiving the context request in operation 13 may transmit a context response message to the AMF 105. The context response message may include EPS bearer context(s). The EPS bearer context(s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice or the bearer having the QCI=1 are interchangeably used.

In operation 14, the AMF 105 may determine whether to perform a procedure of authenticating the UE 101. When the AMF determines to perform the procedure of authenticating the UE 101, the AMF 105 may perform an authentication and/or security procedure required for the network with the UE 101. When the AMF 105 determines that the procedure of authenticating the UE 101 is not needed, operation 14 may be omitted.

When the AMF 105 performs operation 13*b* to determine to provide the service to the UE 101 and accept the request of the UE 101, the AMF 105 may transmit a context ack to the MME 115, in operation 15. The context ack may include a serving GW change indication.

In operation 16, the AMF 105 may make a request for an SUCI to the UE 101 and receive the same.

In operation 17, the AMF 105 may perform ME identity check with the EIR 203.

In operation 18, the AMF 105 may select the HSS+UDM 124 by using an SUCI provided by the UE 101, an SUPI converted from the SUCI, a home network identifier (for example, MNC and MCC, or realm) included in the SUCI or the SUPI, a UDM group ID, and the like.

In operation 19*a*, the AMF 105 may perform a Nudm_UECM_Registration procedure with the HSS+UDM 124.

In operation 19*b*, the AMF 105 may perform a procedure of Nudm_SDM_Get with the HSS+UDM 124.

In operation 19*c*, the AMF 105 may perform a procedure of Nudm_SDM_Subscribe with the HSS+UDM 124.

In operation 20, the AMF 105 may select the PCF+PCRF 123.

In operation 21, the AMF 105 may perform a procedure of AM policy association establishment or AM policy association modification with the selected PCF+PCRF 123.

In operation 22*a*, the AMF 105 may make a request for reactivating a PDU session for the EPS PDN connection to the SMF+PGW-C 122. The PDC session which is requested to be reactivated may be determined on the basis of information included in the registration request received by the AMF 105 from the UE 101 in operation 12. When receiving a list of PDU sessions required to be reactivated (provided through a list of PDU session to be activated field) from the UE 101 in operation 12, the AMF 105 may make a request for reactivating all of the corresponding PDU sessions to the SMF+PGW-C 122. The AMF 105 may transmit a Nsmf_PDUSession_CreateSMContext message to the SMF+PGW-C 122. The AMF 105 may provide UE context received from the MME 115 in operation 13*b* and/or context information related to EPS PDN connections together. Further, the context information received in operation 13*b* may include EPS bearer context for the QCI=1 bearer.

In operation 22*b*, the SMF+PGW-C 122 may find a corresponding PDU Session on the basis of PDN connection context included in the request of operation 22*a*. The SMF+PGW-C 122 may modify the content of allocated EBI information. The SMF+PGW-C 122 may exclude/delete the EBI for the EPS bearer corresponding to the QoS flow which is not supported by the 5GS from the allocated EBI information. When the QoS flow for the IMS voice is not supported by the 5GS, the EBI of the EPS bearer (bearer having QCI=1) for the IMS voice may be excluded/removed from the allocated EBI information.

In operation 22*c*, the SMF+PGW-C 122 may perform a procedure of N4 session modification with the UPF+PGW-U 121 in order to establish a CN tunnel for the PDU session. CN tunnel information for the PDU session may be allocated by the UPF+PGW-U 121 and provided to the SMF+PGW-C 122.

In operation 22*d*, the SMF+PGW-C 122 may update SM context and provide the updated SM context to the AMF 105. The SMF+PGW-C 122 may transmit a Nsmf_PDUSession_CreateSMContext response message to the AMF 105. The SM context which the SMF+PGW-C 122 provides to the AMF 105 may include a PDU session ID corresponding to PDN connection context in the request, allocated EBI(s) information, an S-NSSAI of the PDU session, and N2 SM context corresponding to the PDU session in the received list of PDU sessions to be activated. When the EBI for the EPS bearer corresponding to the QoS flow which is not supported by the 5GS is excluded/removed from allocated EBI information, the excluded/removed allocated EBI information may be inserted into the SM context and transmitted in operation 22*b*. Although not illustrated in FIG. 8, when the EBI of the EPS bearer (bearer having QCI=1) for the IMS voice is excluded/removed from allocated EBI information, the SMF+PGW-C 122 may provide an indicator indicating that the EPS fallback procedure can be performed to the AMF 105 after the registration procedure is completed in operation 22*b*. The indicator may be a delayed fallback start indicator or a delayed fallback trigger indicator. The AMF 105 may store association between the PDU session ID and allocated EBI(s) related to the SMF ID, the S-NSSAI, and the PDU session ID. The AMF 105 may generate an EPS bearer status reflecting all the existing EPS bearers on the basis of allocated EBI information received from all the related SMF+PGW-Cs for the UE 101.

In operation 22*e*, the SMF+PGW-C 122 may perform a procedure of SM policy association modification with the PCF+PCRF 123.

In operation 23, the HSS+UDM 124 may transmit a cancel location message to the MME 115 and ask the MME 115 to delete or not to store any more information such as MM context of the UE 101.

After deleting information such as MM context of the UE 101, the MME 115 receiving a cancel location message from the HSS+UDM 124 in operation 23 may transmit a cancel location ack signal to the HSS+UDM 124, in operation 24.

In operation 24*a*, the MME 115 may transmit a delete session request to the serving gateway while transmitting the cancel location ack signal to the HSS+UDM 124 in operation 23.

In operation 25, when determining to accept the registration request from the UE 101, the AMF 105 may transmit a registration accept message to the UE 101 through the NG-RAN 103. The registration accept message may include the 5G-GUTI for the UE 101.

In operation 25*b*, the AMF 105 transmitting the registration accept message in operation 24 may perform a UE policy association establishment procedure with the PCF+PCRF 123.

In operation 26, the UE 101 receiving the registration accept message from the AMF 105 in operation 25 may transmit a registration complete message to the AMF 105.

Wave shapes between operation 26 and operation 27 mean that other specific operations can be performed between operation 26 and operation 27. Further, it may mean that a predetermined time passes temporally between operation 26 and operation 27.

In operation 27, the E-UTRAN 113 may perform a procedure of releasing the RRC connection with the UE 101 for the reason of user inactivity. The reason of user inactivity may include the case in which the user does not receive a voice call within a predetermined time. The E-UTRAN 113 may use a timer to determine user inactivity.

In operation 28*a*-1, the UE 101 may transmit a registration request message to the NG-RAN 103. When there is a 5G-GUTI which is a UE identifier in the 5GS allocated by the AMF 105, the UE 101 may insert the 5G-GUTI into the registration request message as the native 5G-GUTI. The 5G-GUTI may correspond to the 5G-GUTI received in operation 25.

In operation 28*a*-2, the NG-RAN 103 receiving the request from the UE 101 in operation 28*a*-1 may select the AMF 105.

In operation 28*a*-3, the NG-RAN 103 selecting the AMF 105 in operation 28*a*-2 may transmit the registration request message received from the UE 101 to the AMF 105.

In operation 28*b*-1, the UE 101 may transmit a service request message to the NG-RAN 103.

In operation 28*b*-2, the NG-RAN 103 receiving the service request message in operation 28*b*-1 may transmit an N2 message to the AMF 105. The N2 message may include all or some of the service request received in operation 28*b*-1.

In operation 29-1, the AMF 105 may transmit an initial context setup request message to the NG-RAN 103. The initial context setup request message may include an indicator indicating whether the UE 101 and/or the network support EPS fallback. The indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network does not support the voice service through the 5G system (for example, when the communication operator does not support the VoNR service), the AMF 105 may transmit the indicator of redirection for voice EPS fallback to the NG-RAN 103. The NG-RAN 103 may determine whether to perform EPS fallback.

In operation 29-2, the NG-RAN 103 may transmit an initial context setup response message in response to the request of the AMF 105 of operation 29-1. When it is determined to perform EPS fallback in operation 29-1, the NG-RAN 103 may inform the AMF 105 of the EPS fallback.

When the NG-RAN 103 determines to perform the EPS fallback procedure in operation 29-1, the NG-RAN 103 may trigger the fallback procedure, in operation 30.

In operation 31, the NG-RAN 103 may perform redirection or handover of the UE 101 to the EPS.

In operation 32*a*-1, the UE 101 may trigger a TAU procedure in order to be connected to the EPS.

In operation 32*a*-2, the UE 101 may transmit a TAU request message to the E-UTRAN 113. The TAU request may include an EPS-GUTI converted from the 5G-GUTI received in operation 25 and an indicator (for example, "moving from 5GS") indicating that the UE 101 has moved from the 5GS to the EPS.

In operation 32*a*-3, the E-UTRAN 113 receiving the TAU request message in operation 30*a*-2 may transfer the TAU request message to the MME 115.

In operation 32*a*-4, the MME 115 receiving the TAU request message in operation 32*a*-3 continuously performs the TAU procedure for the UE 101.

In operation 32*b*, the UE 101 may perform inter-system redirection which does not use N26.

In operation 33, the SMF+PGW-C 122 may resume the setup of the dedicated bearer for the IMS voice.

Figure 9A:
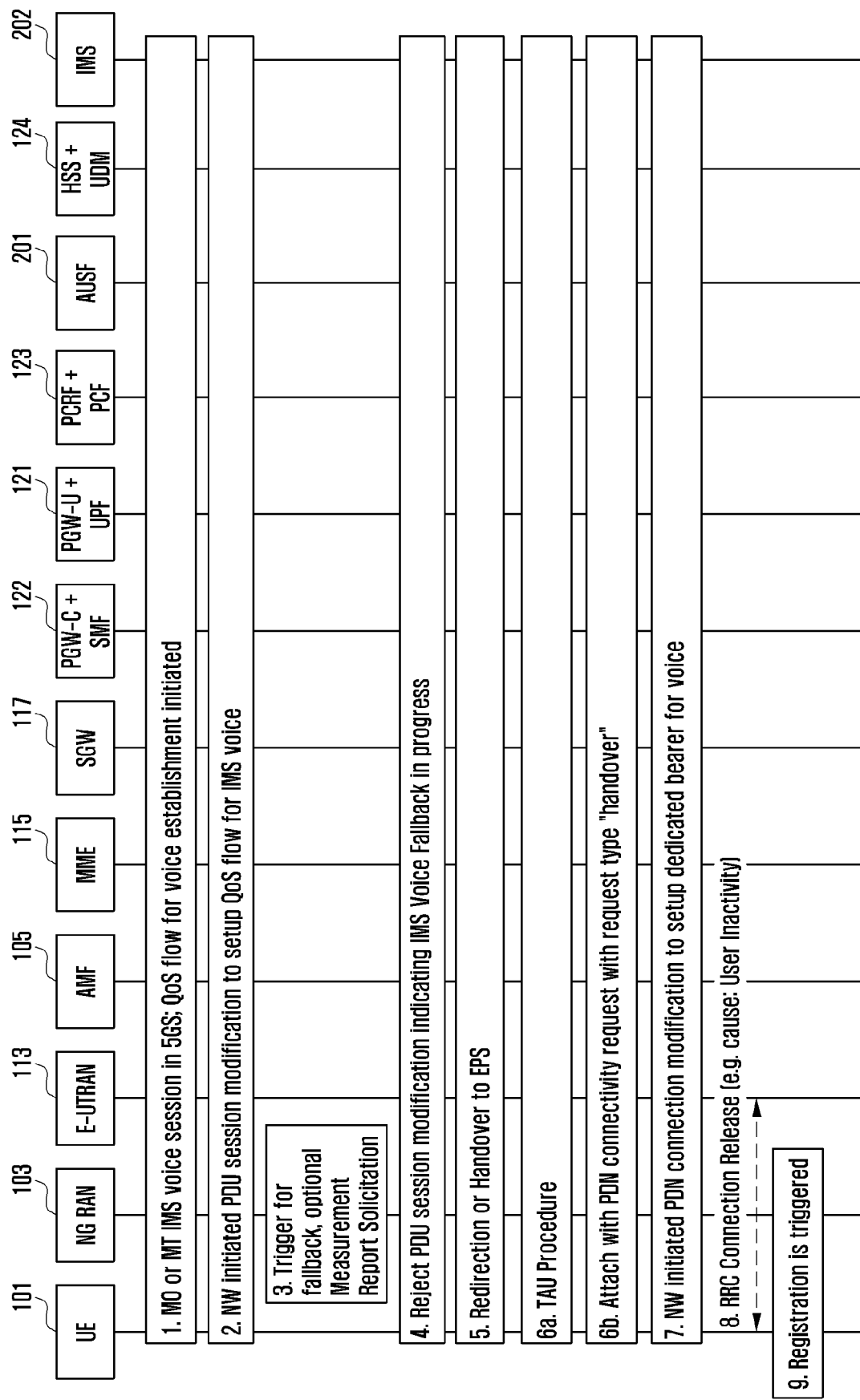
FIG. 9A illustrates a method of registering a UE and managing a session by maintaining a procedure of triggering fallback according to an embodiment of the disclosure.
Figure 9C:
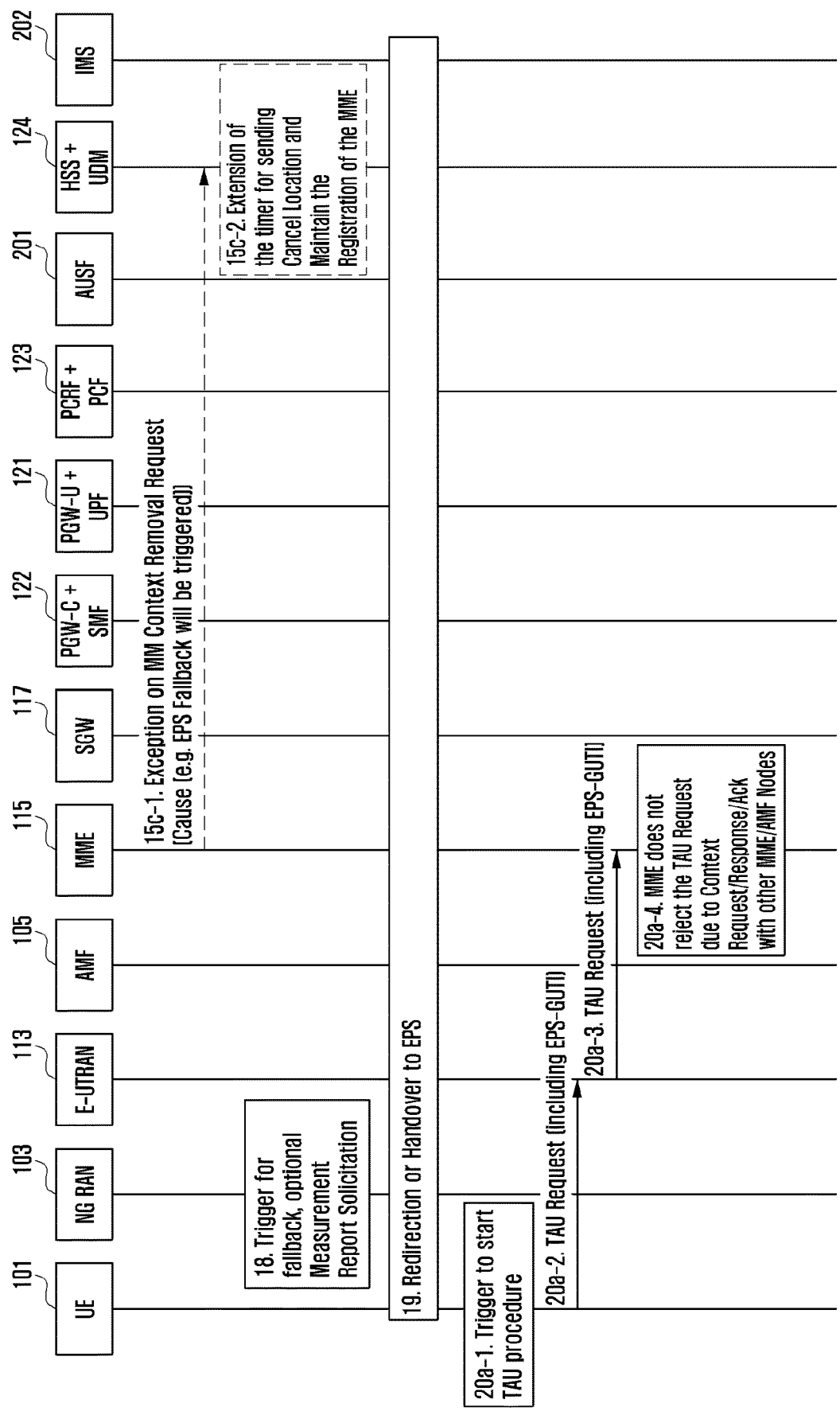
FIG. 9C illustrates a method of registering a UE and managing a session through the use of maintenance of a procedure of triggering fallback according to an embodiment of the disclosure.
Figure 9D:
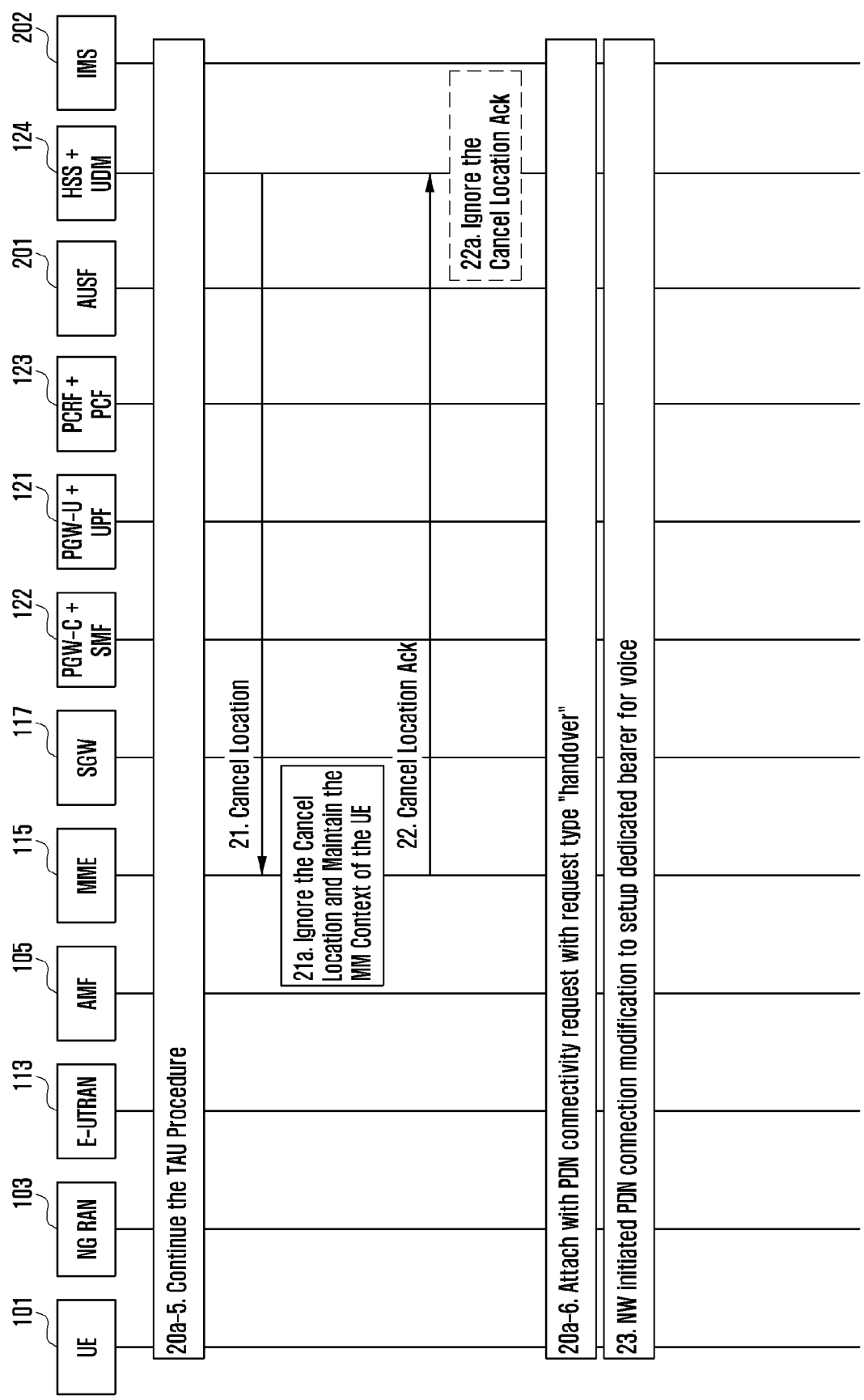
FIG. 9D illustrates a method of registering a UE and managing a session through the use of maintenance of a procedure of triggering fallback according to an embodiment of the disclosure.

FIG. 9A illustrates a method of registering a UE and managing a session through the use of maintenance of a procedure of triggering fallback according to an embodiment of the disclosure, FIG. 9B illustrates a method of registering a UE and managing a session through the use of maintenance of a procedure of triggering fallback according to an embodiment of the disclosure, FIG. 9C illustrates a method of registering a UE and managing a session through the use of maintenance of a procedure of triggering fallback according to an embodiment of the disclosure, and FIG. 9D illustrates a method of registering a UE and managing a session through the use of maintenance of a procedure of triggering fallback according to an embodiment of the disclosure.

In the following description, FIGS. 9A to 9D are collectively referred to or described as FIG. 9. Prior to description of the embodiment of the disclosure made with reference to FIGS. 9A to 9D, reference numerals which are the same as those in FIG. 1 are used for respective NFs and the UE described in FIG. 1. Further, in FIGS. 9A to 9D, the operation of FIG. 9B may be performed after all or at least one of the operations of FIG. 9A. Similarly, the operation of FIG. 9C may be performed after at least one or all of the operations of FIGS. 9B and 9D may be performed after at least one or all of the operations of FIG. 9C. For the operations of FIGS. 9A to 9D described in the disclosure, all operations will be described for convenience of description and to help understanding. However, at least some of the operations may be omitted or may not be performed according to circumstances. In the actual implementation, the order of FIGS. 9A to 9D which is the same as the scheme described in the disclosure may be used. In another example, only some of FIGS. 9A to 9D may be sequentially implemented. That is, some orders of FIGS. 9A to 9D may be omitted or may not be performed. In another example, some orders of FIGS. 9A to 9D may be performed in parallel or the orders may be changed. Further, the description made with reference to another figure may be inserted into the middle of the flowcharts of FIGS. 9A to 9D.

In operation 1, for the UE 101 connected to the 5GS through the NG-RAN 103, mobile originated (MO) or mobile terminated (MT) IMS voice session establishment may be initiated.

In operation 2, the AMF 105 may transmit an N2 PDU session request message to the NG-RAN 103 through a network initiated PDU session modification procedure. The N2 PDU session request message may include information making a request for a QoS flow setup for the voice service.

In operation 3, when the NG-RAN 103 receiving the information making the request for the QoS flow setup for the voice service is configured to support EPS fallback for the IMS voice, the NG-RAN may determine whether to trigger the EPS fallback. The NG-RAN 103 may determine whether to trigger the EPS fallback in consideration of a UE capability received from the UE 101, whether an indicator indicating that redirection for EPS fallback for voice is possible from the AMF 105 (during an initial context setup, handover resource allocation, or a path switch request acknowledge procedure), a network configuration (for example, N26 availability configuration), and a radio condition. When the NG-RAN 103 determines not to trigger the EPS fallback, the operations after operation 3 may not be performed. When the AMF 105 receives the indicator indicating that the redirection for EPS fallback for voice is not possible, operation 5 may not be performed. When the NG-RAN 103 does not receive the indicator of the redirection for EPS fallback for voice from the AMF 105, the NG-RAN may exclude the network configuration (for example, N26 availability configuration) from the consideration for the determination of whether to trigger the EPS fallback for the IMS voice.

In operation 4, the NG-RAN 103 may transmit a response message rejecting the PDU session modification request for the QoS flow setup for the IMS voice received in operation 2 to the SMF+PGW-C 122 through the AMF 105. The response message may include an indicator indicating movement due to fallback for the IMS voice. The SMF+PGW-C 122 receiving the response message may maintain PCC rule(s) related to QoS flow(s) for the IMS voice service. When there is the PCF+PCRF 123 subscribing to a notification of an EPS fallback event, the SMF+PGW-C 122 may report the EPS fallback event to the corresponding PCF+PCRF 123.

In operation 5, the NG-RAN 103 may perform handover or redirection to the EPS according to the UE capability. When there is the PCF+PCRF 123 subscribing to a notification of an RAT type change event, the SMF+PGW-C 122 may report the RAT type change event to the corresponding PCF+PCRF 123. When the UE 101 is connected to the EPS, operation 6a or 6b may be performed.

In operation 6a, the UE 101 may perform the handover to the EPS or inter-system redirection using N26. The UE 101 may trigger a TAU procedure.

In operation 6b, the UE 101 may perform inter-system redirection which does not use N26.

In operation 7, the SMF+PGW-C 122 may resume the setup of the dedicated bearer for the IMS voice. The SMF+PGW-C 122 may use information for mapping the PCC rule(s) and the 5G QoS associated with the QoS flow for the IMS voice maintained in operation 4 to EPS QoS parameters.

In operation 8, the E-UTRAN 113 may perform a procedure of releasing the RRC connection with the UE 101 for the reason of user inactivity. The reason of user inactivity may include the case in which the user does not receive a voice call within a predetermined time. The E-UTRAN 113 may use a timer to determine user inactivity. The E-UTRAN 113 may maintain the RRC connection without releasing the same when the dedicated bearer for the IMS voice is not released. In this case, operation 8 and the following process may be omitted.

After the E-UTRAN 113 performs the procedure of releasing the RRC connection with the UE 101 in operation 8, the UE 101 moves to the 5GS and may perform a registration procedure, in operation 9.

In operation 10, the UE 101 may transmit a registration request message to the NG-RAN 103. The registration request message may include a registration type indicating a mobility registration update. The UE 101 may insert a 5G-GUTI mapped on the basis of an EPS-globally unique temporary identifier (GUTI) which is a UE identifier in the EPS allocated by the MME 115 through the E-UTRAN 113 before operation 10 into the registration request message as the old 5G-GUTI. When there is a 5G-GUTI which is a UE identifier in the 5GS allocated by the AMF 105 through the NG-RAN 103, the UE 101 may insert the 5G-GUTI into the registration request message as the native 5G-GUTI. The UE 101 may insert an indicator (for example, "moving from EPS") indicating movement from the EPS to the 5GS into the registration request message.

In operation 11, the NG-RAN 103 receiving the registration request message in the mobility registration update type including the 5G-GUTI mapped on the basis of the EPS-GUTI and the indicator indicating movement from the EPS to the 5GS from the UE 101 in operation 10 may select the AMF 105.

In operation 12, the NG-RAN 103 selecting the AMF 105 in operation 11 may transmit the registration request message received from the UE 101 to the AMF 105.

In operation 13a, the AMF 105 receiving the registration request message in operation 12 may acquire an MME address by using the EPS-GUTI to which the old 5G-GUTI is mapped. The AMF 105 may transmit a context request message to the MME 115 by using the MME address. The context request message may include the EPS-GUTI to which the old 5G-GUTI is mapped and a TAU message. The MME 115 may determine validity of the content of the TAU message.

In operation 13*b*, the MME 115 receiving the context request in operation 13*a* may transmit a context response message to the AMF 105. The context response message may include EPS bearer context(s). The EPS bearer context (s) may include information related to an EPS bearer which is not released from the EPS before movement of the UE 101 to the 5GS and, when the dedicated bearer for the IMS voice generated in operation 7 is not released, include information (context) on the bearer. The dedicated bearer for the IMS voice may be configured as a bearer having 1 of a QoS class identifier (QCI) (a QCI=1 bearer). In the disclosure, the dedicated bearer for the IMS voice or the bearer having the QCI=1 are interchangeably used.

In operation 14, the AMF 105 may perform an authentication and/or security procedure required for the network with the UE 101. The AMF 105 may transmit and receive required information to and from the UE 101, the NG-RAN 103, the AUSF 201, and/or the HSS+UDM 124. Specifically, the AMF 105 may perform a UE context setup procedure with the NG-RAN 103 through a next generation application protocol (NGAP). The UE context may include PDU session context, the security key, a mobility restriction list, a UE radio capability, and/or UE security capabilities.

In operation 14*c*-1, the AMF 105 may transmit an initial context setup request message to the NG-RAN 103. The initial context setup request message may include an indicator indicating whether the UE 101 and/or the network support EPS fallback. The indicator of redirection for voice EPS fallback may correspond thereto, and the AMF 105 may define a value of the indicator as supported/not supported, available/unavailable, or possible/not possible and transmit the value to the NG-RAN 103. When the UE 101 and/or the network does not support the voice service through the 5G system (for example, when the communication operator does not support the VoNR service), the AMF 105 may transmit the indicator of redirection for voice EPS fallback to the NG-RAN 103.

Further, when receiving EPS bearer context from the MME 115 in operation 13*b*, the AMF 105 may insert the EPS bearer context into the initial context setup request message. Specifically, after inserting the EPS bearer context into the PDU session resource setup list, the AMF 105 may transmit information in the form in which the PDU session resource setup list is inserted into the initial context setup request message to the NG-RAN 103. The AMF 105 may transmit the EPS bearer context for the dedicated bearer (or the bearer having the QCI of 1) for the IMS voice to the NG-RAN 103 in operation 13*b*.

In operation 14*c*-2, the NG-RAN 103 receiving the initial context setup request message from the AMF 105 in operation 14*c*-1 may determine whether to perform EPS fallback. The NG-RAN 103 may determine whether to perform EPS fallback in consideration of whether a request for the indicator of redirection for voice EPS fallback and/or the PDU session resource setup for the dedicated bearer for the IMS voice is received from the AMF 105, the NG-RAN configuration, and the like. For example, when the redirection for voice EPS fallback indicator indicates supporting of the EPS fallback and the request for the PDU session resource setup for the dedicated bearer for the IMS voice is received, the NG-RAN 103 determine to perform the EPS fallback. After performing the initial context setup procedure, the NG-RAN 103 may transmit an initial context setup response message to the AMF 105. When it is determined to perform EPS fallback, the NG-RAN 103 may inform the AMF 105 of the EPS fallback.

When an authentication and/or security procedure (operation 14) has successfully finished in operation 14*c*-2, the AMF 105 may determine whether to transmit a context ack signal to the MME 115 and, when it is determined to transmit the context ack signal, may transmit the context ack signal to the MME 115, in operation 15. When receiving the notification indicating that the EPS fallback procedure has been triggered from the NG-RAN 103 in operation 14*c*-2, the AMF 105 may not transmit the context ack signal.

In operation 15*a*, the AMF 105 may make a request for removing or not modifying information such as MM context of the UE 101 to the MME 115. When receiving the notification indicating that the EPS fallback procedure has been triggered from the NG-RAN 103 in operation 14*c*-2, the AMF 105 may also transmit a cause indicating that the EPS fallback procedure will be performed or the EPS fallback procedure starts.

In operation 15*b*, the MME 115 may expand a timer which determines a time point at which information on MM context of the UE 101 is removed or modified. The timer may start when the request of the AMF 105 of operation 13*a* is received or the response of operation 13*b* is transmitted. The MME 115 may use an identifier such as an IMSI when the UE 101 to which the expanded timer will be applied is identified. When the MME 115 receives the request from the AMF 105 in operation 15*a* or when the UE 101 uses the IMS voice service, if the performance of the EPS fallback procedure can be known, the timer may be expanded.

In operation 15*c*-1, the MME 115 may make a request for not removing or modifying information such as MM context of the UE 101 or not removing or modifying a registration state of the MME 115 or registration information to the HSS+UDM 124. When the MME 115 receives the request from the AMF 105 in operation 15*a*, when the UE 101 uses the IMS voice service, or when the performance of the EPS fallback procedure can be known, the MME 115 may also transmit a cause indicating that the EPS fallback procedure will be performed or the EPS fallback procedure starts to the HSS+UDM 124.

In operation 15*c*-2, the HSS+UDM 124 receiving the request of operation 15*c*-1 may maintain the information such as MM context of the UE 101 and the registration state or registration information of the MME 115 without removing or modifying the same.

When the NG-RAN 103 determines to perform the EPS fallback procedure in operation 14*c*-2, the NG-RAN 103 may trigger the fallback procedure, in operation 18.

In operation 19, the NG-RAN 103 may perform redirection or handover of the UE 101 to the EPS.

In operation 20*a*-1, the UE 101 may trigger a TAU procedure in order to be connected to the EPS.

In operation 20*a*-2, the UE 101 may transmit a TAU request message to the E-UTRAN 113. The TAU request message may include an EPS-GUTI. The EPS-GUTI may correspond to the EPS-GUTI determined in operations 6A to 6B.

In operation 20*a*-3, the E-UTRAN 113 receiving the TAU request in operation 21*a*-2 may transfer the TAU request to the MME 115.

The MME 115 may not reject the TAU request of the UE by reason that the context request, context response, and/or the context ack procedure have been performed with the MME or the AMF before operation 20*a*-4 on the basis of the information of operations 15*a* to 15*b*, in operation 20*a*-4.

In operation 20*a*-5, the MME 115 receiving the TAU request message in operation 20*a*-3 continuously performs the TAU procedure for the UE 101.

In operation 21, the HSS+UDM 124 may transmit a cancel location message to the MME 115 and ask the MME 115 to delete or not to store any more information such as MM context of the UE 101. The HSS+UDM 124 may not transmit a cancel location message on the basis of the information of operations 15*c*-1 to 15*c*-2 described above in which case operations 21, 21*a*, 22, and 22*a* may be omitted.

In operation 21*a*, the MME 115 may ignore the cancel location request of operation 21 on the basis of the information of operations 15*a* to 15*b*.

In operation 22, the MME 115 may not remove information such as MM context of the UE 101 on the basis of the information of operations 15*a* to 15*b*. The MME 115 may not transmit a delete session request message to the serving gateway on the basis of the information of operations 15*a* to 15*b*. The MME 115 may or may not transmit a cancel location ack signal to the HSS+UDM 124 regardless of whether the information such as MM context is removed or whether the delete session request message is transmitted to the serving gateway.

In operation 22*a*, the HSS+UDM 124 may ignore the cancel location ack of operation 22*d* on the basis of the information of operations 15*c*-1 to 15*c*-2.

In operation 20*a*-6, the UE 101 may perform inter-system redirection which does not use N26.

In operation 23, the SMF+PGW-C 122 may resume the setup of the dedicated bearer for the IMS voice.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling fallback of a user equipment (UE) by a combo device of a session management function (SMF) and a packet data network gateway (PGW) control plane function (PGW-C) in a hybrid mobile communication system in which a first mobile communication system and a second mobile communication system interwork, the method comprising:
    receiving, from an access and mobility management function (AMF) of the first mobile communication system, a reactivation request for a packet data network (PDN) connection of the second mobile communication system for the UE, the reactivation request comprising a PDN connection context;
    retrieving a corresponding protocol data unit (PDU) session based on the PDN connection context included in the reactivation request;
    modifying evolved packet system (EPS) bearer identity (EBI) information for an internet protocol (IP) multimedia subsystem (IMS) voice allocated to the UE based on information supported in the first mobile communication system;
    establishing a core network (CN) tunnel for the PDU session for the UE to a user plane function (UPF) and a PGW user plane function (PGW-U) based on the modified EBI information;
    updating session management (SM) context based on the established CN tunnel; and
    transmitting, to the AMF, a response message comprising the updated SM context as a response to the reactivation request,
    wherein the response message further comprises an indicator indicating that an EPS fallback procedure is available to be performed after a procedure of registering the UE in the first mobile communication system is completed.

2. The method of claim 1, wherein the reactivation request further comprises a list of PDU sessions required to be reactivated received from the UE.

3. The method of claim 1, wherein the reactivation request further comprises at least one of a UE context received from a mobility management entity (MME) of the second mobile communication system or context information related to EPS PDN connections.

4. The method of claim 1, wherein the modifying of the EBI information comprises removing an EBI for an EPS bearer corresponding to a quality of service (QoS) flow which is not supported in the first mobile communication system from allocated EBI information.

5. The method of claim 1, wherein the modifying of the EBI information comprises, based on a quality of service (QoS) flow for the IMS voice not being supported in the first mobile communication system, removing an EBI for an EPS bearer for the IMS voice from allocated EBI information.

6. The method of claim 1, wherein the indicator is a delayed fallback start indicator or a delayed fallback trigger indicator.

7. A combo device of a session management function (SMF) and a packet data network gateway (PGW) control plane function (PGW-C) for controlling fallback of a user equipment (UE) in a hybrid mobile communication system in which a first mobile communication system and a second mobile communication system interwork, the combo device comprising:
    a transceiver configured to communication with a network function of the hybrid mobile communication system;
    a memory; and
    a processor configured to:
        receive, from an access and mobility management function (AMF) of the first mobile communication system, a reactivation request for a packet data network (PDN) connection of the second mobile communication system for the UE, the reactivation request comprising a PDN connection context,
        retrieve a corresponding protocol data unit (PDU) session based on the PDN connection context included in the reactivation request,
        modify evolved packet system (EPS) bearer identity (EBI) information for an internet protocol (IP) multimedia subsystem (IMS) voice allocated to the UE based on information supported in the first mobile communication system,
        establish a core network (CN) tunnel for the PDU session for the UE to a user plane function (UPF) and a PGW user plane function (PGW-U) based on the modified EBI information, update session management (SM) context based on the established CN tunnel, and transmit, to the AMF, a response message comprising the updated SM context as a response to the reactivation request.

8. A combo device of a session management function (SMF) and a packet data network gateway (PGW) control plane function (PGW-C) for controlling fallback of a user equipment (UE) in a hybrid mobile communication system in which a first mobile communication system and a second mobile communication system interwork, the combo device comprising:

a transceiver configured to communication with a network function of the hybrid mobile communication system;
a memory; and
a processor configured to:
receive, from an access and mobility management function (AMF) of the first mobile communication system, a reactivation request for a packet data network (PDN) connection of the second mobile communication system for the UE, the reactivation request comprising a PDN connection context,
retrieve a corresponding protocol data unit (PDU) session based on the PDN connection context included in the reactivation request,
modify evolved packet system (EPS) bearer identity (EBI) information for an internet protocol (IP) multimedia subsystem (IMS) voice allocated to the UE based on information supported in the first mobile communication system,
establish a core network (CN) tunnel for the PDU session for the UE to a user plane function (UPF) and a PGW user plane function (PGW-U) based on the modified EBI information,
update session management (SM) context based on the established CN tunnel, and
transmit, to the AMF, a response message comprising the updated SM context as a response to the reactivation request,
wherein the response message further comprises an indicator indicating that an EPS fallback procedure is available to be performed after a procedure of registering the UE in the first mobile communication system is completed.

9. The combo device of claim 7, wherein the reactivation request further comprises at least one of a UE context received from a mobility management entity (MME) of the second mobile communication system or context information related to EPS PDN connections.

10. The combo device of claim 7, wherein the processor is further configured to, as at least part of the modifying of the EBI information, remove an EBI for an EPS bearer corresponding to a quality of service (QoS) flow which is not supported in the first mobile communication system from allocated EBI information.

11. The combo device of claim 7, wherein the processor is further configured to, based on a quality of service (QoS) flow for the IMS voice not being supported in the first mobile communication system, remove an EBI for an EPS bearer for the IMS voice from allocated EBI information as at least part of the modifying of the EBI information.

12. The combo device of claim 7, wherein the indicator is a delayed fallback start indicator or a delayed fallback trigger indicator.

13. The combo device of claim 7, wherein the processor is further configured to:
based on the modifying of the EBI information for the IMS voice, insert one of a delayed fallback start indicator or a delayed fallback trigger indicator into the response message before transmitting the response message to the AMF.

* * * * *